United States Patent [19]

Yoshida et al.

[11] Patent Number: 5,798,756

[45] Date of Patent: Aug. 25, 1998

[54] COORDINATE DETECTION DEVICE CAPABLE OF OBVIATING THE NEED OF FORMING CLOSED LOOP IN ELECTRODES THEREOF

[75] Inventors: Yasuhiro Yoshida; Kengo Takahama, both of Nara; Takao Tagawa, Kashihara, all of Japan

[73] Assignee: Sharp Kabushiki Kaisha, Osaka, Japan

[21] Appl. No.: 460,251

[22] Filed: Jun. 2, 1995

[30] Foreign Application Priority Data

Dec. 26, 1994 [JP] Japan .................................. 6-322126

[51] Int. Cl.[6] .................................................. G09G 5/00
[52] U.S. Cl. .................................................. 345/179; 178/18
[58] Field of Search .......................... 345/104, 173–182; 178/18, 19

[56] References Cited

U.S. PATENT DOCUMENTS

| | | | |
|---|---|---|---|
| 4,289,927 | 9/1981 | Rodgers | 178/19 |
| 4,839,634 | 6/1989 | More et al. | 345/182 |
| 4,988,837 | 1/1991 | Murakami et al. | 345/104 |
| 5,162,782 | 11/1992 | Yoshioka | 345/104 |
| 5,270,711 | 12/1993 | Knapp | 345/104 |
| 5,308,936 | 5/1994 | Biggs et al. | 178/18 |
| 5,401,917 | 3/1995 | Yoshida et al. | 178/18 |
| 5,446,633 | 8/1995 | Hanggi | 362/118 |
| 5,528,002 | 6/1996 | Katabami | 345/182 |
| 5,552,568 | 9/1996 | Onodaka et al. | 345/179 |
| 5,574,262 | 11/1996 | Petty | 345/179 |

FOREIGN PATENT DOCUMENTS

| | | | |
|---|---|---|---|
| 0 504 728 A2 | 9/1992 | European Pat. Off. | G06F 3/033 |
| 0 573 136 A1 | 12/1993 | European Pat. Off. | G06K 11/16 |
| 54-24539 | 2/1979 | Japan | G06F 3/02 |
| 61-286918 | 12/1986 | Japan | G06F 3/033 |
| 5-53726 | 3/1993 | Japan | G06F 3/033 |

*Primary Examiner*—Amare Mengistu
*Attorney, Agent, or Firm*—David G. Conlin; Brian L. Michaelis

[57] ABSTRACT

There is provided a coordinate detection device capable of preventing increase of development cost and reduction of yield and dispensing with additional investment for existing equipment. The coordinate detection device includes an LCD panel having electrodes and electrodes, an electric field generator which outputs an AC electric field from a tip end of its electrode, a differential amplifier, switching circuits which sequentially select electrodes of the LCD panel and connect the selected electrodes to the differential amplifier, and a coordinate detection circuit which detects coordinates of a position in which the electric field generator is located based on a timing at which the electrodes are selected and an output of the differential amplifier. A coordinate detection function can be achieved by means of the LCD panel having the same structure as that of an LCD panel provided specially for image display. Furthermore, there is no need to form a closed loop in the electrodes of the LCD panel, which obviates the need of providing any board opposite to four sides of the LCD panel.

15 Claims, 41 Drawing Sheets

Input of envelope detector 186

Signal envelope
CARRIER OF ELECTRIC FIELD GENERATOR 208

Input of comparator 180

Output of comparator 180

Comparison reference voltage

Output of T-filp-flop 181

Output of delay circuit 182
(Input of NAND gate 183)

Delay time of delay circuit 182

Output of NAND gate 183

(The axis of abscissas : Time
 The axis of ordinates : Voltage)

Input of envelope
detectors 191 and 192

Signal envelope
CARRIER OF ELECTRIC FIELD GENERATOR 208

Output of detector 192

Output of detector 191

Input of binarizing circuit 194

Comparison reference voltage

Output of binarizing circuit 194

The axis of abscissas: Time
The axis of ordinates: Voltage

Fig. 24A Output of amplifier 179
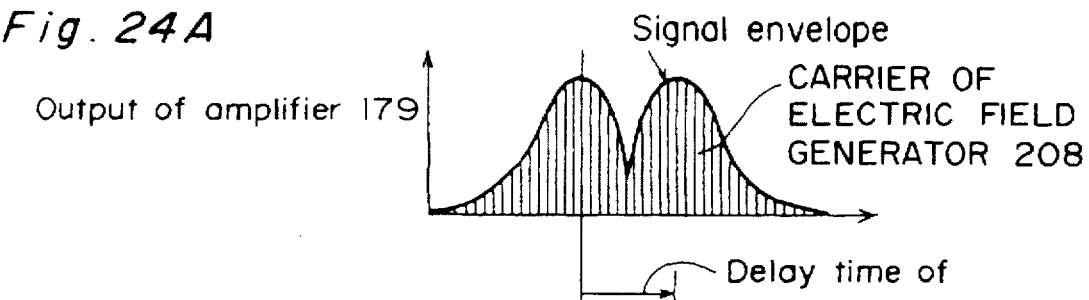
Fig. 24B Output of delay circuit 220
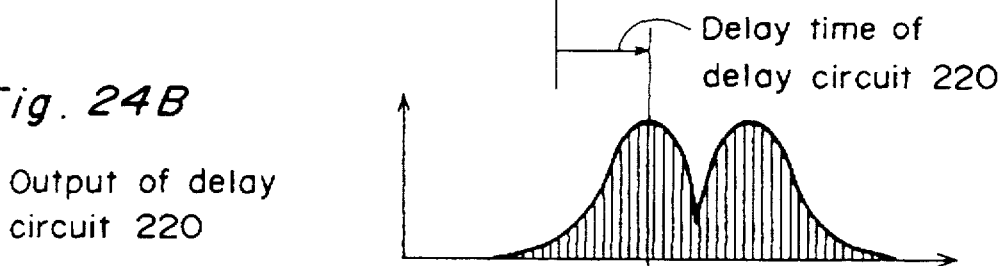
Fig. 24C Output of subtracter 221
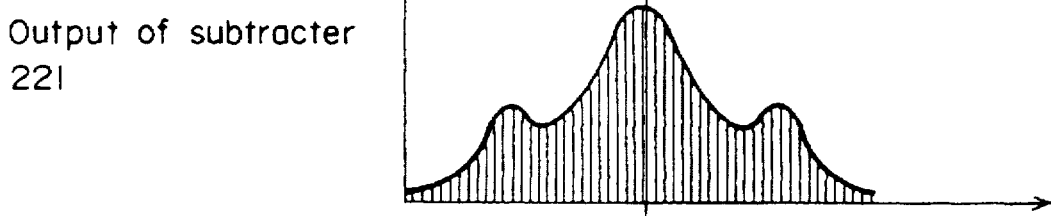
Fig. 24D Output of detector 222 (Input of binarizing circuit 223)
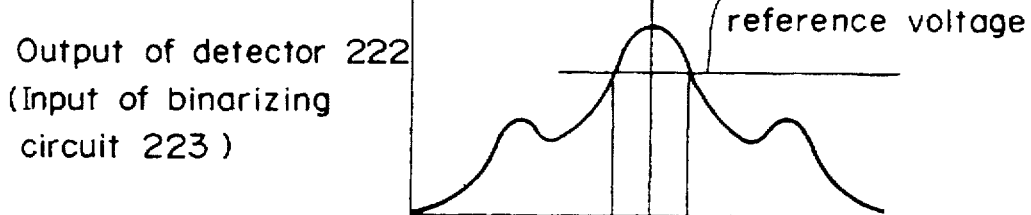
Fig. 24E Output of binarizing circuit 223
( The axis of abscissas : Time
  The axis of ordinates : Amplitude )

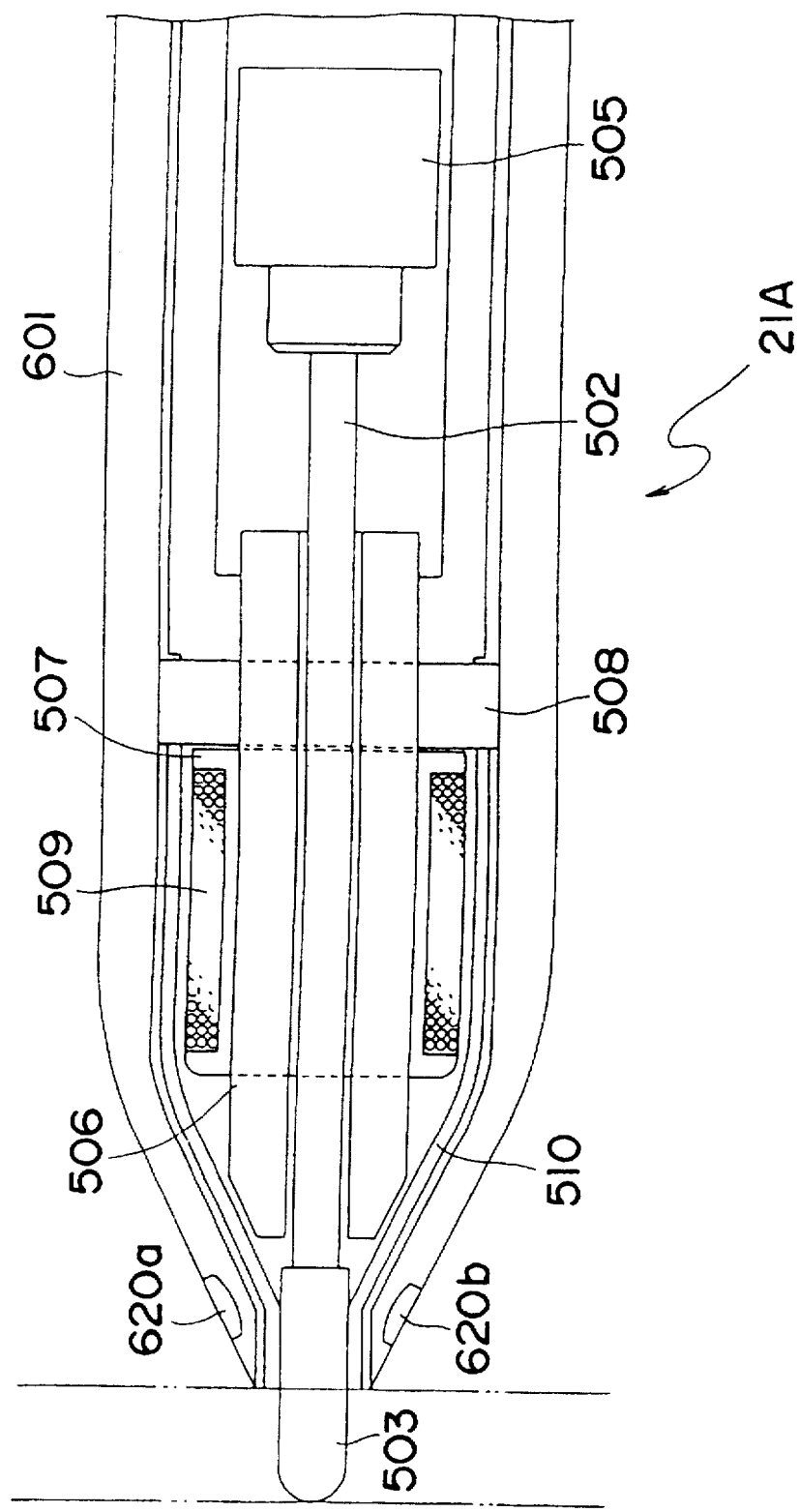

DIFFERENTIAL AMPLIFIER $Y_p$ $Y_{p+1}$ $Y_{p+2}$

IMAGE SIGNAL LINE

I/O SWITCHING
CONTROL TERMINAL

OUTPUT1,2,3

COORDINATE DETECTION DEVICE CAPABLE OF OBVIATING THE NEED OF FORMING CLOSED LOOP IN ELECTRODES THEREOF

BACKGROUND OF THE INVENTION

1. Field of the Invention

The present invention relates to a coordinate detection device, and relates to a coordinate input function-integrated liquid crystal display (LCD) device for use as a man-machine interface provided by using, for example, an LCD panel having an electrode structure arranged in an x-y matrix form and making the LCD panel itself concurrently have a coordinate input function. In more detail, the present invention relates to a coordinate detection device which can be provided by using a conventionally used LCD panel as it is without making alterations. In particular, the present invention relates to a coordinate detection device which can concurrently use electrodes of an LCD panel as a part of a structure for using a coordinate input method with generation of an electric field. Further, the present invention relates to a coordinate detection means which effects an electric field generated from an electric field generating means provided separately from the LCD panel on the electrodes of the LCD panel and detects an induction voltage generated at the electrodes, thereby allowing the coordinates of the electric field generating means to be detected.

2. Description of the Prior Art

Man-machine interfaces in word processors and personal computers have achieved remarkable developments in recent years. In particular, there has been proposed a coordinate input function-integrated LCD device which uses a coordinate pointing device having an electronic structure as a pen and uses an LCD panel as a writing sheet, thereby allowing a letter or figure to be directly written on the display panel (refer to, for example, Japanese Patent Laid-Open Publication No. HEI 5-53726 as a first prior art).

The first prior art is a display-integrated type tablet device as shown in FIG. 41. As shown in FIG. 41, a switching circuit 907 is switched to a coordinate detection control circuit 906 side in a coordinate detection period under the control of a control circuit 9010 so as to select the control circuit 906. Then, based on each signal from the detection control circuit 906, a segment electrode drive circuit 903 generates a segment electrode operation signal to sequentially scan segment electrodes X of an LCD panel 901. Subsequently, a common electrode drive circuit 902 generates a common electrode scanning signal to sequentially scan common electrodes Y. An x-coordinate detection circuit 908 and a y-coordinate detection circuit 909 detect respectively an x-coordinate value and a y-coordinate value at a tip end of an electronic pen 9011 based on an induction voltage induced at the tip end of the electronic pen 9011. Meanwhile, in an image display period, the switching circuit 907 is switched to a display control circuit 904 side so as to select the display control circuit 904. Consequently, an image is displayed on the LCD panel 901.

Thus, according to the first prior art, a display-integrated type tablet device can be constructed.

In other words, according to the above-mentioned first prior art, a scanning voltage is applied to the LCD panel in the coordinate detection period so that the scanning voltage detects a voltage induced at the electronic pen to decide the coordinates of the electronic pen, and in the image display period, image display can be performed according to utterly the same principle of operation as that of the conventional LCD panel.

The above-mentioned arrangement enables incorporation of a coordinate input function by means of the electronic pen without making alterations in the conventional LCD panel.

Next, a second prior art (refer to Japanese Patent Laid-Open Publication No. SHO 54-24539) will be described. The second prior art is, as shown in FIG. 42, exemplary of an LCD panel for use in a coordinate input function-integrated LCD device. In FIG. 42, a reference numeral 31 denotes an LCD panel. The LCD panel 31 has a glass substrate 32 and a glass substrate 35. On an inner surface of one glass substrate 32 are formed thick electrodes 33 for image display use and thin electrodes 34 for input coordinate detection use arranged alternately in an x-axis direction. On an inner surface of the other glass substrate 35 are formed thick electrodes 36 for image display use and thin electrodes 37 for input coordinate confirmation use arranged alternately in a y-axis direction perpendicular to the direction of the thick electrodes 33 and the thin electrodes 34. A liquid crystal material is sealedly filled in a space between the two glass substrates 32 and 35. Connectors 38 and 39 are attached to the glass substrate 32, while connectors 40 and 41 are attached to the glass substrate 35. The glass substrates 32 and 35 are connected to external circuits by way of the connectors 38, 39, 40 and 41.

The second prior art is to concurrently perform coordinate input and image display by means of one LCD panel. The second prior art has two operation modes of an image display mode and an image input mode.

It can be considered that the second prior art operates in the image display mode by means of the thick electrodes 33 and 36 which are perpendicular to each other according to a principle of operation of a well-known dot matrix LCD. Now that LCD devices are widely used, it seems unnecessary to provide any special explanation for the image display.

Meanwhile, the second prior art operates in the coordinate input mode by forming, for example, three loops 42, 43 and 44 in the x-direction in a manner as shown in FIG. 43 by means of the thin electrodes 34 and 37 formed on the LCD panel 31 shown in FIG. 42 and the connectors 38, 39, 40 and 41. By forming the loops 42, 43, and 44, x-coordinate values on the LCD panel 31 can be classified into $2^3$ areas, i.e., eight areas.

When a magnetic field generator 45 including a coil 48 driven by an AC power source 47 is placed in a position denoted by a mark A in FIG. 43, a magnetic field generated by the magnetic field generator 45 penetrates the loop 42, resulting in generating an induction current through the loop 42. Meanwhile, the above-mentioned magnetic field scarcely penetrates the other loops 43 and 44, resulting in generating almost no induction current through the other loops 43 and 44.

When the magnetic field generator 45 is placed in a position denoted by a mark B, a magnetic field generated by the magnetic field generator 45 penetrates the loops 43 and 44, resulting in generating an induction current through the loops 43 and 44. Meanwhile, the above-mentioned magnetic field scarcely penetrates the other loop 42, resulting in generating almost no induction current through the other loop 42.

Therefore, by connecting a specified amplifier 51 to each of the loops 42, 43 and 44, consistently observing the magnitude of an output current by means of a comparator 52, and binarizing the magnitude of the output current from each loop by comparison with a threshold value to convert an I/O output obtained from each loop into a binary number, it can be decided which area of the aforementioned eight areas the magnetic field generator 45 is located in. For instance, the position denoted by the mark A is represented by 100, while the position denoted by the mark B is represented by 011, and therefore a table representing relationships between output values and positions is preferably used.

Position detection in the y-axis direction can be performed utterly in the same manner as in the above-mentioned position detection in the x-axis direction. Thus, by deciding two positions in the x-y-axes directions, the coordinates of the magnetic field generator 45 on the LCD panel can be detected.

As described above, in the second prior art, using the technique of forming a plurality of coils (loops), consistently observing the magnitude of the induction current induced in each coil (loop) from the magnetic field generator 45, and specifying the position of the magnetic field generator, one LCD panel 31 can be concurrently used for coordinate input and image display.

As an improved device of the first and second prior arts, there is a third prior art ("coordinate input function-integrated LCD device" disclosed in Japanese Patent Laid-Open Publication No. SHO 61-286918). The coordinate input function-integrated LCD device of the third prior art includes, as shown in FIG. 44, an LCD panel wherein electrodes X and Y are arranged in an x-y matrix form as a coordinate input display panel. FIG. 44 shows only eight electrodes X of the x-axis, and partially shows electrodes Y of the y-axis.

As shown in FIG. 44, the third prior art includes bi-directional switching elements 13a and 13b. The switching elements 13 are used for the purpose of forming a loop-shaped coil with the electrodes on the device when the LCD panel is used as an input device. Control lines of the switching elements 13a and 13b are all connected to an I/O switching control line 18.

The third prior art further includes switching elements 14 for use in a case where the LCD panel is used as an image display device. An image signal is supplied to the switching elements 14 by means of an image signal control circuit 15, while a specific electric potential is applied to drain electrodes of all the switching elements 14 via a resistor 16.

Differential amplifiers 19 amplify a weak induction current generated in the coil on the loop to a signal level which can be easily handled when the LCD panel is used as an input device.

The switching elements 13a, the switching elements 14, and the image signal control circuit 15 are connected as an integrated circuit 20a to each electrode from an upper side of the panel, while the differential amplifiers 19 and the switching element 13b are connected as an integrated circuit 20b to each electrode from a lower side of the panel.

The third prior art also includes a structure of the electrodes of the y-axis similar to that of the electrodes of the x-axis.

Next, an operation of the coordinate input function-integrated LCD device of the third prior art will be described with reference to FIG. 44. First, in an image display operation, the I/O switching control line 18 is turned off, while the switching elements 13a and 13b are all turned off. Consequently, x-axis electrodes X1, X2, X3 and Xm are all put in independent states. Then, an image signal is supplied to the gate electrodes of the switching elements 14 by the control circuit 15, and an electric potential is given to an electrode connected to the switching element which is turned on by the image signal.

In synchronization with the above-mentioned operation, y-axis electrodes Y1, Y2, Y3 and Ym are controlled so that any one of them is put in a conductive or "on" state. In the above-mentioned stage, the LCD panel performs an image display operation according to the same principle of operation as that of the generic dot matrix type LCD device.

Next, in an input operation, the I/O switching control line 18 is turned on, and the switching elements 13a and 13b are all turned on. Consequently, the x-axis electrodes X1, X2, X3 and Xm form loop electrodes 10 arranged in a manner as shown in FIG. 45. Further, all the image signals from the image signal control circuit 15 are outputted in a non-conductive or "off" state, and the switching elements 14 are all turned off.

In FIG. 45, a reference numeral 11 denotes a cursor coil and a reference numeral 12 denotes an AC signal source. In the present case, when the cursor coil 11 is driven by the AC signal source 12, an induction current flows through the electrode 10 connected in a loop form by an AC magnetic field exerted from the cursor coil.

By detecting the induction current, it can be detected which of the electrodes of the x-axis the cursor coil is located most nearly. A principle of operation similar to the principle of detection is also disclosed in the aforementioned second prior art (Japanese Patent Laid-Open Publication No. SHO 54-24539).

Furthermore, in the third prior art, it is proposed to time-sharingly use the input and the output so as to make the LCD panel have the above-mentioned structure inclusive of a peripheral circuit, thereby making it an input-output integrated device. FIG. 46 shows an exemplified timing chart of the above-mentioned structure.

In the above-mentioned example, a y-axis electrode Yp is turned on for image display. Then, while an adjacent electrode Yp+1 is turned on, an I/O switching control terminal is turned on, and the switching elements 14 are all turned off by the control circuit 15, thereby allowing an input operation to be performed to obtain position data. Subsequently, the y-axis electrode Yp+1 is turned on to enter into an image display operation. Thus the image display operation and the input operation are repeated alternately time-sharingly.

As described above, the third prior art has a peripheral circuit which can perform a control operation so as to short-circuit the ends of the electrodes for image display of the LCD panel when the panel is used as an input device, thereby allowing the electrodes to be connected in an appropriate loop form. When the panel is used as an input device, the peripheral circuit is operated to form a plurality of electrode loops, and an induction current generated in each loop when a magnetic field generated from magnetic field generating means separately provided for each loop is effected is consistently observed so as to obtain the coordinates of the magnetic field generating means.

What is common to the third prior art and the second prior art is the scheme of using one LCD panel concurrently for coordinate input and image display as well as the principle of coordinate detection itself for dividing in position the panel by means of a plurality of loop-shaped coils, consistently observing at each coil an induction current generated when a magnetic field generator is effected on the coils, and representing the coordinates of the magnetic field generator by a string of binary numbers. A further common factor is a variety of problems (described hereinafter) which commonly occur due to use of the common principle of detection.

As shown in the third prior art, the coordinate input technique itself for detecting the coordinate position of the magnetic field generator by detecting an induction current flowing through a loop when a magnetic field generated from the magnetic field generating means is effected on a plurality of electrode lines connected in loop forms is a well-known technique.

The third prior art differs from the second prior art if compared in that no special electrode for coordinate detection is required to be formed on the LCD panel in the third prior art and in that a special peripheral circuit is required for concurrent use of the electrodes for image display as a coordinate detection electrode in the third prior art.

The aforementioned first prior art and second prior art are common in the point that the coordinate detection is performed by means of an LCD panel and an electronic pen. However, they differ from each other in that the former utilizes signal transmission from the LCD panel to the electronic pen whereas the latter utilizes signal transmission from the electronic pen to the LCD panel.

The aforementioned first prior art uses the LCD panel as a signal generator, and detects a signal induced at the electronic pen from the LCD panel to detect the coordinates of the electronic pen on the LCD panel. Therefore, in the first prior art, it is indispensable to transmit an output signal induced at the electronic pen from the electronic pen to a signal processor. The above-mentioned matter is a serious obstacle in an attempt at compactly forming the electronic pen. The above is because the electronic pen is required to be provided with a wired or wireless signal transmission means in order to transmit the signal from the electronic pen to the signal processor. For instance, when the signal is transmitted by wire, an appropriate lead wire for signal transmission is necessary. It is apparent that the lead wire is a serious obstacle in use. When a wireless transmission is performed, there is also an advantage that no lead wire is necessary, however, a wireless transmitter for the signal must be incorporated for the above-mentioned purpose. In such a case, for example, when the electronic pen is entirely operated on a battery, it is apparent that a power consumption of the wireless transmitter is a weighty factor in regard to the operating life of the battery, thus being accompanied by a problem that a significant reduction of the operating life of the battery may be incurred. There is also a problem that it is difficult to mount a necessary wireless transmitter circuit into a small space inside the electronic pen.

In contrast to the above, in the second prior art, since a magnetic signal generated by the electronic pen is processed by the LCD panel, there is required no connection cable for transmitting the signal detected by the electronic pen.

However, in the second prior art, it is required to form a loop by short-circuiting the ends of the adjoining electrodes of the LCD panel in the input stage in order to achieve an input function and an image display function by means of a single LCD panel, and it is required to open the aforementioned loop in the image display stage. Therefore, an LCD panel control circuit owned by an image display/coordinate input function integrated device in the second prior art has a problem that a switching element having a specific bi-directionality which is not necessary in an LCD panel control circuit owned by an LCD device for performing only image display must be additionally incorporated.

It has been a long time since the industry relevant to the liquid crystal techniques is called an equipment industry. In other words, the liquid crystal techniques belong to an industry having a close relation to a manufacturing equipment. Thus, it tends to be considered that incorporation of a new element as described above can be put into practice very easily by concurrently fabricating such an element. However, the reason why a great amount of semiconductor elements have been conventionally able to be concurrently fabricated is because circuit requirements to the semiconductor elements have been on the same basis, and therefore the required characteristics are consistent. Conversely, it can be said that an expensive equipment can be effectively operated since such a great amount of semiconductor elements having consistent characteristics are concurrently fabricated.

In contrast to the above, the switching element to be newly incorporated, if it is to be incorporated through concurrent fabrication, not only requires circuit requirements significantly different from those of the semiconductor elements which have been conventionally incorporated through concurrent fabrication but also has characteristics quite different from those of the semiconductor elements. To incorporate such a specific semiconductor element newly into an LCD panel increases the amount of development processes of the LCD panel, and this directly connects to reduction of yield and significant cost increase.

Furthermore, according to the technique of the third prior art, it has been required to concurrently connect integrated circuits comprised of a switching element and a control circuit, as represented by the integrated circuits 20a and 20b in FIG. 44, to the LCD panel at the four sides of the panel. (Although the integrated circuits are connected to the LCD panel longitudinally at two sides in FIG. 44 because only a structure related to the x-axis electrodes is shown. However, since a similar structure is required for the y-axis electrodes, consequently it is required to concurrently connect integrated circuits to the electrodes in four directions, i.e., from the upper, lower, right, and left sides of the panel.) Therefore, an LCD panel for use in such an image display/coordinate input function integrated device is required to be provided with tab connection terminals at the four sides.

In contrast to the above, a generally used LCD panel which performs only image display has a structure in which tab connection terminals are wired from two or three sides of the panel. Therefore, in the aforementioned second prior art, such a generally used LCD panel which performs only image display cannot be applied as it is to the image display/coordinate input function integrated device without making alterations.

Therefore, it is of course possible to develop specially for the image display/coordinate input function integrated device an LCD panel which can newly lead tab connection terminals in four directions from the four sides thereof and can be directly applied to the second prior art. However, for the above-mentioned purpose, a huge amount of investment for an equipment is of course required, which is a serious problem in developing the industry.

Collectively speaking, since the above-mentioned second prior art requires addition of a coordinate input function to a display panel, it is required to newly develop an LCD panel specially for an image display/coordinate input function integrated device by making alterations in the LCD panel itself. Furthermore, in the second and third prior arts, since the tab connection terminals wired from the LCD panel are connected to a printed circuit board mounted with an integrated circuit 20 and so forth, it is required to lead tab connection terminals in four directions from the four sides of the LCD panel. Therefore, in the LCD panel to be used in the third prior art, an occupation area of a printed circuit board included in the LCD panel, or so-called a peripheral edge portion of the LCD panel is dimensionally increased more than in the conventional LCD panel which performs only image display while allowing tab connection terminals to be wired from only two or three sides. The above-mentioned arrangement results in a problem that the image display/coordinate input function integrated device as a product including the LCD panel is dimensionally increased.

Eventually, it can be considered that the techniques which have been conventionally proposed are all hardly implemented or wasteful in terms of both LCD panel manufacturing cost and application forms of final products.

SUMMARY OF THE INVENTION

The object of the present invention is therefore to provide a coordinate detection device capable of solving the aforementioned problems of the prior arts.

That is, the object of the present invention is to provide a coordinate detection device which obviates the need of newly incorporating into an LCD panel any switching element which has a specific bi-directionality and is capable of switching, and obviates the need of providing a tab connection terminal at four sides of the LCD panel.

That is, the object of the present invention is to provide a coordinate detection device capable of being applied to a device integrated with both an image display function and a coordinate input function without making alterations in an LCD panel which has been conventionally used specially for image display, preventing the increase of development cost and the reduction of yield, and dispensing with investment for equipment which may cause cost increase, thereby totally contributing to development of the industry.

In order to achieve the aforementioned object, there is provided a coordinate detection device comprising: a panel which is provided for coordinate detection and includes a first electrode and a second electrode extending in a direction crossing a direction in which the first electrode extends; a coordinate pointing device which includes an alternating current oscillator and an electrode and outputs from a tip end portion of the electrode an alternating current electric field generated by the alternating current oscillator; a differential amplifier; switching means for sequentially changing connection of the electrodes of the panel so as to sequentially select the electrodes and electrically connect each selected electrode to the differential amplifier; and coordinate detection means for detecting coordinates based on a timing at which the electrodes are selected and an output of the differential amplifier.

In the coordinate detection device of the present invention, the AC generator of the coordinate pointing device outputs an AC electric field from the tip end of the electrode. When the outputted AC electric field effects on the first and second electrodes of the panel, a voltage corresponding to the amplitude of the AC electric field is generated at the first and second electrodes.

Meanwhile, the switching means sequentially switches the connections of the first and second electrodes of the panel so as to connect the selected electrodes to the differential amplifier. Therefore, when the first and second electrodes at which the voltage is induced are each connected to the differential amplifier, the differential amplifier amplifies the induction voltage and outputs the resulting voltage.

The voltage outputted from the differential amplifier is inputted to the coordinate detection means. Then, the coordinate detection means detects the coordinates of the coordinate pointing device on the panel based on the timing at which the first and second electrodes are each selected and the output of the differential amplifier.

Therefore, according to the present invention, the coordinates of the coordinate pointing device can be detected without necessitating a signal line between the coordinate pointing device and the panel. Furthermore, the coordinates of the coordinate pointing device can be detected according to the voltage induced at the first and second electrodes by an electric field generated from the coordinate pointing device. Therefore, the first and second electrodes are not required to form a closed loop. Therefore, an LCD panel provided specially for image display can be used as the above-mentioned panel without making alterations. Furthermore, according to the present invention, the first and second electrodes are not required to form a closed loop, and therefore a coordinate detection function can be incorporated into the LCD panel provided specially for image display without providing an electric circuit opposite to the four sides of the LCD panel provided specially for image display. The above-mentioned fact means that the coordinate detection function can be incorporated into the image display device without increasing the size of the image display device having the LCD panel provided specially for image display, and also means that an image display device having a coordinate detection function can be manufactured without making great alterations in the existing manufacturing equipment for the image display device.

Therefore, according to the present invention, there can be provided a coordinate detection device capable of preventing the increase of development cost and the reduction of yield, and dispensing with investment for equipment which may cause cost increase, thereby totally contributing to development of the industry.

Furthermore, according to the present invention, a signal from the electrodes of the panel is amplified in the differential amplifier. The above-mentioned arrangement has an advantage that external noises which have entered evenly into two inputs of the differential amplifier can be effectively removed.

Furthermore, according to an embodiment, a material having an electro-optical effect is sealedly filled in a space between two substrates, and the first and second electrodes are arranged on the substrates while making the first and second electrodes concurrently serve as electrodes for image display.

With the above-mentioned arrangement, a display panel which has concurrently the coordinate detection function and the image display function can be provided.

Furthermore, according to an embodiment, the coordinate pointing device outputs electric fields which are opposite in phase to each other from its first and second electrodes to which electric fields being opposite in phase to each other are applied from the oscillator.

Therefore, the electrode of the panel receiving the electric field from the first electrode outputs an electric field opposite in phase to the electric field outputted from the electrode of the panel receiving the electric field from the second electrode. Therefore, electric fields which are opposite in phase to each other are applied to the differential amplifier. Therefore, the coordinate detection means can detect a state in which the electrodes of the coordinate pointing device are located in the position of the panel electrode selected by the switching means upon detecting a discontinuity of the signal outputted from the differential amplifier occurring when the electric fields which are opposite in phase to each other are applied to the differential amplifier.

Furthermore, according to an embodiment, the first electrode of the coordinate pointing device is a cylinder-shaped electrode, while the second electrode of the coordinate pointing device is a rod-shaped electrode arranged inside the cylinder-shaped electrode. Therefore, even when the coordinate pointing device is rotated around center axis of the rod-shaped electrode, unchanged electric fields are applied from the coordinate pointing device to the electrodes of the panel. Therefore, the electric fields applied to the electrodes of the panel are not changed by the above-mentioned rotation irrelevant to the coordinates to be detected, thereby allowing an improved coordinate detection accuracy to be achieved.

Furthermore, according to an embodiment, the first electrode of the coordinate pointing device is arranged as separated apart at approximately regular intervals around the circumference of the second electrode. Therefore, the rotation of the coordinate pointing device around the center axis does not change the electric fields applied to the electrodes of the panel, thereby allowing an improved coordinate detection accuracy to be achieved.

Furthermore, according to an embodiment, the coordinate pointing device has a battery storing section for storing therein a battery which serves as a power source for the AC oscillator.

Therefore, by storing the battery in the battery storing section, there is no need to supply an electric power to the coordinate pointing device from outside the coordinate pointing device. Therefore, the coordinate pointing device is permitted to be connected to nothing. The above-mentioned arrangement allows a complete codeless coordinate pointing device to be achieved.

In an embodiment, the coordinate pointing device comprises a battery storing section for storing therein a secondary battery which serves as a power source for the alternating current oscillator and a charging terminal to be electrically connected to the secondary battery when the secondary battery is stored in the battery storing section, and wherein a casing to which the panel is mounted is provided with a storing portion for storing the coordinate pointing device, and a power supply terminal which can supply an electric power to the charging terminal while being electrically connected to the charging terminal of the coordinate pointing device when the coordinate pointing device is stored in the storing portion.

According to the above-mentioned embodiment, when the coordinate pointing device is stored in the storing portion provided at the casing to which the panel is mounted, the charging terminal owned by the coordinate pointing device and the power supply terminal of the casing are electrically connected to each other. Therefore, in the above-mentioned time, the secondary battery stored in the battery storing section of the coordinate pointing device is charged. Therefore, the operating life of the battery which is the power source of the coordinate pointing device can be remarkably increased.

Furthermore, according to an embodiment, a resonance circuit which resonates with the AC electric field generated by the AC oscillator is connected across the output terminal and the inverted input terminal of the differential amplifier.

Therefore, the differential amplifier can selectively amplify the AC electric field with a great gain. Therefore, an improved coordinate detection sensitivity can be achieved.

According to an embodiment, the switching means selects at least one pair of adjoining electrodes so as to connect the selected electrodes to the differential amplifier, and shifts the selected electrodes one by one in the direction in which the electrodes are arranged.

Therefore, by shifting the selected electrodes, the coordinate pointing device is, so to speak, searched to allow the position coordinates of the coordinate pointing device located in the area where the electrodes are arranged to be securely detected.

Furthermore, according to an embodiment, the switching means selects a pair of adjoining electrodes of the panel, and shifts the selected pair of electrodes one by one in the direction in which the electrodes are arranged.

Therefore, the selection can be achieved in a manner simpler than that of the above-mentioned embodiment, thereby allowing the structure of the switching means to be simplified.

In an embodiment, the switching means has a first terminal to be connected in parallel with two or more adjoining electrodes and a second terminal to be connected in parallel with two or more electrodes adjacent to the electrodes connected to the first terminal, and shifts connection of the electrodes to the first terminal and connection of the electrodes to the second terminal one by one in a direction in which the electrodes are arranged.

According to the above-mentioned embodiment, the switching means has the first terminal connected in parallel with two or more adjoining electrodes and the second terminal connected in parallel with two or more electrodes adjacent to the electrodes connected to the first terminal. Therefore, by electrically connecting the first terminal and the second terminal to the differential amplifier, four or more electrodes which are receiving the AC electric fields outputted from the electrodes of the coordinate pointing device can be connected to the differential amplifier. Therefore, an improved detection sensitivity can be achieved in comparison with the case where only two electrodes of the panel are connected to the differential amplifier.

In an embodiment, the coordinate detection means comprises: envelope extraction means for receiving an output from the differential amplifier and extracting an envelope of the output; bottom detection means for receiving a double-humped output from the envelope extraction means and detecting a bottom portion of the output; time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

According to an embodiment, the envelope of the output from the differential amplifier is extracted by the envelope extraction means, and a bottom portion of the double-humped output from the envelope extraction means is detected. Then, based on the time at which the bottom portion is detected and the timing at which the switching means selects the electrodes of the panel, the coordinates representing the position of the coordinate pointing device are specified. Thus, according to the present embodiment, a characteristic double-humped signal is outputted from the envelope extraction means, and by detecting the bottom portion of the double-humped envelope waveform, coordinate detection can be achieved. Furthermore, in order to specify the coordinates, a signal obtained by removing unnecessary signal components therefrom and being subjected to an envelope detection process is used, and therefore the detection of the bottom portion can be easily achieved.

Furthermore, according to an embodiment, a synchronous detector is provided as the envelope extraction means. The synchronous detector can extract the envelope of the signal without distortion more correctly than the envelope detector, and therefore an improved coordinate detection accuracy can be achieved.

In an embodiment, the coordinate detection means comprises: a first envelope detector which has a relatively great time constant and operates to receive an output from the differential amplifier and detect an envelope of the output; a second envelope detector which has a relatively small time constant and operates to receive an output from the differential amplifier and detect an envelope of the output; bottom detection means for subjecting a double-humped output from the first envelope detector and a double-humped output from the second envelope detector to a subtraction process so as to detect a bottom portion of the double-humped output outputted from the second envelope detector; time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

According to the above-mentioned embodiment, the coordinate detection means includes a first envelope detector which has a relatively great time constant and operates to receive the output from the differential amplifier and detect the envelope of the output as well as a second envelope detector which has a relatively small time constant and operates to receive the output from the differential amplifier and detect the envelope of the output. By subjecting the double-humped output from the first envelope detector and the double-humped output from the second envelope detector to a subtraction process, the bottom portion of the double-humped output outputted from the second envelope detector is detected.

The output of the first envelope detector having a great time constant becomes a double-humped signal where the bottom portion is shallowed, while the output of the second envelope detector having a small time constant becomes a double-humped signal where the bottom portion is not shallowed. Therefore, by subjecting the output of the first envelope detector and the output of the second envelope detector to a subtraction process, a signal having a peak at the bottom portion can be obtained. With the above-mentioned signal, the bottom portion can be detected.

In an embodiment, the coordinate detection means comprises: an envelope detector which receives an output from the differential amplifier and detects an envelope of the output; bottom detection means for receiving a double-humped output from the envelope detector to binarize the output and detecting a bottom portion of the double-humped output according to the binarized output; time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

According to the above-mentioned embodiment, the bottom detection means detects the bottom portion of the double-humped output according to the output obtained by binarizing the double-humped output from the envelope detector. By the above-mentioned binarizing operation, an output in which a difference between the bottom portion and the peak portion of the double-humped output is ascertained can be obtained. Therefore, the bottom portion can be easily detected by means of the output, and through detection of the bottom portion, a coordinate detection operation can be performed.

In an embodiment, the coordinate detection means comprises: a delay circuit which receives an output of the differential amplifier and delays the output by a specified time; a subtracter which subjects the output of the differential amplifier and an obtained delayed output to a subtraction process; bottom detection means for binarizing a signal outputted from the subtracter and detecting a bottom portion of the double-humped output according to an obtained binarized signal; time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

According to the above-mentioned embodiment, the coordinate detection means includes the delay circuit which receives the output from the differential amplifier and delays the output by a specified time, the subtracter which subjects the output of the differential amplifier and the delayed output to a subtraction process, and the bottom detection means which binarizes the signal outputted from the subtracter and detects the bottom portion of the double-humped output according to the binarized signal. According to the present embodiment, a preceding peak of the double-humped signal outputted from the differential amplifier and a subsequent peak of the delayed double-humped signal are added together. With the above-mentioned operation, a signal which has three peaks comprised of a highest peak and two low peaks located besides the highest peak obtained through the addition is outputted from the subtracter. Then, by binarizing the signal having the three peaks, a difference between the highest peak portion and the low peak portions is ascertained. The highest peak portion is delayed by the above-mentioned delay time from the bottom portion of the double-humped output which is not delayed. Therefore, the bottom portion can be easily detected according to the binarized signal of which highest peak portion is ascertained, and a coordinate detection operation can be performed through the detection of the bottom portion.

According to an embodiment, there is provided a coordinate detection device comprising: a flat display panel in which a material having an electro-optical effect characteristic is sealedly filled in a space between two substrates, and a plurality of x-axis electrodes and a plurality of y-axis electrodes which are intersecting each other are provided on the substrates; x-axis drive circuit and y-axis drive circuit which are provided for image display use and electrically drive the x-axis electrodes and the y-axis electrodes of the flat display panel respectively; a coordinate pointing device including alternating current electric field generating means having therein an alternating current power source and an electrode connected to an output terminal of the alternating current electric field generating means; a coordinate detection circuit including a differential amplifier, a connection switching circuit which selects two adjoining x-axis electrodes or a pair of x-axis electrodes constituted by two adjoining electrode groups of the x-axis electrodes as well as two adjoining y-axis electrodes or a pair of y-axis electrodes constituted by two adjoining electrode groups of the y-axis electrodes, connects the selected electrodes to the differential amplifier, and shifts the selected electrodes one by one in a direction in which the selected electrodes are arranged, bottom detection means for obtaining a signal which is supplied from the coordinate pointing device to the electrodes by shifting the selected electrodes as a double-humped signal from the differential amplifier and detecting a bottom portion of the double-humped signal, and position coordinate specifying means for specifying coordinates based on a time at which the bottom detection means detects the bottom portion and a timing at which the electrodes are selected; and an image display-coordinate detection changeover circuit which time-sharingly complementarily operates the x-axis drive circuit, the y-axis drive circuit, and the coordinate detection circuit.

According to the above-mentioned embodiment, the flat display panel wherein the material having an electro-optical effect characteristic is sealedly filled in the space between the two substrates, and the plural number of x-axis electrodes and the plural number of y-axis electrodes which are intersecting each other are provided on the substrates can be time-sharingly changed over so as to be used for either image display or coordinate detection by means of the image display-coordinate detection changeover circuit. When the flat display panel is used for image display, the x-axis electrodes and the y-axis electrodes are driven by the drive circuit to electrically drive the panel so as to display an image. When coordinate detection is performed, a voltage induced at the x-axis electrodes and the y-axis electrodes by an electric field generated from the coordinate pointing device which is provided separately with a function of generating an AC electric field is detected by the coordinate detection circuit which utilizes a change in voltage of the signal, thereby allowing the coordinates of the coordinate pointing device to be detected.

According to an embodiment, there is provided a coordinate detection device comprising: a flat display panel in which a material having an electro-optical effect characteristic is sealedly filled in a space between two substrates, and a plurality of x-axis electrodes and a plurality of y-axis electrodes which are intersecting each other are provided on the substrates; x-axis drive circuit and y-axis drive circuit which are provided for image display use and electrically drive the x-axis electrodes and the y-axis electrodes of the flat display panel respectively; a coordinate pointing device including alternating current electric field generating means having therein an alternating current power source and an electrode connected to an output terminal of the alternating current electric field generating means; a coordinate detection circuit including a differential amplifier, a connection switching circuit which selects two adjoining x-axis electrodes or a pair of x-axis electrodes constituted by two adjoining electrode groups of the x-axis electrodes as well as two adjoining y-axis electrodes or a pair of y-axis electrodes constituted by two adjoining electrode groups of the y-axis electrodes, connects the selected electrodes to the differential amplifier, and shifts the selected electrodes one by one in a direction in which the selected electrodes are arranged, bottom detection means for obtaining a signal which is supplied from the coordinate pointing device to the electrodes by shifting the selected electrodes as a double-humped signal from the differential amplifier and detecting a bottom portion of the double-humped signal by detecting a phase inversion point of the double-humped signal through calculation of an input signal and an output signal of a delay circuit, and position coordinate specifying means for specifying coordinates based on a time at which the bottom detection means detects the bottom portion and a timing at which the electrodes are selected; and an image display-coordinate detection changeover circuit which time-sharingly complementarily operates the x-axis drive circuit, the y-axis drive circuit, and the coordinate detection circuit.

According to the above-mentioned embodiment, the flat display panel wherein the material having an electro-optical effect characteristic is sealedly filled in the space between the two substrates, and the plural number of x-axis electrodes and the plural number of y-axis electrodes which are intersecting each other are provided on the substrates can be time-sharingly changed over so as to be used for either image display or coordinate detection by means of the image display-coordinate detection changeover circuit. When the flat display panel is used for image display, the x-axis electrodes and the y-axis electrodes are driven by the drive circuit to electrically drive the panel so as to display an image. When coordinate detection is performed, a voltage induced at the x-axis electrodes and the y-axis electrodes by an electric field generated from the coordinate pointing device which is provided separately with a function of generating an AC electric field is detected by the coordinate detection circuit which utilizes a change in phase of the signal, thereby allowing the coordinates of the coordinate pointing device to be detected.

In a coordinate detection device of an embodiment, a band-pass filter or a high-pass filter for selectively allowing only a signal at and around the frequency of the AC electric field to pass is connected to an input terminal of the coordinate detection circuit.

Therefore, the coordinate detection circuit can consistently detect a stabilized voltage from the x-axis electrodes and the y-axis electrodes without being influenced by noises.

In a coordinate detection device of an embodiment, an electrode which is provided at the tip end of the coordinate pointing device provided with a function of generating an AC electric field is a coaxial electrode comprised of a center electrode and a peripheral electrode.

Therefore, not depending on which circumferential direction the coordinate pointing device is directed in use, a stabilized voltage can be consistently induced at the x-axis electrodes and the y-axis electrodes.

In a coordinate detection device of an embodiment, the x-axis drive circuit and the y-axis drive circuit for image display use, the coordinate detection circuit, and the image display-coordinate detection changeover circuit are arranged along two or three sides of the peripheries of the display panel.

According to the present embodiment, a coordinate detection function can be incorporated into the image display device without increasing the size of the display device having an LCD panel provided specially for image display, and a display device having a coordinate detection function can be manufactured without making great alterations in the existing manufacturing equipment for the display device. Therefore, according to the present embodiment, there can be provided a coordinate detection device capable of preventing the increase of development cost and the reduction of yield, and dispensing with investment for equipment which may cause cost increase, thereby totally contributing to development of the industry.

As described above, according to the present invention, a signal which is generated by an electric field generated from the electrodes of the coordinate pointing device at the electrodes of the panel coupled through an electrostatic capacitive coupling with the coordinate pointing device is detected. Therefore, according to the present invention, coordinate detection can be achieved even through the ends of the electrodes of the panel are opened.

There has been conventionally utilized an electromagnetic coupling in order to obviate the need of a connection cable, and therefore it has been required to form a loop-shaped circuit composed of panel electrodes of which ends are surely short-circuited. The above is because, in order to detect an induction current based on an inductive electromotive force induced by an effect of a magnetic field, a loop-shaped closed circuit must be formed by surely short-circuiting the ends of the circuit to be subjected to detection. In other words, it has been considered that no induction current flows through the electrodes of which ends are opened and therefore achievement of coordinate detection has been impossible with the above-mentioned arrangement.

In contrast to the above, the inventor and others have proved through experiments described as follows that a voltage can be induced at the electrodes of an LCD panel to allow coordinate detection to be achieved according to the principle of operation utilizing electrostatic capacitive coupling even through the panel electrodes of which ends are opened are used.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 24A, 24B, 24C, 24D and 24E are charts of signal waveforms at several points of the coordinate transformation circuit of the fourth embodiment;

FIG. 31 is a structural drawing of a modification of the electronic pen;

DETAILED DESCRIPTION OF THE PREFERRED EMBODIMENTS

The present invention will be described in detail based on several embodiments thereof with reference to the accompanying drawings.

First embodiment

Figure 1:
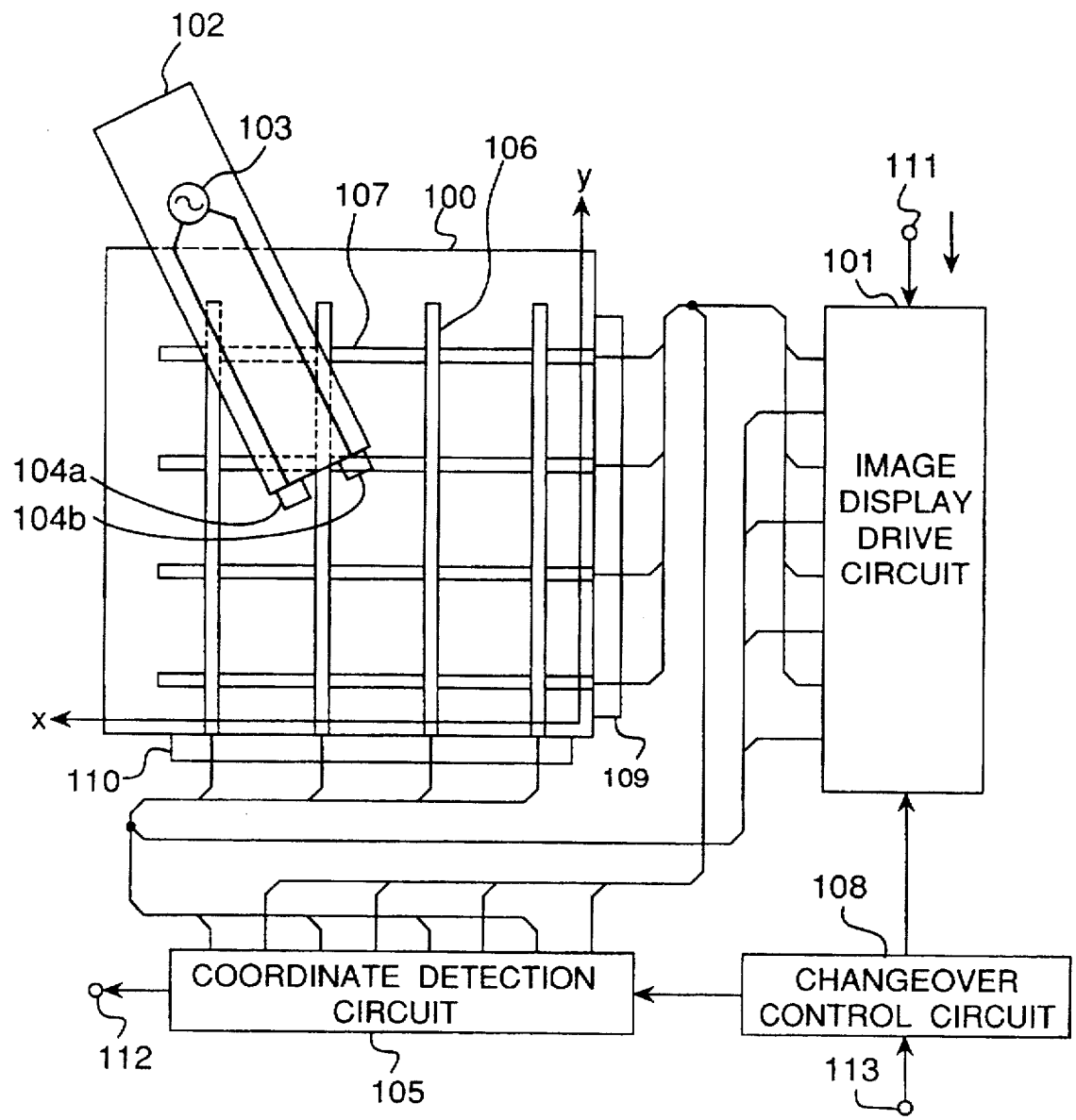
FIG. 1 is an explanatory view of a basic structure of a coordinate detection device according to a first embodiment of the present invention.

First, FIG. 1 shows a dot matrix type duty ratio drive LCD panel as a coordinate detection device according to a first embodiment of the present invention. In the first embodiment, an STN (Supertwisted Nematic) LCD panel 100 is used, however, an active matrix type LCD panel having a TFT (Thin Film Transistor) can be also used.

FIG. 1 shows a basic structure of the first embodiment. For simplicity of explanation, there are shown four pixels in the x-axis direction by four pixels in the y-axis direction. That is, in the first embodiment, a duty ratio drive LCD panel 100 having a total of 16 pixels is used concurrently for image display and coordinate input operations. Of course, a generic LCD panel which has more pixels and availed on the market can be used in utterly the same manner as described above.

As described hereinafter, the LCD panel 100 to be used can be of course implemented by an LCD panel having the same structure as that of the LCD panel provided specially for image display (this point is one of remarkable features of the present invention).

The first embodiment includes an LCD panel 100. The LCD panel 100 is used concurrently for image display and coordinate input operations.

The first embodiment includes an image display drive circuit 101. The image display drive circuit 101 is an additional circuit for making the LCD panel 100 display an image. It is to be noted that the image display drive circuit 101 has a varied structure when the LCD panel 100 is a duty ratio drive TFT type in contrast to the case where the LCD panel 100 is an STN LCD panel.

In the first embodiment, the image display drive circuit 101 drives the LCD panel 100 to make the LCD panel 100 display an image having contents that an operator desires. The above-mentioned function is an image display function.

The first embodiment includes an electric field generator 102. The electric field generator 102 is provided with an AC signal source 103 and electrodes 104a and 104b connected to the AC signal source 103, and the electrodes 104a and 104b generate an AC electric field. In the first embodiment, a function of detecting the coordinates of the electric field generator 102 on the LCD panel 100 is a coordinate detection function. In detail, as shown in FIG. 1, when an x-axis is defined in a lateral direction and a y-axis is defined in a longitudinal direction in an image display section of the LCD panel 100, to detect which position of coordinates (x,y) the electric field generator 102 is located in is the coordinate detection function. In order to achieve the coordinate detection function, the first embodiment has a coordinate detection circuit 105. The coordinate detection circuit 105 has a function such that, when an electric field outputted from the electric field generator 102 effects on a segment electrode 106 and a common electrode 107 on the LCD panel 100, it detects an induction voltage generated at the segment electrode 106 and the common electrode 107 so as to detect the coordinates of the position in which the electric field generator 102 is located.

The first embodiment further includes a function changeover control circuit 108. The function changeover control circuit 108 controls the image display drive circuit 101 and the coordinate detection circuit 105 so that the functions of the LCD panel 100 are used by time-sharingly changing over between the coordinate input function and the image display function.

The LCD panel 100 is connected to the image display drive circuit 101 and the coordinate detection circuit 105 via a connector 109 and a connector 110. To the image display drive circuit 101 is externally supplied an image signal to be displayed via a drive terminal 111. From the coordinate detection circuit 105 is outputted outwardly a coordinate signal through a coordinate output terminal 112. To the function changeover control circuit 108 is supplied a function changeover signal through a terminal 113.

Though not shown, a clock signal and so forth for operating the system are supplied to the first embodiment.

The first embodiment has a basic structure as shown in FIG. 1. The first embodiment achieves both the image display function and the coordinate detection function by using a conventional LCD panel provided specially for image display and newly incorporating a coordinate input function into the LCD panel.

In the first embodiment, the image display function is achieved by the conventional technique without making alterations. The image display function is achieved by the LCD panel 100 and the image display drive circuit 101 shown in FIG. 1. The image display drive circuit 101 takes a variety of forms according to the type or system of the LCD panel 100. For instance, when a duty ratio drive LCD panel is used, the image display drive circuit 101 is provided with a common electrode drive circuit (not shown) and a segment electrode drive circuit (not shown). An operation of the LCD panel 100 when it is driven by the image display drive circuit 101 is utterly the same as that of the LCD panel used popularly. Therefore, no description is provided therefor herein, and a description will be provided at need hereinafter.

Meanwhile, the coordinate input function of the first embodiment includes a feature of the present invention. The first embodiment includes the electric field generator 102 and the coordinate detection circuit 105 to achieve the coordinate input function. An electric field generated from the electric field generator 102 effects on the LCD panel 100 to cause an electrical change (voltage) in the segment electrode 106 and the common electrode 107. Then, the electrical change generated in the electrodes 106 and 107 is detected by the coordinate detection circuit 105. Upon detecting the coordinate position in which the electric field generator 102 is located, the coordinate detection circuit 105 outputs a signal representing the coordinate position from the coordinate output terminal 112. The coordinate position signal outputted from the coordinate output terminal 112 can be used for a variety of purposes such as display of the above-mentioned position on the LCD panel 100.

The first embodiment can be provided with a coordinate input function by incorporating the coordinate detection circuit 105 and the electric field generator 102 into a conventional LCD panel 100 without making alterations in the panel. The coordinate detection circuit 105 and the image display drive circuit 101 are provided with a function changeover switch (not shown, but described in detail hereinafter). Then, the function changeover control circuit 108 controls the operation of the function changeover switch to set a changeover timing. The function changeover control circuit 108 controls the coordinate detection circuit 105 and the image display drive circuit 101 so that the LCD panel 100 time-sharingly executes the coordinate input function and the image display function.

Thus, the basic principle of operation of the first embodiment, i.e., a basic principle of operation of the present invention is as follows. By means of the LCD panel 100 and the electric field generator 102, an electric field generated from the two electrodes 104a and 104b of the electric field generator 102 is effected on the LCD panel 100, and an electrical change (voltage) generated at the time in the segment electrode 106 and the common electrode 107 of the LCD panel 100 is detected by the coordinate detection circuit 105. Meanwhile, a necessary image is displayed on the LCD panel 100 by the image display drive circuit 101, and furthermore the image display and the coordinate input operations are time-sharingly alternately performed under the control of the function changeover control circuit 108.

Figure 2:
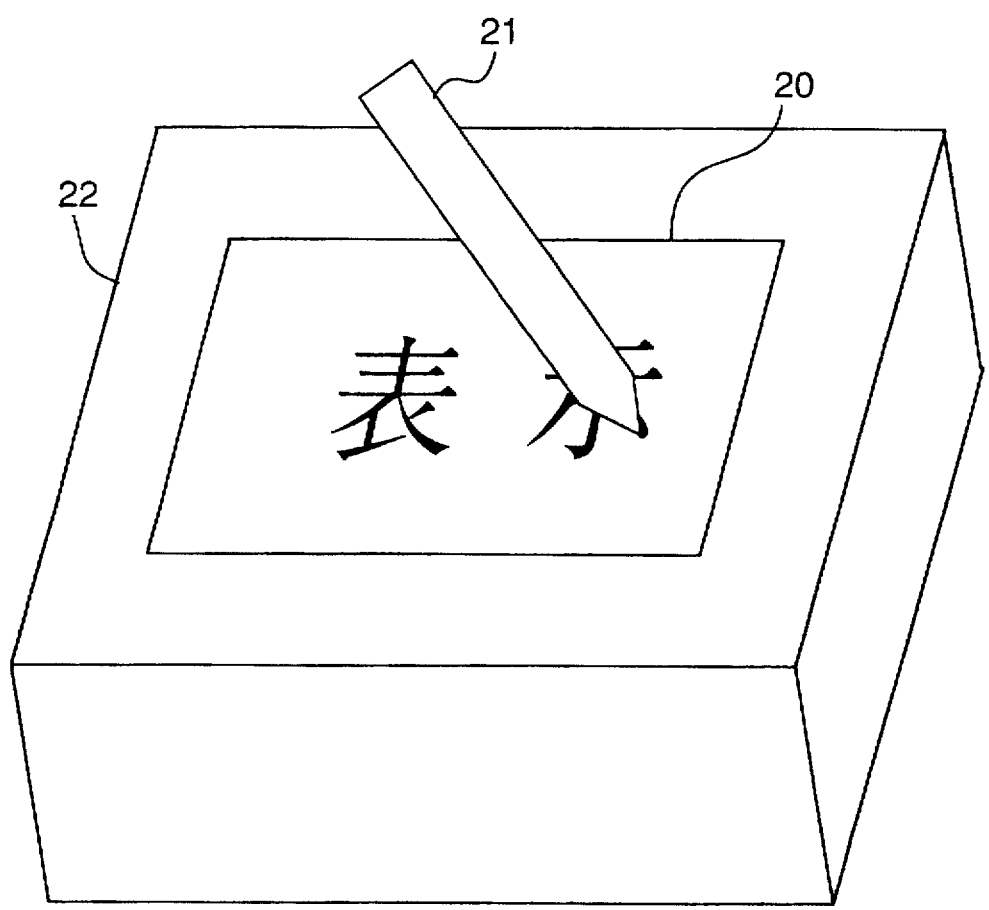
FIG. 2 is an explanatory view of an operation related to the first embodiment.

According to the first embodiment, a basic application example as shown in FIG. 2 can be achieved. The application example has a display panel 20 including the LCD panel 100, the other circuits of the first embodiment, a casing 22 having therein a power supply and so forth, and an electronic pen 21 having therein the electric field generator 102. The present application example is operated in a manner as follows. When an operator holds in his or her hand the electronic pen 21 having therein the electric field generator 102 as if the pen were a writing pen and puts the electronic pen 21 close to the display panel 20 including the LCD panel 100 which serves as an image display panel, an AC electric field is outputted from the electric field generator 102 to effect the AC electric field on the electrodes 106 and 107 of the LCD panel 100. By detecting a voltage generated at the electrodes 106 and 107 by means of the coordinate detection circuit 105, the coordinates of a position in which the electrodes 104a and 104b provided at the tip end of the electric field generator 102 are located can be detected (specified) on the LCD panel 100. Then, the detected coordinates can be displayed on the display panel 20 including the LCD panel 100. For instance, an appropriate mark or a trace of movement of the electronic pen 21 having therein the electric field generator 102 can be displayed on the display panel 20. Therefore, when the operator who is holding the electronic pen 21 in his or her hand writes, for example, Chinese characters of "Hyoji" meaning display on the display panel 20, the characters of "Hyoji" as shown in FIG. 2 can be displayed on the panel.

In the application example shown in FIG. 2, the electric field generator 102 shown in FIG. 1 is incorporated in a pen-shaped electronic pen 21. The electronic pen 21 is of course codeless having no connection cord for connection with the display panel 20, and therefore the electronic pen 21 is completely independent of the display panel 20. According to the application example shown in FIG. 2, when the operator traces the surface of the display panel 20 with the electronic pen 21, the coordinates at the tip end of the electronic pen 21 can be detected. Then, by lighting the above-mentioned coordinates on the display panel 20, the trace of the tip end of the electronic pen 21 can be displayed on the display panel 20. In other words, an image can be written on the display panel 20 as if it were written on a paper sheet.

Figure 29:
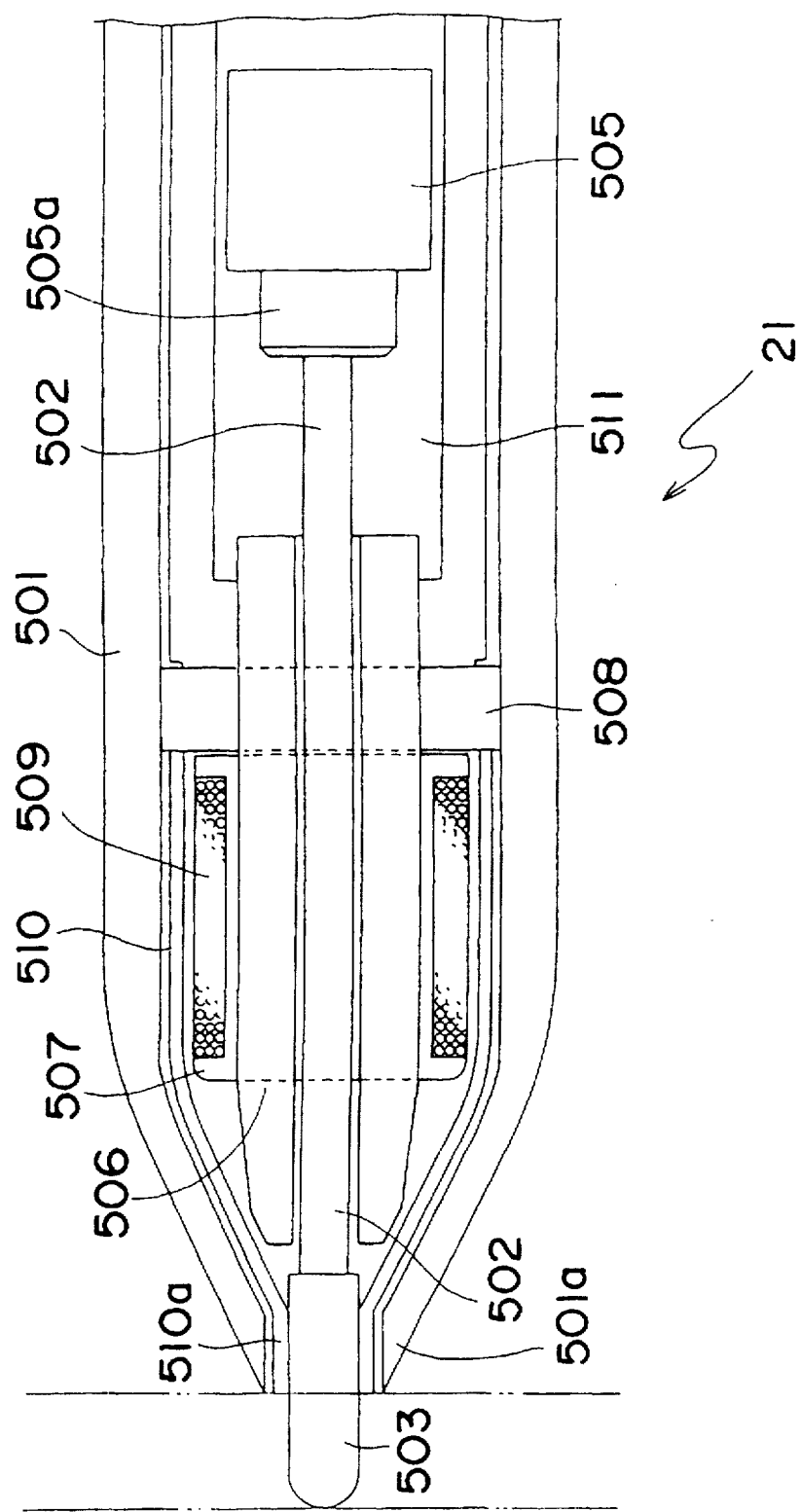
FIG. 29 is a structural drawing showing a mechanical structure of the electronic pen of the embodiment.

A structure of the electronic pen 21 will be described in more detail below. As shown in FIG. 29, the electronic pen 21 includes an outermost cylindrical casing 501 having a tapered fore end portion, a rod-shaped inner electrode 502 arranged in an appropriate center portion of the casing 501, a cap-shaped cover 503 which covers the tip end of the inner electrode 502, and an outer electrode 510. The outer electrode 510 has a cylindrical configuration along an inner peripheral surface of the casing 501, and a hind end portion thereof is fixed to a support member 508 fixed to the inner peripheral surface. A tip end portion 510a of the outer electrode 510 is put in contact with an outer peripheral surface of the cover 503, and the cover 503 can freely slide in the tip end portion 510a of the outer electrode 510.

The cover 503 is protruding from an opening 501a at the tip end of the casing 501. Meanwhile, a hind end of the inner electrode 502 is connected to a movable portion 505a of an operation switch 505. The operation switch 505 is fixed to an electric circuit board 511 screwed to a boss (not shown) formed on the inner peripheral surface of the casing 501. A contact point of the operation switch 505 operates when the inner electrode 502 axially presses the movable portion 505a. When the movable portion 505a is not pressed, the operation switch 505 repels the inner electrode 502 in a direction in which the inner electrode 502 protrudes by an operation of a spring incorporated in the switch so as to hold the inner electrode 502 in a specified position.

A ferrite core 506 which has a tapered cylindrical fore end portion and serves as a core, a bobbin 507 provided around the ferrite core 506 and a coil 509 comprised of an enameled wire wound around the bobbin 507 are arranged around an appropriate axial center of the inner electrode 502. An outer diameter of the ferrite core 506 and an inner diameter of the bobbin 507 are approximately equal to each other, and the bobbin 507 is fixed to the ferrite core 506. The ferrite core 506 and the bobbin 507 are fixed inside the casing 501 by means of the support member 508 adjacent to the bobbin 507. The casing 501 has therein a battery which serves as a power source.

Figure 30:
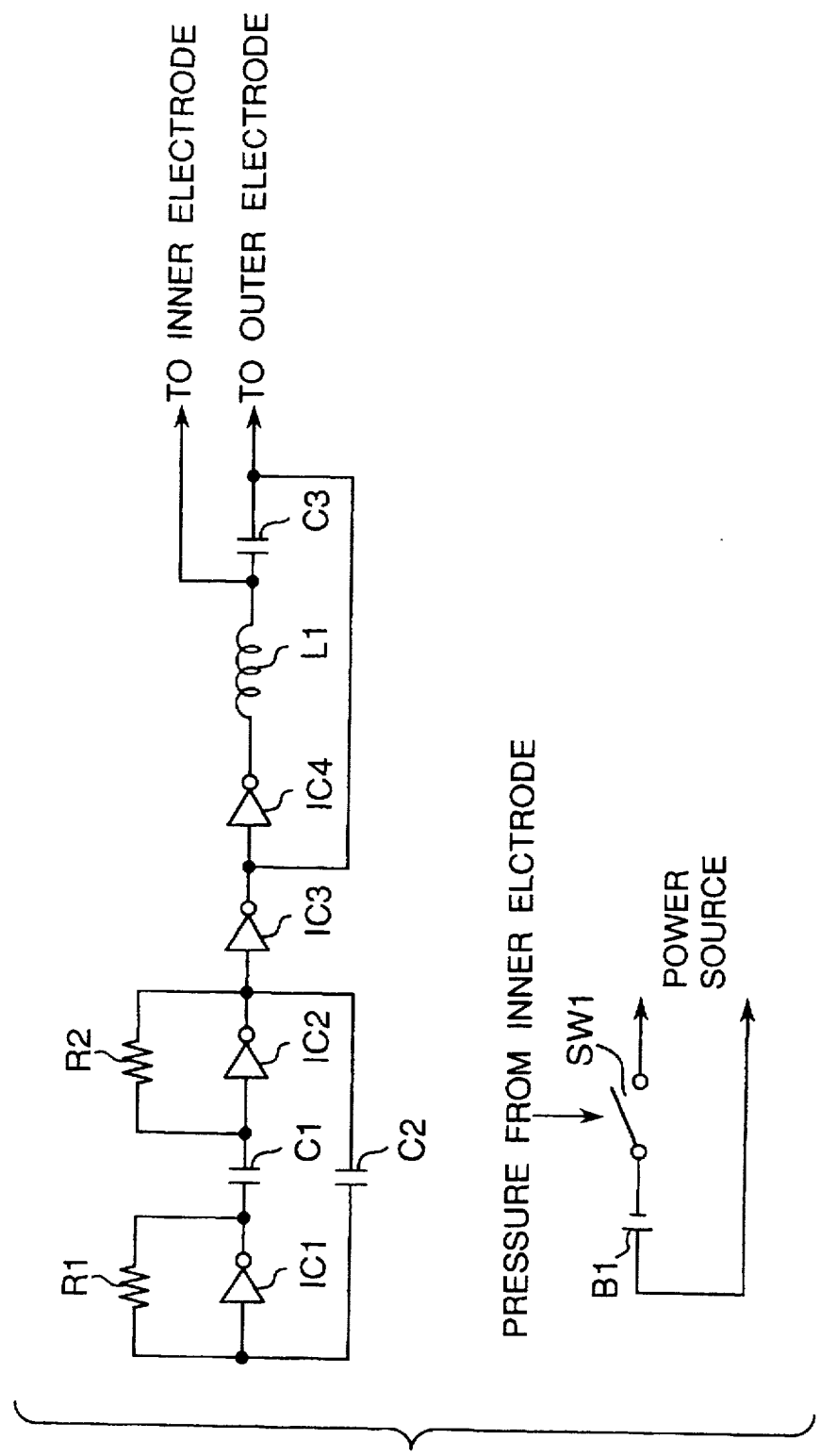
FIG. 30 is an electric equivalent circuit diagram of the electronic pen.

FIG. 30 shows an electric circuit of the electronic pen 21. As shown in FIG. 30, integrated circuits IC1 and IC2, resistors R1 and R2, and capacitors C1 and C2 provided for the electric circuit are constituting a well-known oscillator circuit. An oscillation frequency is determined by a combination of the resistors R1 and R2 and the capacitors C1 and C2. The electric circuit further includes buffer amplifiers IC3 and IC4. The electric circuit further includes a serial resonance circuit comprised of an inductance L1 and a capacitor C3. The resonance circuit resonates at a frequency synchronized with the oscillation frequency of the oscillator circuit. The inductance L1 is implemented by the coil 509.

Further, an electric power is supplied from a battery B1 to the integrated circuits IC1 through IC4. The electric power of the battery B1 is supplied when a switch SW1 comprised of the operation switch 505 is turned on.

Parts constituting the above-mentioned electric circuit are all mounted on the electric circuit board 511 except for the coil L1 (i.e., the coil 509) and the battery B1. As shown in FIG. 30, both terminals of the capacitor C3 are connected to the inner electrode 502 and the outer electrode 510 by way of lead wires.

In the electronic pen 21 having the above-mentioned structure, when the switch SW1 is closed to supply an electric power to the electric circuit to start operating, the oscillator circuit oscillates to supply signals which are opposite in phase to each other to the serial resonance circuit comprised of the inductance L1 and the capacitor C3. Since the resonance frequency of the serial resonance circuit and the oscillation frequency of the oscillator circuit are coinciding with each other, there is generated a voltage Q times as high as an oscillation voltage supplied to the serial resonance circuit. It is to be noted that Q represents a Q-value of the coil 509. Assuming that the Q-value is 20 and the supply voltage is 5 Vp-p, there is generated a voltage of about 100 Vp-p across both the terminals of the capacitor C3. Then the voltage is transmitted to the inner electrode 502 and the outer electrode 510.

Since the operation switch 505 is so constructed that its contact point is closed when pressed by the inner electrode 502, the inner electrode 502 presses the operation switch 505 by its pressure force when the electronic pen 21 is pressed against the surface of the LCD panel 100. With the above-mentioned operation, an electric power is supplied to the integrated circuits IC1 through IC4 provided in the electronic pen 21. In other words, the electronic pen 21 operates only when the electronic pen 21 is pressed against the LCD panel 100, and does not operate in any other time so as to prevent the wasteful consumption of the electricity of the battery B1. The above-mentioned arrangement is effective for prolonging the operating life of the battery B1. The above is because the battery B1 is implemented by a battery such as a disk-shaped button battery having a very small capacity so that the battery can be stored in the thin pen-shaped casing 501.

Next, FIG. 31 shows a structure of an electronic pen 21A provided with a rechargeable battery in place of the above-mentioned battery B1 together with a charging mechanism for the battery. According to the electronic pen 21A, the operating life of the battery can be remarkably prolonged.

Figure 32A:
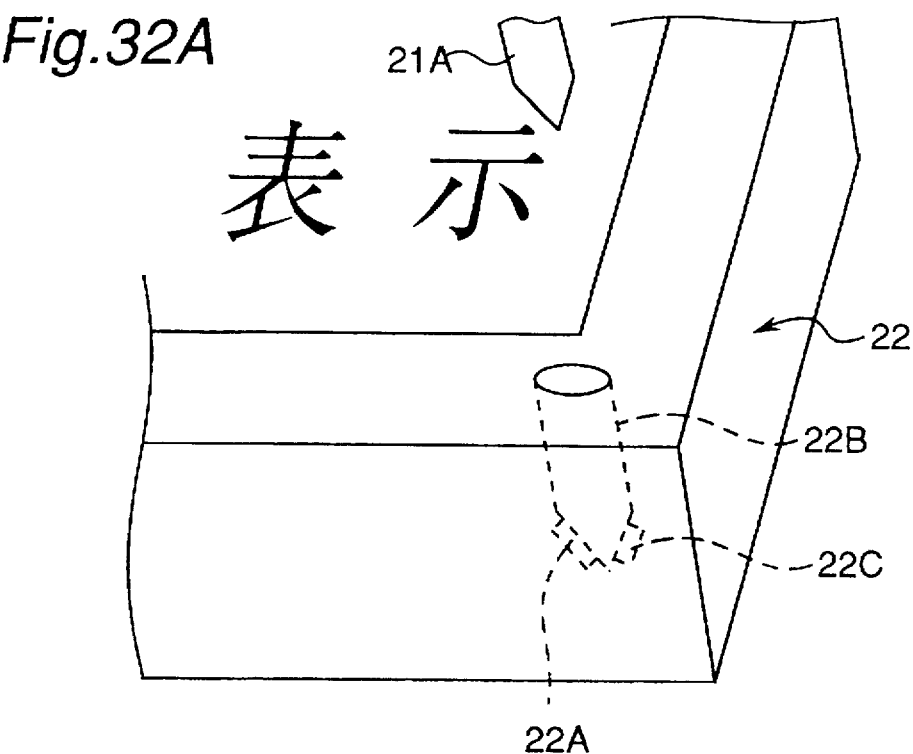
FIGS. 32A and 32B are perspective views for explaining an operation of storing the electronic pen of the modification in a storing portion to charge the electronic pen.
Figure 32B:
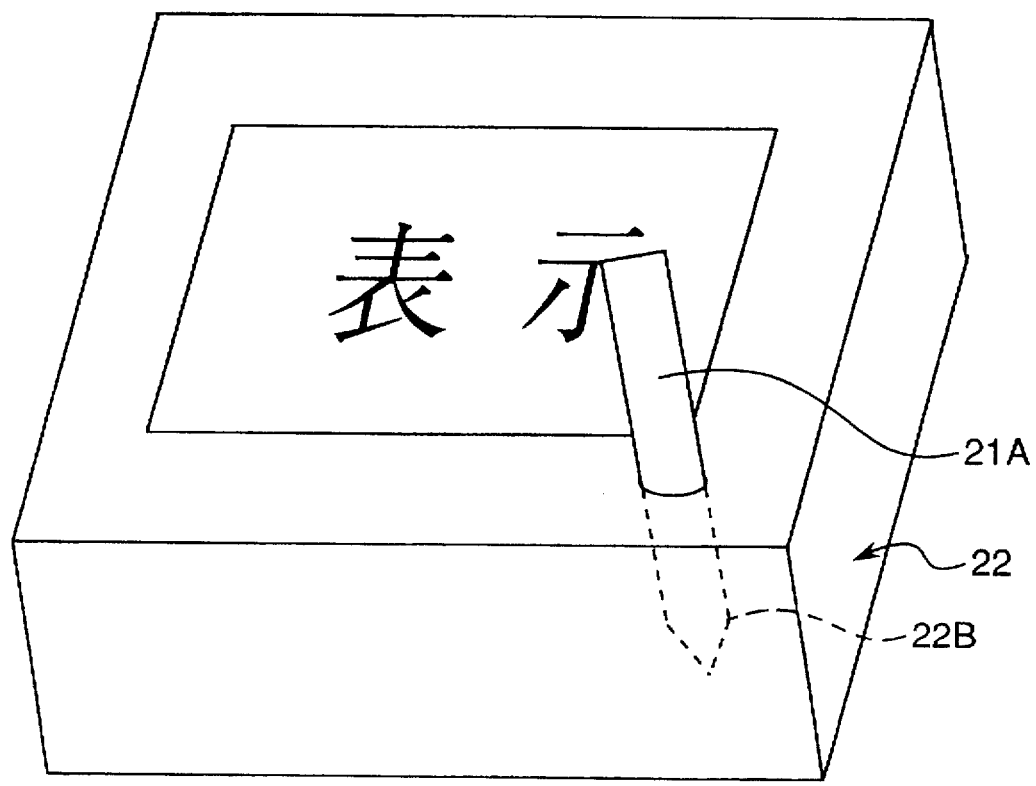

As shown in FIG. 31, the electronic pen 21A further includes charging power supply terminals 620a and 620b for charging the battery B1 at a tip end of a casing 601 constituting the fore end portion of the pen. On the other hand, as shown in FIG. 32A, terminals 22A and 22C for supplying electric power to the electronic pen 21A are provided in a pen storing portion 22B provided in a casing 22 of a word processor or the like. As shown in FIG. 32B, when the electronic pen 21A is not used, the electronic pen 21A is stored in the pen storing portion 22B, thereby allowing the battery B1 of the electronic pen 21A to be automatically charged via the power supply terminals 620a and 620b of the pen 21A when the power supply terminals 620a and 620b are put in contact with the terminals 22A and 22C of the casing 22.

According to the electronic pen 21A, so long as the electronic pen 21A is stored in the above-mentioned specified pen storing portion 22B even when the coordinate detection device is kept unused, the battery B1 is regularly charged. Furthermore, even when the coordinate detection device is used, by storing the electronic pen 21A in the above-mentioned specified pen storing portion 22B while the electronic pen 21A is not used, the battery B1 can be charged. Since the electronic pen 21A operates only when an inner electrode 502 is pressed against the LCD panel 100 similarly to the electronic pen 21, the working power is very small. Furthermore, since the electronic pen 21A can be charged while it is stored in the above-mentioned specified pen storing portion 22B, the quantity of used power can be restored to allow the operating life of the battery to be remarkably prolonged.

It is to be noted that a power source necessary for charging the battery is of course connected to the power supplying terminals 22A and 22C provided in the pen storing portion 22B of the casing 22 of a word processor or the like. It is also acceptable to turn on and off the power source for the charging use by detecting a charge state of the battery from the terminals 22A and 22C.

The power consumption of the electronic pen 21 or 21A is about 2 mW. In contrast to the above, when a transmitter is provided in the pen, at least an oscillator and a modulator are necessary, and therefore the power consumption is about 10 mW.

Next, a principle of operation of detecting the coordinates of the electrodes 104a and 104b at the tip end of the electric field generator 102 in the first embodiment of the present invention shown in FIG. 1 will be described.

The principle of operation of coordinate detection in the first embodiment is basically as follows. Electric fields generated from the electrodes 104a and 104b of the electric field generator 102 are effected on the segment electrode 106 and the common electrode 107 of the LCD panel 100 to couple the electrodes 104a and 104b of the electric field generator 102 with the segment electrode 106 and the common electrode 107 of the LCD panel 100 through an electrostatic capacitive coupling. Then an induction voltage generated at the segment electrode 106 and the common electrode 107 is detected.

Therefore, according to the first embodiment which does not necessitate a connection cord extending from the electric field generator 102 to the LCD panel 100, the electric field generator 102 can be easily handled in contrast to the first prior art which indispensably necessitates a connection cable for connecting the pen with the panel. Furthermore, according to the first embodiment, there is no need to make alterations in the LCD panel itself in contrast to the second prior art which requires formation of loops in the LCD panel.

Thus, according to the first embodiment, the problem of the second prior art which adopts a system taking advantage of a magnetic coupling for the purpose of eliminating the connection cable from the electronic pen (the problem that a loop-shaped coil is required to be formed by short-circuiting the ends of the electrodes of the LCD panel in the coordinate detection stage) can be solved.

The first embodiment can detect the coordinates of the pen without necessitating neither the loop-shaped coil of which ends are short-circuited nor the connection cable. Therefore, a structure simpler than that of any prior art can be achieved, and the pen for coordinate input use can be easily handled.

Figure 3:
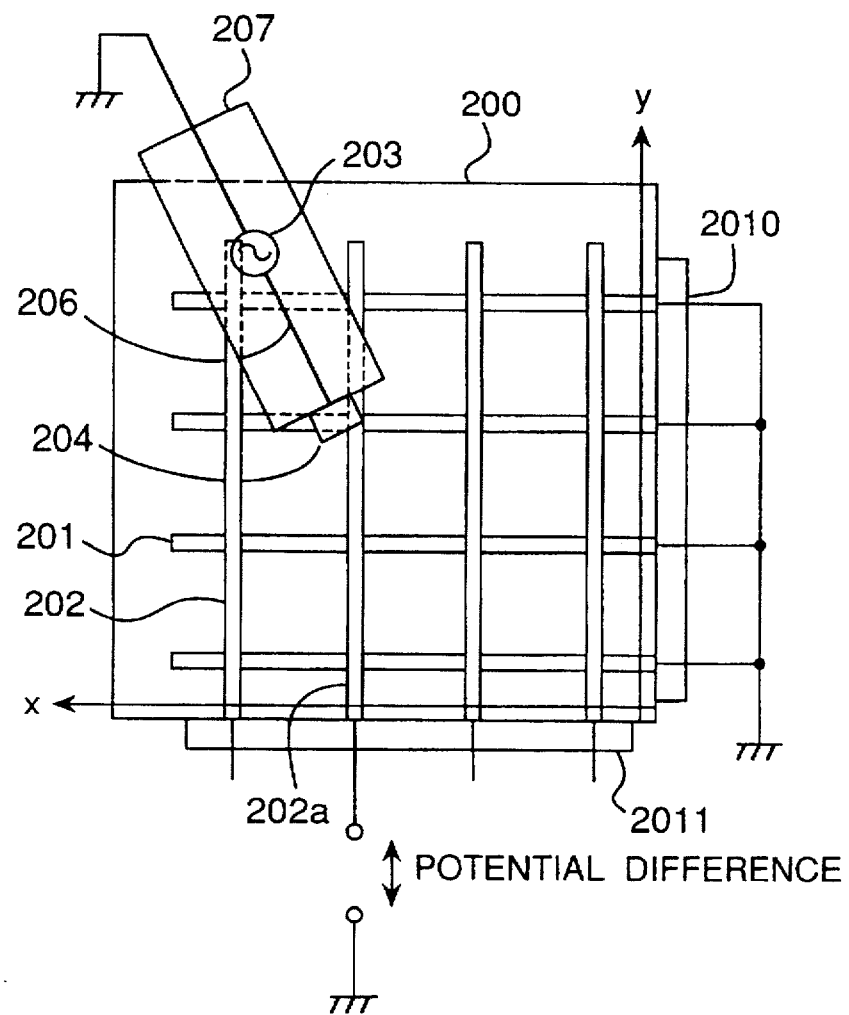
FIG. 3 is an explanatory view of a fundamental experiment relevant to the first embodiment performed by the inventor and others.

Next, a fundamental experiment conducted by the inventor and others will be described with reference to FIG. 3. In FIG. 3, an LCD panel 200 is a dot matrix type duty ratio drive LCD panel using STN liquid crystals. A display section of the LCD panel 200 has a lateral dimension× longitudinal dimension of 230 mm×140 mm. For simplicity, there are shown only four common electrodes 201 and four segment electrodes 202 in FIG. 3, however, there are practically included laterally 640 pixels×longitudinally 480 pixels in the above-mentioned display section. A pixel pitch is about 360 μm, while a width of each electrode is about 330 μm. Further, each of transparent electrodes constituting the common electrodes 201 and the segment electrodes 202 has a thickness of about 1 μm.

Two glass plates (not shown) owned by the LCD panel 200 are arranged as separated apart from each other by a gap of about 7 μm, and a liquid crystal material is interposed between the two glass plates.

The common electrodes 201 and the segment electrodes 202 are connected to peripheral circuits via a connector 2010 and a connector 2011 provided on the glass plates constituting the LCD panel 200.

One end of the common electrodes 201 (extending laterally) owned by the LCD panel 200 is collectively connected to a ground. Meanwhile, one end of the segment electrodes 202 (extending longitudinally) is entirely opened.

An AC power source 203 provided in the electric field generator 207 has its one output terminal connected to the ground, and the other output terminal 206 of the AC power source 203 is connected to a tip electrode 204. Therefore, the electric field generator 207 and the common electrodes 201 of the LCD panel 200 are electrically connected to each other through the ground.

An output frequency of the AC power source 203 was set at 100 kHz. A voltage at the output terminal 206 of the AC power source 203 was 20 Vp-p.

When the electric field generator 207 is put close to the LCD panel 200, an intense electric field was generated across the electrode 204 of the electric field generator 207 and the segment electrode 202a of the LCD panel 200.

When the electrode 204 of the electric field generator 207 is put close to the LCD panel 200, a potential difference took place across the segment electrode 202a to which the electrode 204 is put close among the segment electrodes 202 and the ground. The potential difference was a sort of alternating current and its frequency coincided with the frequency of the AC power source 203.

Figure 4:
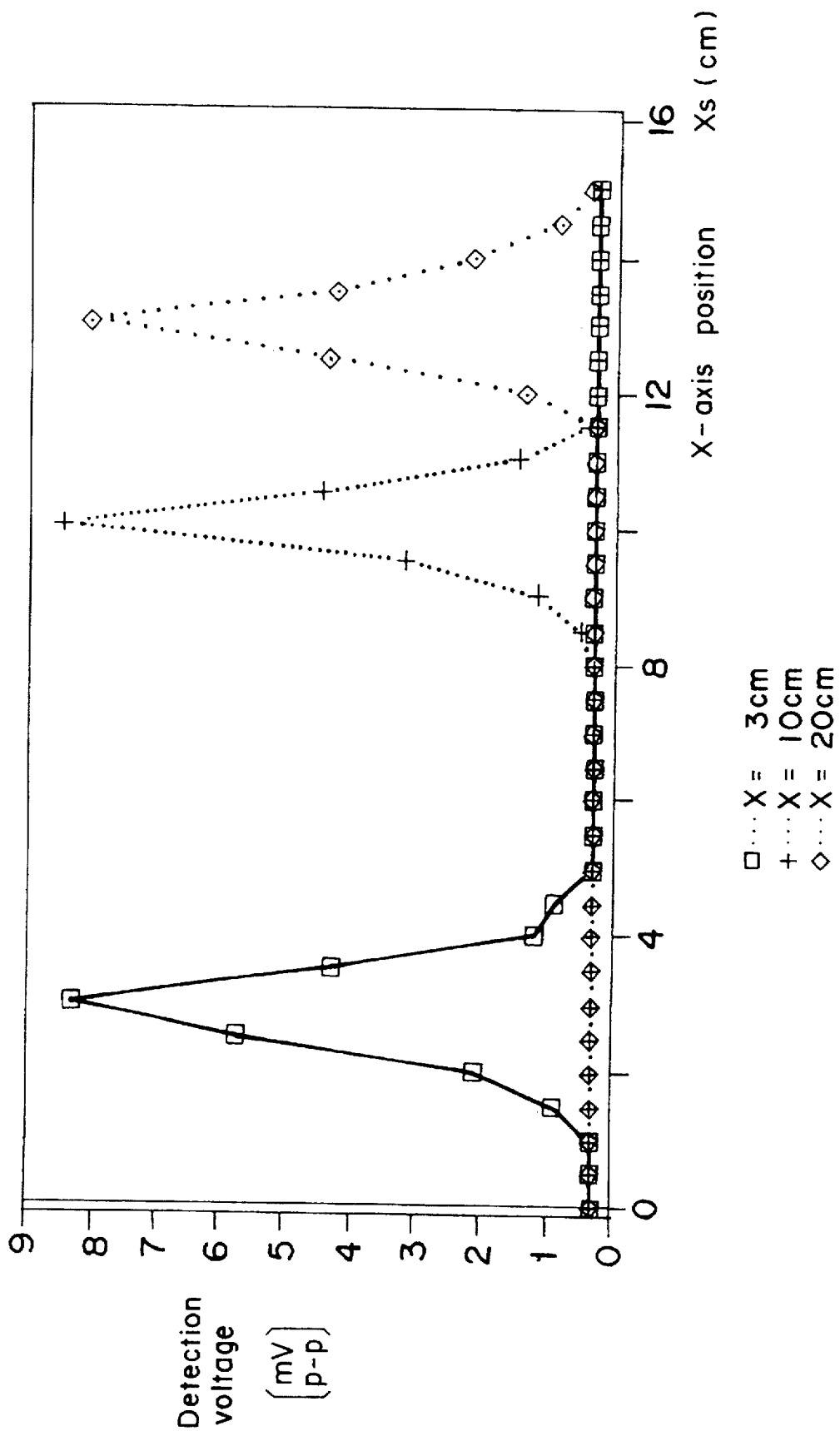
FIG. 4 is a graph showing a result of the fundamental experiment.

With an x-axis and a y-axis set in a manner as shown in FIG. 3 and the electrode 204 placed at each of coordinates of (x,y)=(3,5)[cm], (x,y)=(10,5)[cm], and (x,y)=(13,5)[cm], it was actually measured how much degree of potential difference was generated across the segment electrode 202 located in a position of xs=0 to 16 cm and the ground. A result of the measurement is shown in FIG. 4. The axis of ordinates of FIG. 4 represents a measured AC potential difference. The frequency of the measured alternating current coincided with the frequency of the AC power source 203.

Referring to FIG. 3, it can be understood that a detected potential difference across the ground and the segment electrode 202 takes its peak value at the segment electrode 202a located just below the electrode 204 of the electric field generator 207. Furthermore, it can be understood that the detected potential difference abruptly reduces according as the measurement point is apart from the x-coordinate position where the peak exists. Furthermore, the reduction of the potential difference at and around the peak is very steep, however, the reduction of the potential difference becomes gradual according as the measurement point is apart from the peak position. The above-mentioned tendency can be observed at the three points (x=3 cm, 10 cm, 13 cm) at which the electrode 204 of the electric field generator 207 is located, meaning that substantially same tendency is observed regardless of the x-coordinate position.

Since the detected potential difference depends on the position of the electrode 204 of the electric field generator 207, the potential difference can be considered to be a signal representing the position of the electrode 204. Therefore, by detecting the peak position Xs |cm| of the maximum point (peak) of the peak-shaped potential difference signal while observing a variation in amplitude of the detected potential difference signal, the x-coordinate value of the position in which the electrode 204 of the electric field generator 207 is located can be ascertained.

In the above-mentioned experiment, the potential difference across the segment electrodes 202 and the ground is detected with the common electrodes 201 all connected to the ground. However, a potential difference across the common electrodes 201 and the ground can be also detected with the segment electrodes 202 all connected to the ground. Though a detection result is not shown, a peak characteristic similar to that shown in FIG. 4 can be obtained in the present case.

In the experiment shown in FIG. 3, a potential difference signal having a peak at and around the segment electrode 202 located in the position of the electrode 204 of the electric field generator was able to be detected. Then, the coordinate at which the peak exists was the x-coordinate value of the position in which the electrode 204 of the electric field generator 207 is located. Then, in a manner similar to the above, the y-coordinate value of the position in which the electrode 204 is located can be detected on the common electrode 201 side similarly to the experiment performed on the segment electrode 202 side. Therefore, the coordinates (x,y) of the electrode 204 can be specified.

As shown in the above-mentioned experiment, a potential difference signal depending on the position of the electrode 204 of the electric field generator 207 can be detected without specifically forming a loop by connecting the ends of the segment electrodes 202 or the common electrodes 201 of the LCD panel 200. Therefore, it was discovered that the position of the electrode 204 of the electric field generator 207 on the LCD panel 200 can be specified taking advantage of the above-mentioned arrangement without forming any loop by connecting the ends of the common electrodes 201 or the segment electrodes 202 of the LCD panel 200. In other words, it can be said that the result of the above-mentioned experiment can be applied to a coordinate detection device.

Figure 5:
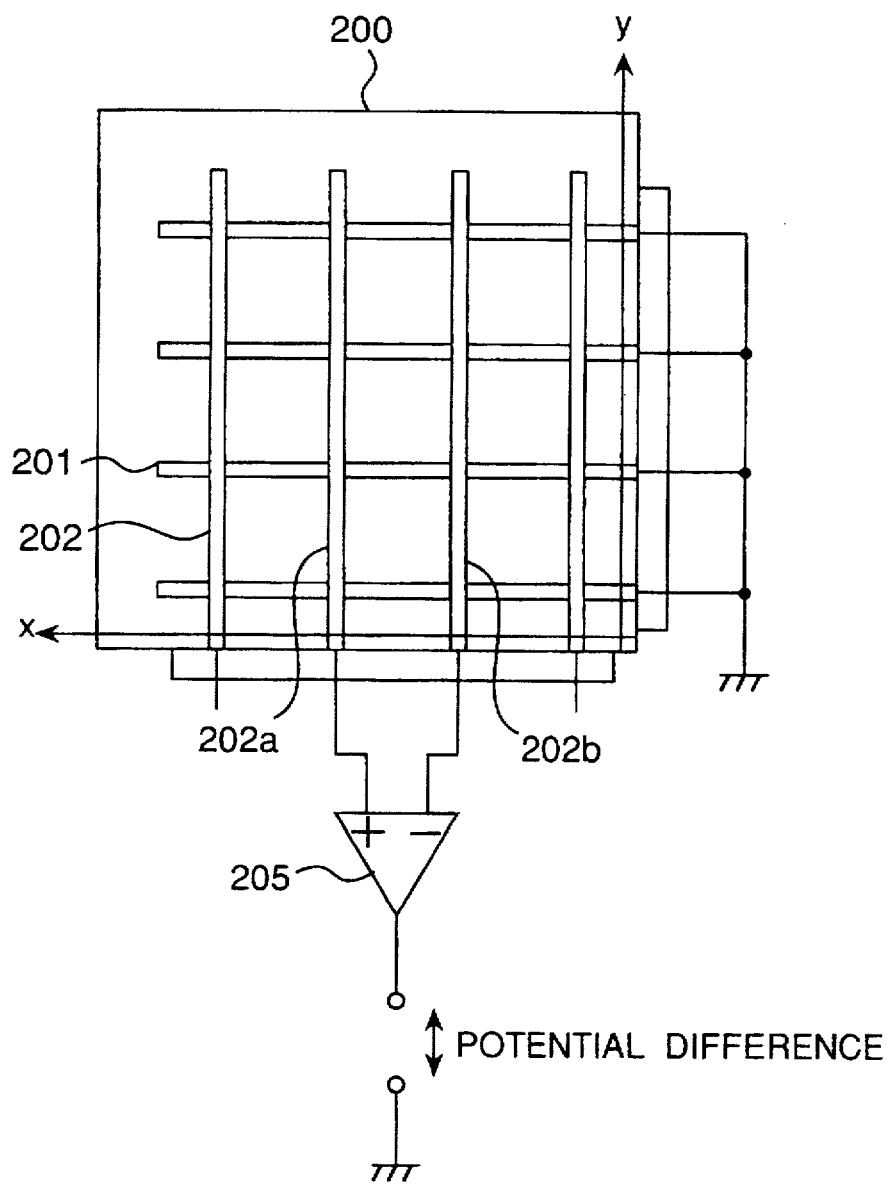
FIG. 5 is an explanatory view of a second experiment relevant to the first embodiment performed by the inventor and others.

Based on the above-mentioned experiment, the inventor and others further performed an experiment as shown in FIG. 5. In the experiment, the common electrodes 201 are all connected to the ground, while adjoining two segment electrodes 202a and 202b of the segment electrodes 202 are paired to be connected to a positive input terminal and a negative input terminal of the differential amplifier 205 similarly to the experiment shown in FIG. 3. The same LCD panel as the LCD panel 200 used in the experiment of FIG. 3 was used (for simplicity, only eight electrodes are shown).

Figure 6A:
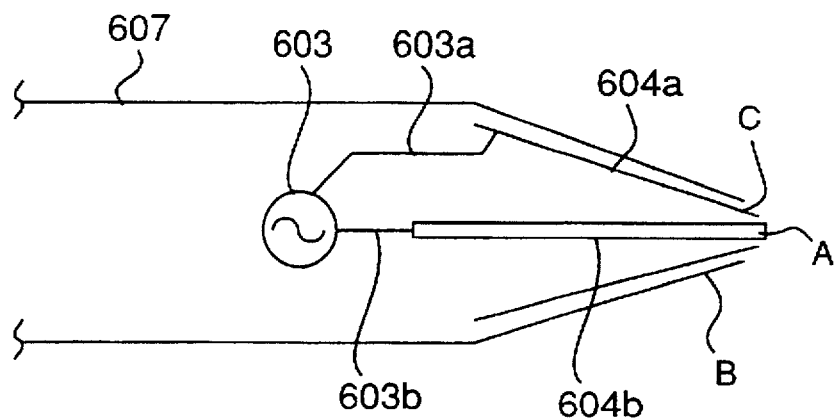
FIGS. 6A and 6B are explanatory views of structures of an electronic pen (electric field generator) of the first embodiment.

In the above place, an electric field generator 607 as shown in FIG. 6A was prepared, and when a tip end of the electric field generator 607 is put close to the segment electrodes 202a and 202b connected to the differential amplifier 205, it was measured what sort of voltage was obtained. The electric field generator 607 differs from the electric field generator 207 shown in FIG. 3 in that it is not connected to the ground.

Figure 6B:
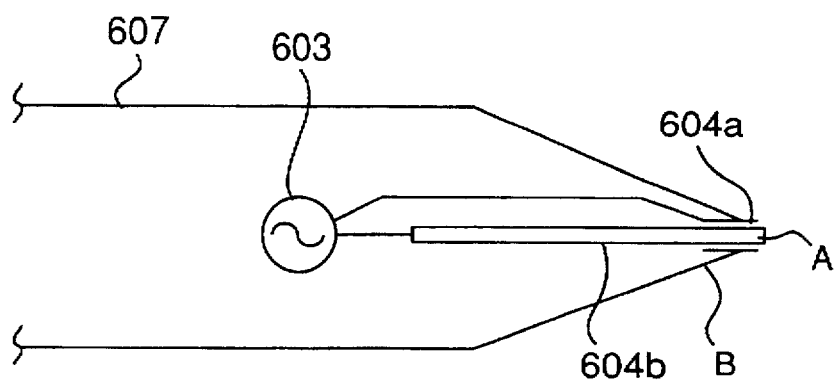

FIGS. 6A and 6B show structures of the electric field generator 607 used for the experiment. The electric field generator 607 has therein an AC power source 603, and both output terminals 603a and 603b of the AC power source 603 are connected to a rod-shaped inner electrode 604b and a megaphone-shaped outer electrode 604a arranged coaxially with the inner electrode 604b. An AC frequency generated by the AC power source 603 is 100 kHz, and an AC voltage outputted across the electrode 604a and the electrode 604b is 100 Vp-p.

A structure of the electric field generator 607 will be described in detail below. As shown in FIG. 6A, the electric field generator 607 has a structure in which both the output terminals of the AC power source 603 are connected to the outer electrode 604a and the inner electrode 604b of the coaxial electrode.

The structure of the outer electrode 604a of the coaxial electrode is allowed to have a tapered configuration as shown in FIG. 6A or a complete coaxial structure in which only a portion of the outer electrode 604a inside a tip end portion B of the body of the electric field generator 607 surrounds the inner electrode 604b as shown in FIG. 6B. Although FIGS. 6A and 6B show no support member for supporting the electrodes, the outer electrode 604a and the inner electrode 604b are fixed to the body of the electric field generator 607. Though not shown in FIGS. 6A and 6B, the AC power source 603 also includes a switch and so forth other than a power source such as a battery. The reason why the outer electrode 604a and the inner electrode 604b constitute the specific configuration of the coaxial electrode will be described below. The embodiment of the present invention is to operate so as to specify the position of the electric field generator by detecting on the LCD panel side an electrical change given from the electric field generator to the electrodes of the LCD panel through an electrostatic capacitive coupling between the electric field generator and the electrodes of the LCD panel. The electric field generator is generally stored in a cylindrical pen-shaped casing as shown in FIG. 2. The electric field generator having such a cylindrical pen-shaped exterior configuration tends to roll. The above-mentioned fact conversely produces an advantageous effect of allowing the electric field generator to be easily handled from the standpoint of the operator because it can be handled similarly to an ordinary writing pen. In another aspect, from a standpoint that an electrostatic capacitive coupling between the electric field generator and the electrodes of the LCD panel is used as the principle of operation of the embodiment of the present invention, it is indispensable to make the pen have a structure in which the electrostatic capacitive coupling does not change regardless of the rolling of the pen. That is because the electric field generator has the specific configuration of the coaxial electrode. In other words, so long as the coaxial electrode configuration is assured, not depending on the direction and angle of the pen-shaped object in which the electric field generator is incorporated, the electric field generator is consistently coupled with the electrodes of the LCD panel through an electrostatic capacitive coupling, and the electrical change to be applied can be made constant.

Dimensions of a tip end portion A constituted by the coaxial electrodes 604a and 604b shown in FIGS. 6A and 6B are determined depending on the electrode dimensions of the LCD panel used, depending on how many electrodes, for determining an electrode pitch, of the LCD panel are connected to the differential amplifier, and depending on other factors. For instance, when the electrode pitch of a generic LCD panel is 100 μm to 300 μm and adjoining two electrodes are connected to two input terminals of the differential amplifier, a distance between the tip end of the inner electrode 604b and the outer electrode 604a is set to 100 μm approximately equal to the electrode pitch. When two or three electrodes are existing between the two electrodes of the LCD panels connected to the differential amplifier, the distance between the inner electrode 604b and the outer electrode 604a is preferably set to about 1 mm.

It is required to properly determine a radius of a tip end portion C of the outer electrode 604a and properly process the configuration of the tip end portion A of the inner electrode 604b. For instance, the tip end portion A is preferably processed to have a sharp tip end configuration.

Figure 26:
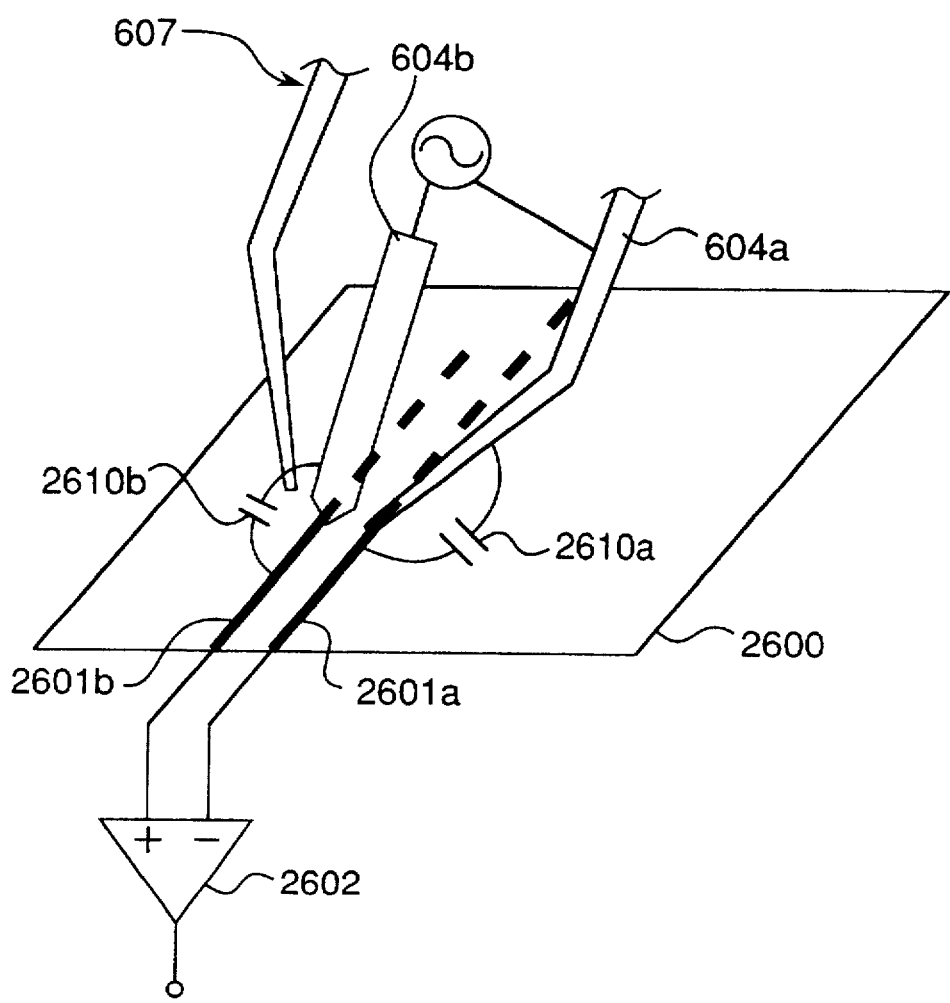
FIG. 26 is a view for simply explaining an interaction between electrodes of an electronic pen which serves as an electric field generator of the first and second embodiments of the present invention and electrodes of an LCD panel.

In the case of the electric field generator 607 having the above-mentioned structure, in a manner as shown in FIG. 26, when electrodes 2601a and 2601b provided in an LCD panel 2600 are connected to a differential amplifier 2602, the coaxial electrode comprised of the electrodes 604a and 604b of the electric field generator 607 can be placed in a position just above the electrodes 2601a and 2601b of the LCD panel 2600. In the above case, as shown in FIG. 26, the outer electrode 604a and the inner electrode 604b are coupled most intensely with the electrodes 2601a and 2601b via capacitors 2610a and 2610b.

In the above place, electric fields applied to the outer electrodes 604a and 604b are opposite in phase to each other, and the electrodes 2601a and 2601b are also connected to the input terminals, which are opposite in phase to each other, of a differential amplifier 2602. Therefore, an output can be taken out most efficiently from the differential amplifier 2602 via the capacitors 2610a and 2610b.

Figure 27:
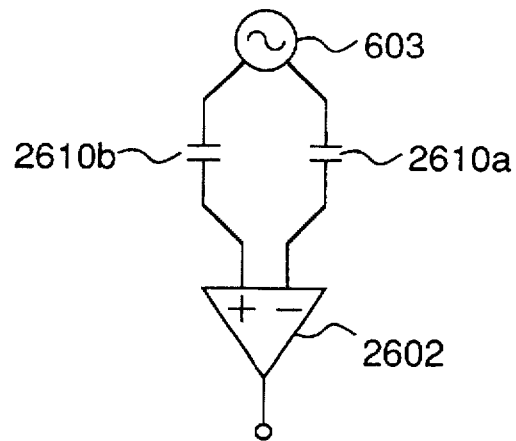
FIG. 27 is an electric equivalent circuit diagram of the structure shown in FIG. 26.

An electric equivalent circuit corresponding to the arrangement of FIG. 26 is shown in FIG. 27. As shown in FIG. 27, the AC power source 603 included in the electric field generator 607 is connected to the differential amplifier 2602 via the capacitors 2610a and 2610b.

Figure 28:
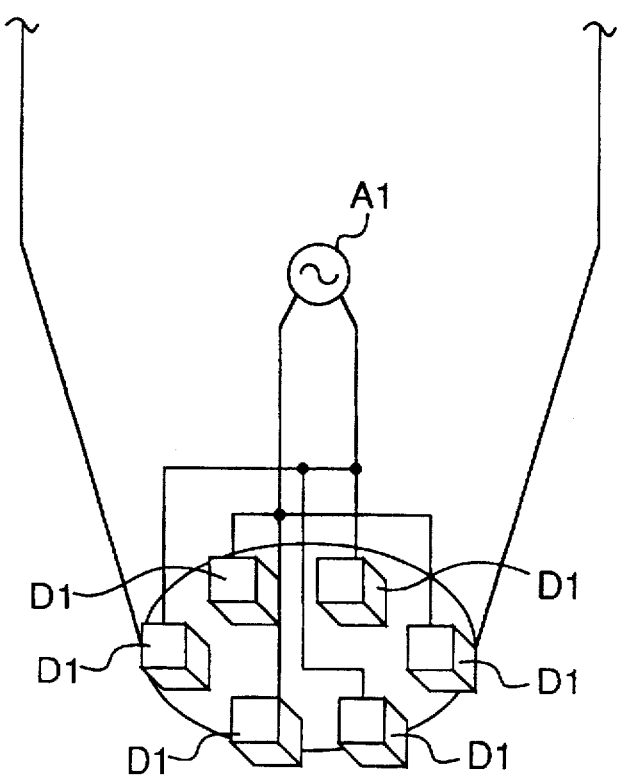
FIG. 28 is a schematic view of a structure of a modification of the electronic pen of the embodiment.

The electrode structure of the electric field generator 607 may have a structure as shown in FIG. 28 instead of the coaxial structure shown in FIG. 26. In the electrode structure, a plurality of electrodes D1 are mounted on a circumference of the tip end portion of the pen, and the electrodes D1 are connected to an AC power source A1 so that a rotational electric field is generated on the circumference. According to the above-mentioned structure, there is produced an effect that, even though the pen which serves as the electric field generator rolls, the electrostatic capacity between the electrodes of the pen and the electrodes of the panel do not change similarly to the electric field generator shown in FIG. 26.

Figure 7:
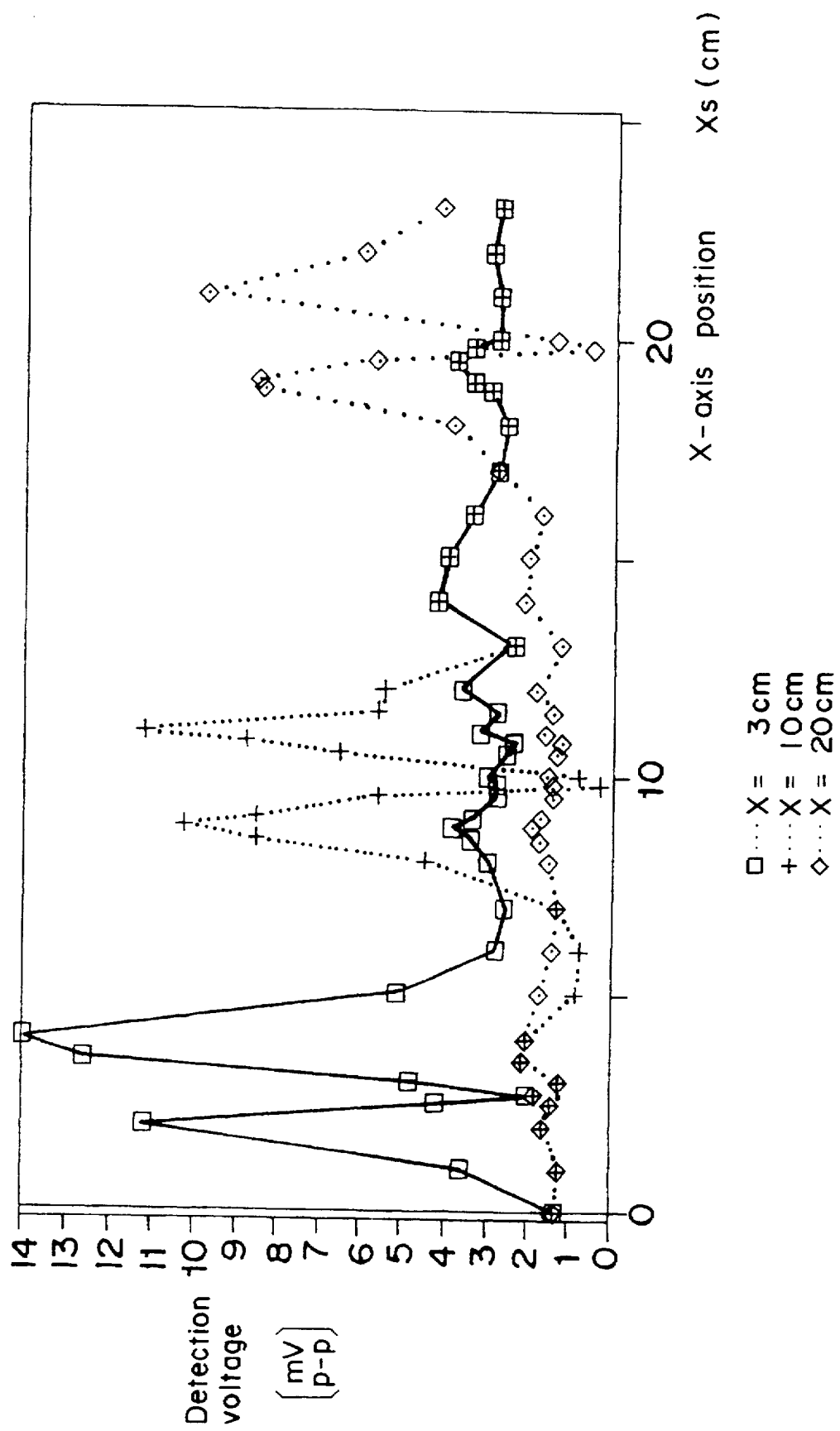
FIG. 7 is a graph showing a result of the experiment shown in FIG. 5.
Figure 37:
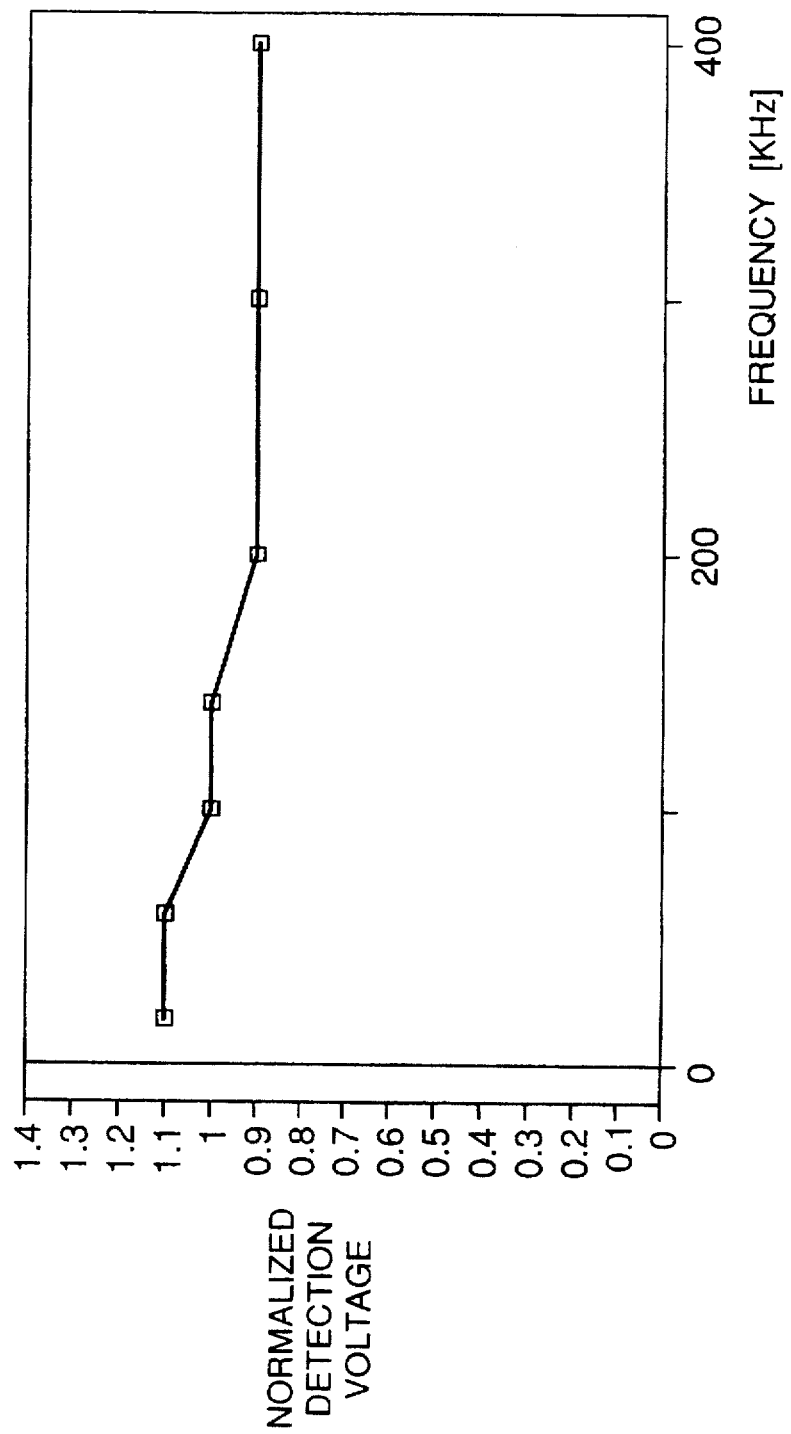
FIG. 37 is a graph showing a frequency characteristic of the experiment related to the first embodiment.

Then, a result of an experiment shown in FIG. 5 performed by means of the electric field generator 607 is shown in FIG. 7. FIG. 7 shows a potential difference measured at the frequency of the AC power source 603. FIG. 37 shows a frequency characteristic of a detection voltage obtained through normalization with a peak-to-peak value of the detection voltage set to 1 when the AC frequency is 100 kHz. According as the frequency is increased in order of 20 kHz, 60 kHz, 140 kHz, 200 kHz, 300 kHz, and 400 kHz, the detection voltage tends to decrease, however, it can be substantially ignored.

The experiment result shown in FIG. 7 differs from the experiment result shown in FIG. 4 in that the detected voltage is a double-humped output. Then, the x-coordinate value of the bottom portion of the double-humped output represents the x-coordinate value of the position in which the electrodes 604a and 604b at the tip end of the electric field generator 607 are located. Furthermore, though not shown in FIG. 7, the detected AC potential difference exhibited a phase difference of 180° between both sides of the minimum point (bottom portion), i.e., between bilateral peaks located on the right and left sides of the minimum point.

In the experiment shown in FIG. 7, a potential difference across a pair of adjoining segment electrodes 202 was detected by connecting the pair of segment electrodes 202 to the differential amplifier 205 with the common electrodes 201 shown in FIG. 5 all connected to the ground. However, conversely a potential difference across a pair of adjoining common electrodes 201 can be detected by connecting the pair of common electrodes 201 to the differential amplifier 205 with the segment electrodes 202 all connected to the ground. Therefore, a y-coordinate value of the electrodes 604a and 604b of the electric field generator 607 can be obtained similarly to the experiment shown in FIG. 3. That is, by performing two times similar detection operations from the segment electrode side and from the common electrode side so as to detect and decide the coordinates of the bottom portion of each double-humped output obtained, the coordinates of the bottom portion correspond to the coordinates of the position in which the electrodes 604a and 604b are located. Therefore, the coordinates (x,y) of the position in which the electrodes 604a and 604b of the electric field generator 607 are located can be specified.

Although the electric field generator corresponding to the electric field generator 102 shown in FIG. 1 is provided with an AC power source in the aforementioned two experiments, a combination of a Peltier device and an LC parallel circuit or a serial resonance circuit may be provided in place of the AC power source. What is essential is the structure in which the electric field generator is capable of generating an AC electric field.

Although the segment electrodes are connected to the ground in the aforementioned two experiments, the segment electrodes may be connected to nothing as opened instead of being connected to the ground. However, taking into account influence of external noises, the segment electrodes are preferably connected to something having a reference potential. Further, a specified voltage may be of course superimposed on the segment electrodes via a capacitor or the like.

Based on the results of the above-mentioned two experiments, the inventor proposes the present invention by integrating the experiment results with the conventional techniques of the LCD devices which have been provided specially for image display.

Based on the above description, the first embodiment of the present invention will be described in more detail below. Since the image display function of the present invention is quite the same as those of the LCD techniques used conventionally, a coordinate input function will be particularly described in detail.

The basic structure of the first embodiment is as shown in FIG. 1, and is related to all the embodiments. According to the present invention, the LCD panel 100 may have an electrode structure of a generic STN LCD panel, and the present invention can be also applied to an electrode structure of an STN panel having an improved display capacity as in a second embodiment described hereinafter. Furthermore, the present invention can be also applied to an LCD panel having an electrode structure of a TFT panel as in a third embodiment described hereinafter.

Figure 8:
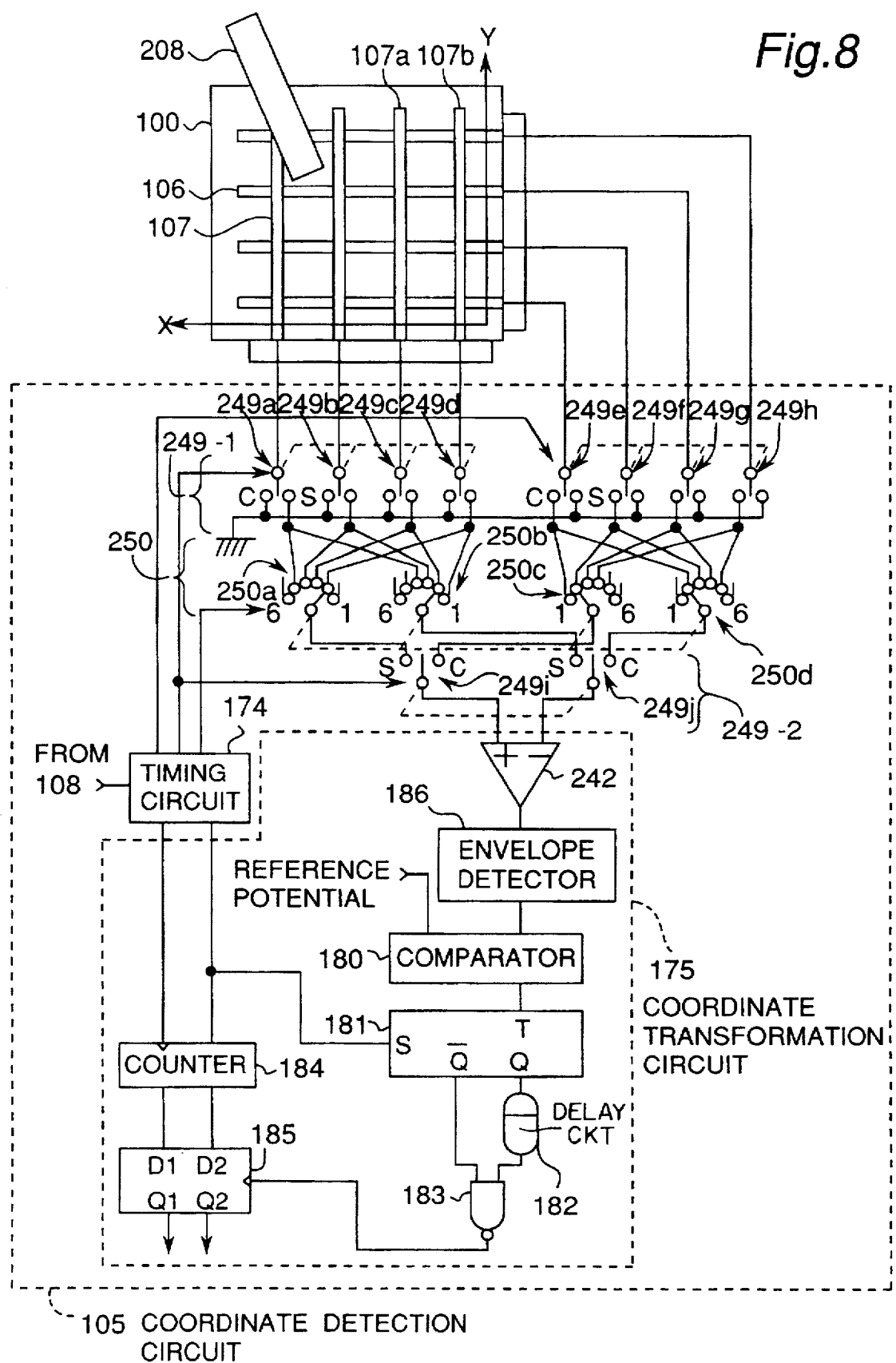
FIG. 8 is an explanatory view of a structure of the first embodiment.

FIG. 8 shows in detail a structure of the coordinate detection circuit 105 provided in the aforementioned first embodiment. It is to be noted that the image display drive circuit 101 and the function changeover control circuit 108 shown in FIG. 1 are not shown in FIG. 8. The image display drive circuit 101 and the function changeover control circuit 108 will be described hereinafter.

Furthermore, the electric field generator 102 shown in FIG. 1 is denoted as an electric field generator 208 in FIG. 8. The electric field generator 208 is provided with the structure shown in FIG. 6 as described hereinbefore.

As shown in FIG. 8, a reference numeral 100 denotes an LCD panel, and the LCD panel 100 has common electrodes 106 and segment electrodes 107. In particular, segment electrodes 107a and 107b constitute a segment electrode pair comprised of two adjoining electrodes of which one end is opened and the other end is electrically connected to a differential amplifier 242 via a first switch circuit group 249-1 and a second switch circuit group 250. The above-mentioned structure is the basic structure of the first embodiment.

As shown in FIG. 8, the coordinate detection circuit 105 includes the first switch circuit group 249-1, the second switch circuit group 250, a third switch circuit 249-2, a coordinate transformation circuit 175 and a timing control circuit 174. The first switch circuit group 249-1 includes switch circuits 249a, 249b, 249c, 249d, 249e, 249f, 249g and 249h. The second switch circuit group 250 includes switch circuits 250a, 250b, 250c and 250d. The third switch circuit 249-2 includes switch circuits 249i and 249j.

The first, second and third switch circuit groups 249-1, 250, and 249-2 transmit a signal detected from each of the segment electrodes 107 and the common electrodes 106 of the LCD panel 100 to the differential amplifier 242 in the first stage provided in the coordinate transformation circuit 175 by properly switching in a manner as described hereinafter. In the present case, among a plurality of segment electrodes 107 and common electrodes 106 owned by the LCD panel 100, the electrode to which the electric field generator 208 is put close and electrodes around it yield the maximum detection signal. The principle of the signal detection operation is as described based on the aforementioned experiment result. In more detail, the experiment on which the first embodiment is based is shown in FIG. 5, and therefore the experiment result shown in FIG. 7 can be obtained when the electric field generator 208 is put close to the electrodes. According to the experiment result shown in FIG. 7, it was confirmed that the electric field generator 208 was located near the segment electrode placed in an x-coordinate position where a bottom of a detected double-humped output signal takes place.

Meanwhile, the first switch circuit group 249-1, the second switch circuit group 250 and the third switch circuit group 249-2 are controlled to be switched by a timing circuit 174. Then, the first, second and third switch circuit groups 249-1, 250 and 249-2 are controlled by the timing circuit 174 so as to connect to the differential amplifier 242 a pair of adjoining segment electrodes 107 and a pair of adjoining common electrodes 106, and a combination of the electrode pair to be connected to the differential amplifier 242 is shifted one by one in a direction in which the electrodes are arranged.

Therefore, according to the first embodiment, an output of the differential amplifier 242 becomes a signal in which the axis of abscissas (x-coordinate axis) of the experiment result shown in FIG. 7 is replaced by a time base. A substitution rate of the x-coordinate axis to the time base depends on the speed of switching the first, second and third switch circuit groups by means of the timing circuit 174. Therefore, by detecting a timing (time) of the bottom portion of the double-humped output signal as shown in FIG. 7 by means of the coordinate transformation circuit 175, the coordinates of the position of the electric field generator 208 placed on the LCD panel 100 can be detected. What is essential in the first embodiment is to detect the coordinates of the position of the electric field generator 208.

As described above, the coordinate transformation circuit 175 has a function of detecting the bottom portion of the double-humped output obtained in the experiment of FIG. 5 and thereby designating the position in which the electric field generator 208 is located. As described above, the signal inputted from the first, second and third switch circuits 249-1, 250 and 249-2 controlled by the timing circuit 174 to the coordinate transformation circuit 175 is converted into a signal in which the axis of abscissas of the experiment result shown in FIG. 7 is replaced by a time base. The aforementioned signal transformation is performed by controlling the operations of the switch circuits by means of the timing circuit 174. Again in more detail, by switching the first, second and third switch circuit groups 249-1, 250, and 249-2 by means of the timing circuit 174 so as to scan, for example, the segment electrodes 107, an output similar to that of FIG. 7 can be obtained. Then, the axis of abscissas of the output can represent the scanning position of the electrodes currently scanned on the LCD panel 100 as well as a time at which the electrodes are sequentially scanned. Operations of the aforementioned switch circuit groups will be described in detail hereinafter.

Next, an operation of the first embodiment will be described with reference to FIG. 8. Meanwhile, signal waveforms inside the coordinate transformation circuit 175 shown in FIG. 8 are shown in order according to a signal flow in FIGS. 9A, 9B, 9C, 9D, 9E and 9F.

A signal transmitted from the common electrodes 106 and the segment electrodes 107 of the LCD panel 100 to the coordinate transformation circuit 175 via the first switch circuit group 249-1, the second switch circuit group 250 and the third switch circuit group 249-2 is firstly inputted to the differential amplifier 242. In the differential amplifier 242, the transmitted signal is properly amplified to a level at which the signal can be easily handled. In the aforementioned experiment, the signal to be detected has a voltage of several millivolts. Therefore, by amplifying the transmitted signal by several hundred times to thousand times, the amplified signal has a voltage on the order of several volts to be easily handled.

As a result, an output obtained by amplifying a signal similar to that shown in FIG. 7 can be obtained from the differential amplifier 242 according to the position of the electric field generator 208. Since the signal detection is thus performed by means of the differential amplifier 242, there is an advantage that external noises which have entered evenly into two inputs of the differential amplifier can be effectively removed.

In the present case, the first, second and third switch circuits groups 249-1, 250 and 249-2 are controlled by the timing circuit 174 in a manner as described above so as to scanningly select between the plural number of common electrodes 106 and the plural number of segment electrodes 107 and connect each selected electrode to the differential amplifier 242. In other words, the signal to be inputted to the differential amplifier 242 is a signal in which the axis of abscissas of the experiment result of FIG. 7 is replaced by a time base.

Figure 9A:
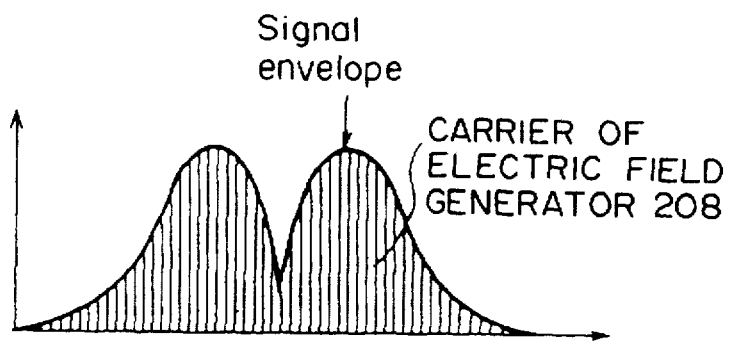
FIGS. 9A, 9B, 9C, 9D, 9E and 9F are charts of signal waveforms at several points of the first embodiment.
Figure 9B:
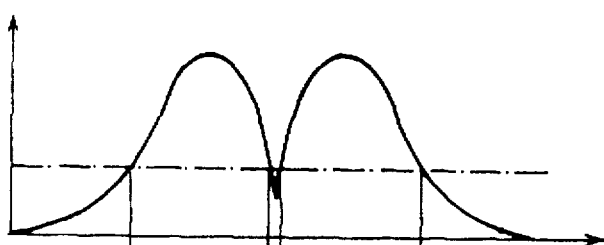
Figure 9C:
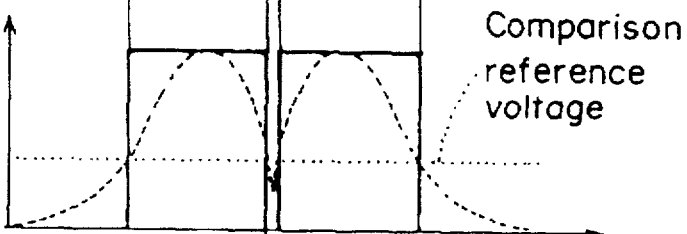

Then, the signal amplified in the differential amplifier 242 is inputted to an envelope detector 186. A waveform of the signal inputted to the envelope detector 186 is shown in FIG. 9A. Then, the envelope detector 186 outputs an envelope of an amplified signal. Then, the signal of which envelope is detected is inputted to a comparator 180 so as to be compared with a reference voltage (reference voltage for comparison) in the comparator 180 to be binarized. FIG. 9B shows a waveform of the signal inputted to the comparator 180 and the reference voltage (one-dot chain line), while FIG. 9C shows a waveform of the signal binarized by the comparator 180.

Figure 9D:
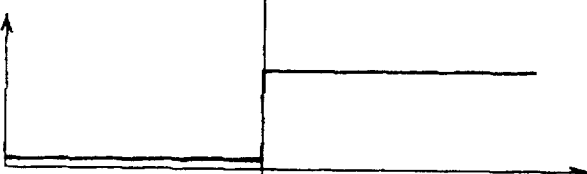

Then, an output binarized by the comparator 180 is inputted to a T-flip-flop 181. The T-flip-flop 181 is a type which operates using a trailing edge of a T-input as a clock and includes a set terminal S, and a Q output terminal thereof is set upon receiving a signal from the timing circuit 174 at the set terminal S. The T-flip-flop 181 forms a pulse having a leading edge at a bottom portion of the double-humped signal indicated by a dashed line in FIG. 9C at an inverted Q output terminal thereof. The pulse waveform is shown in FIG. 9D.

Figure 9E:
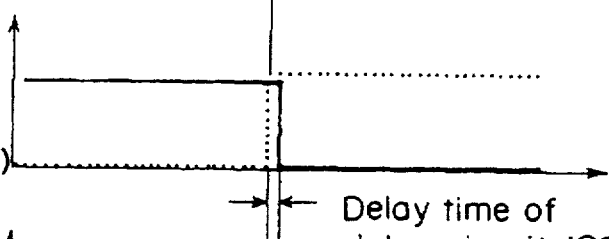
Figure 9F:
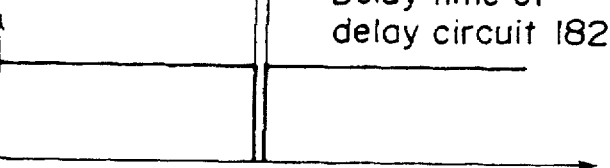

Then, a Q output pulse of the T-flip-flop 181 is processed in a delay circuit 182 to be delayed as indicated by a solid line in FIG. 9E, and further inputted to a NAND gate 183. With the above-mentioned operation, a pulse as shown in FIG. 9F which has a negative polarity and a duration corresponding to a delay time of the delay circuit 182 can be obtained as an output of the NAND gate 183. The pulse shown in FIG. 9F exists at the bottom portion of the double-humped output voltage of the output signal of the differential amplifier 242 shown in FIG. 9A.

Meanwhile, a set signal which is outputted from the timing circuit 174 and then inputted to the set terminal S of the T-flip-flop 181 is simultaneously transmitted to a load terminal of a counter 184. Then, the counter 184 starts counting according to a specified clock using the set signal as a time reference. A count value of the counter 184 is inputted to a D terminal of a D-flip-flop 185. At the same time, the negative pulse from the NAND gate 183 is inputted to a clock terminal of the D-flip-flop 185. The D-flip-flop 185 holds data supplied from the counter 184 at a time when it receives the negative pulse from the NAND gate 183.

In the present case, operation timings of the switch circuit groups 249-1, 250 and 249-2 are controlled by the timing circuit 174 in a manner as described above, and the electrodes 106 and 107 of the LCD panel 100 are scanned sequentially one by one in the y-axis and x-axis directions with two adjoining ones of the electrodes set as a pair. Therefore, the data held in the D-flip-flop 185 represents the coordinates of the position in which the electric field generator 208 is located on the LCD panel 100.

Next, operations of the first switch circuit group 249-1, the second switch circuit group 250, the third switch circuit group 249-2 and the timing circuit 174 will be described in greater detail below. First, an operation of the timing circuit 174 will be described. The timing circuit 174 controls the operations of the first, second and third switch circuit groups. The timing circuit 174 outputs a clock signal to the counter 184.

As described hereinbefore with regard to each experiment, it is acceptable to connect all the common electrodes 106 to the ground and detect a signal from the segment electrodes 107. Conversely, it is acceptable to connect all the segment electrodes 107 to the ground and detect a signal from the common electrodes 106. In the aforementioned experiment, a voltage having a double-humped waveform was able to be detected at and around the coordinates of the position in which the electric field generator 208 was located. The coordinates at which the bottom of the double-humped voltage waveform was located were the coordinates of the position in which the electric field generator 208 was located. Then, the x-coordinate value of the electric field generator 208 can be specified by scanning the segment electrodes, while the y-coordinate value of the electric field generator 208 can be specified by scanning the common electrodes. Therefore, by performing the scanning operation time-sharingly two times, the xy-coordinates of the electric field generator 208 can be specified.

Figure 12:
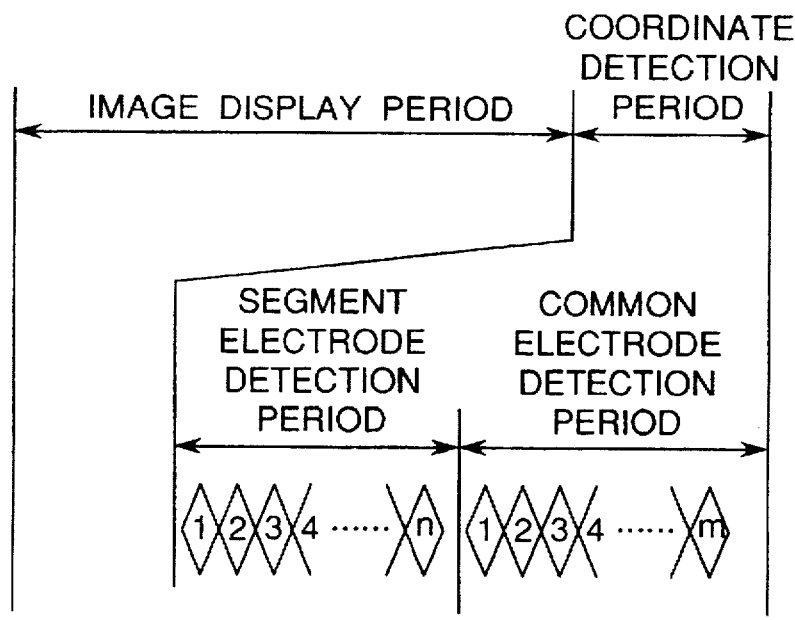
FIG. 12 is an explanatory view of a coordinate detection period.

FIG. 12 shows a sequence that the first switch circuit group 249-1, the second switch circuit group 250 and the third switch circuit group 249-2 are controlled by the timing circuit 174 so as to scan the segment electrodes 107 sequentially from a first one to an "n"th one and thereafter scan the common electrodes 106 sequentially from a first one to an "m"th one. It is to be noted that "n" and "m" represent the numbers of the segment electrodes and the common electrodes.

According to the experiment shown in FIG. 5 described hereinbefore, it is required to connect all the common electrodes 106 to the ground when the detection is performed from the segment electrodes 107. The converse can also hold. Taking the above-mentioned matter into account, when the segment electrode 107 are scanned to detect coordinates from the segment electrode 107, the timing circuit 174 controls switch circuits 249a, 249b, 249c and 249d connected to the segment electrodes so as to connect the switch circuits 249a through 249d to switch circuits 250a and 250b constituting the second switch circuit group 250 in the next stage. Meanwhile, the timing circuit 174 controls switch circuits 249e, 249f, 249g and 249h connected to the common electrodes 106 so as to connect the switch circuits 249e through 249h to the ground. Then, the timing circuit 174 controls switch circuits 249i and 249j of the third switch circuit group 249-2 so as to switch the switch circuits 249i and 249j to the segment electrode side S. With the above-mentioned operation, a signal from the segment electrodes 107 is transmitted to the differential amplifier 242. Meanwhile, the common electrodes 106 are connected to the ground.

Conversely, when coordinates are detected from the common electrodes 106 side, the timing circuit 174 connects the switch circuits 249e, 249f, 249g and 249h connected to the common electrodes 106 to switch circuits 250c and 250d in the next stage. Then, the timing circuit 174 connects to the ground the switch circuits 249a through 249d connected to the segment electrodes 107. Then, the timing circuit 174 connects the third switch circuits 249f and 249g to the common electrode side C. With the above-mentioned operation, a signal from the common electrodes 106 is transmitted to the differential amplifier 242, while the segment electrodes 107 are connected to the ground.

It is to be noted that the second switch circuits 250a, 250b, 250c and 250d are controlled by the timing circuit 174 to be properly switched so as to sequentially scan the segment electrodes and the common electrodes. Therefore, the differential amplifier 242 can sequentially detect a voltage outputted from the segment electrodes 107 or the common electrodes 106.

The switch circuits 250a through 250d of the second switch circuit group 250 are switched so as to sequentially scan from the electrode on the origin side of the x- and y-coordinate axes shown in FIG. 8. In the contact point connection state of the switch circuits 250a through 250d shown in FIG. 8, a first segment electrode 107 from the origin is connected to the positive input terminal of the differential amplifier 242, while a second segment electrode 107 from the origin is connected to the negative input terminal of the differential amplifier 242.

Subsequently, when scanning proceeds by one step, the contact point connection state shown in FIG. 8 changes to connect the second segment electrode 107 in the shown x-coordinate axis to the positive input terminal of the differential amplifier 242 and connect the third segment electrode 107 to the negative input terminal of the differential amplifier 242. Thus the two electrodes to be connected to the differential amplifier 242 are shifted one by one in the direction in which the electrodes are arranged.

In accordance with proceeding of the electrode scanning operation (elapse of time), there is inputted to the input terminals of the differential amplifier 242 a double-humped waveform which is similar to a voltage waveform shown in FIG. 7, i.e., the experiment result of FIG. 5 and has its axis of abscissas replaced by a time base.

Although the adjoining two electrodes are paired in scanning in order to reproduce the experiment of FIG. 5 in the first embodiment, it is also acceptable to pair adjoining two electrode groups so as to connect the electrode groups to the differential amplifier 242.

In the first embodiment, a timing at which the second switch circuits 250a through 250d shown in FIG. 8 are switched to sequentially scan the electrodes of the LCD panel 100 and a timing at which the counter 184 increments its count value one count by one count are made to coincide with each other. Therefore, the electrode connected to the differential amplifier 242 in the electrode scanning time can be known by means of the count value of the counter 184.

Then the NAND gate 183 outputs a pulse to the D-flip-flop 185, and when the D-flip-flop 185 receives the pulse, the D-flip-flop 185 holds the count value inputted from the counter 184. In other words, the count value thus held represents each of the ordinal numbers of electrodes assigned in order from the origin of the xy-coordinate axes in which the electric field generator 208 is located.

It is to be noted that the timing control circuit 174 is required to switch the second switch circuit group 250 according to a switching control signal synchronized with the clock signal outputted to the counter 184.

In FIG. 12, numerals 1, 2, 3, . . . , n and numerals 1, 2, 3, . . . , m each enclosed in a mark ◊ illustrated respectively in the segment electrode detection period and the common electrode detection period of the coordinate detection period represent count values of the counter 184, and concurrently represent the ordinal numbers of contact points to which the second switch circuit group 250 is connected as well as the ordinal numbers of electrodes assigned in order from the origin of the xy-axes.

The above-mentioned coordinate detection operation is achieved by controlling switching of the switch circuit groups 249-1, 250 and 249-2 by the switching control signal outputted from the timing control circuit 174 on the control lines extending from the timing control circuit 174. FIG. 12 shows a switching operation performed by the switch circuit groups.

The switch circuits for performing the above-mentioned switching operation according to the signal obtained from the control lines extending from the timing control circuit 174 can be easily implemented by, for example, an appropriate multiplexer device. Furthermore, the timing circuit 174 for outputting the switching control signal on the control lines can be also easily implemented by combining a counter device, a gate device, and so forth availed on the market.

Furthermore, as described above, the timing control circuit 174 outputs a set signal to the set terminal S of the T-flip-flop 181 and the load terminal of the counter 184. The above-mentioned time is the set timing of the T-flip-flop 181, the load timing of the counter 184, and the time (timing) at which the electrode scanning is started from the segment electrode side or the common electrode side.

As described hereinbefore, the timing at which the second switch circuit group 250 sequentially switches to scan the electrodes 106 and 107 and the timing at which the counter 184 is incremented one count by one count are made to coincide with each other. Therefore, the ordinal number from the origin of the coordinate axes of the electrode that is connected to the differential amplifier 242 in the electrode scanning time is represented by the count value of the counter 184. The above is because, as described hereinbefore, the timing control circuit 174 outputs a switching control signal to the second switch circuit group 250 in synchronization with the clock inputted from the timing control circuit 174 to the counter 184.

Since the first, second and third switch circuit groups 249-1, 250 and 249-2 are thus controlled by the timing control circuit 174, the D-flip-flop 185 holds its count value obtained by sequentially counting each of the segment electrodes and common electrodes, i.e., data representing the ordinal number from the origin of the electrode connected to the differential amplifier 242. That is, the held data can be interpreted as a value counted by the counter 184 in synchronization with the electrode scanning from the time when the counter 184 is reset on starting scanning of electrodes to the time when the negative pulse is generated from the NAND gate 183. It is a matter of course that the counter 184 starts counting at the reset time and counts one count by one count only when the electrode scanning position is shifted by one electrode.

In other words, the above-mentioned count value can be interpreted as a value which is obtained, as a result of searching a bottom portion of the double-humped output voltage corresponding to the position of the coordinates of the electric field generator 208 by shifting one by one the electrodes of the LCD panel 100 which are connected to the differential amplifier 242 by means of the switch circuit groups, by representing the bottom position by the amount of electrodes counted by the coordinate transformation circuit 175, and then held in the D-flip-flop 185. That is, the result of detecting the x-coordinate value or the y-coordinate value of the position of the electric field generator 208 is detected as represented by the amount of electrodes counted.

The above-mentioned operation will be described again with reference to timing charts shown in FIGS. 38A through 38J. The timing charts show an enlargement of the coordinate detection period of the timing chart shown in FIG. 12.

Figure 38:
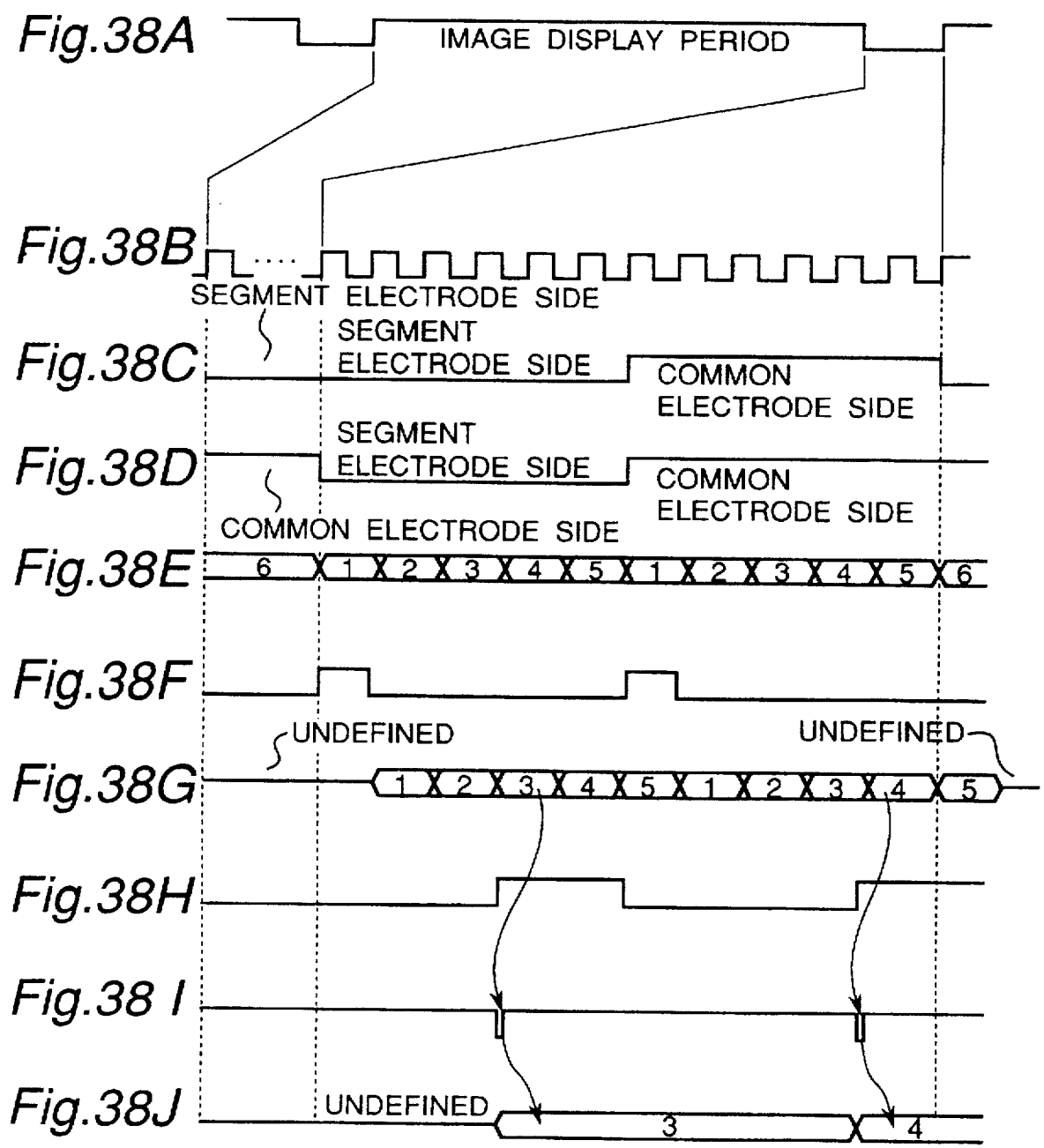
FIGS. 38A, 38B, 38C, 38D, 38E, 38F, 38G, 38H, 38I and 38J are timing charts for explaining an operation of the first embodiment.

Among signals transmitted from the timing circuit 174 to the counter 184 shown in FIG. 8, a clock signal is continuously supplied in a manner as shown in FIG. 38B.

The timing circuit 174 generates a switching control signal to be supplied to the first switch circuit group 249-1 based on a timing signal as shown in FIG. 38A supplied from the function changeover control circuit 108. A switching control signal supplied to the switch circuits 249a through d is shown in FIG. 38C, while a switching control signal supplied to the switch circuits 249e through j is shown in FIG. 38D. The control signals are used for switching the switch circuits according to FIG. 12. There are two signals shown in FIGS. 38C and 38D supplied from the timing circuit 174 to the switch circuits 249. In the coordinate detection period, both the signals switch the contact points of the switch circuits to the segment electrode side S and to the common electrode side C. In the image display period, the switching control signal shown in FIG. 38C connects the switch circuits 249a through d to the segment electrode side, while the switching control signal shown in FIG. 38D connects the switch circuits 249e through j to the common electrode side. Further, a switching control signal as shown in FIG. 38E connects the switch circuit 250 always to the contact point 6 in the image display period, and sequentially scans the contact points 1 through 5 in the coordinate input period.

Furthermore, the timing circuit 174 generates a load signal as shown in FIG. 38F based on a timing signal supplied from the function changeover control circuit 108. The load signal is outputted once at a detection start time on the segment electrode side and a detection start time on the common electrode side. Subsequently, the counter 184 starts counting, and increments it count value in accordance with a clock.

When the electric field generator 208 is located around the third segment electrode and the fourth common electrode, i.e., around the coordinates (x,y)=(3,4), a waveform as shown in FIG. 38H is outputted from the T-flip-flop 181 as explained with reference to the waveform shown in FIG. 9. When the second switch circuit group 250 scans a position around the third segment electrode and the fourth common electrode, a pulse having a negative polarity is outputted from the NAND circuit 183 as shown in FIG. 38I. With the above-mentioned operation, an instantaneous count value (3,4) of the counter 184 is latched in the D-flip-flop 185 as shown in FIG. 38J. The count value represents the coordinates at which the electric field generator 208 is located. Thus the coordinate detection is achieved.

As described above, the x-coordinate value and the y-coordinate value of the position in which the electric field generator 208 is located are held in the D-flip-flop 185 in accordance with the timing at which the negative pulse is outputted from the NAND circuit 183 in each of the detection periods shown in FIG. 12. Data representing the coordinates of the position of the electric field generator 208 can be separately utilized as detected coordinate data. There is no specific limitation on application methods of the data. For instance, by repetitively lighting previously detected coordinates in a period in which the function changeover control circuit 108 shown in FIG. 1 orders an image display operation, an image can be written on the LCD panel 100 by means of the electric field generator 208 with a touch of writing an image on a paper sheet by means of a writing pen. Furthermore, by taking the simultaneously detected coordinate data in a CPU, a desired processing operation such as character recognition can be performed.

Figure 10:
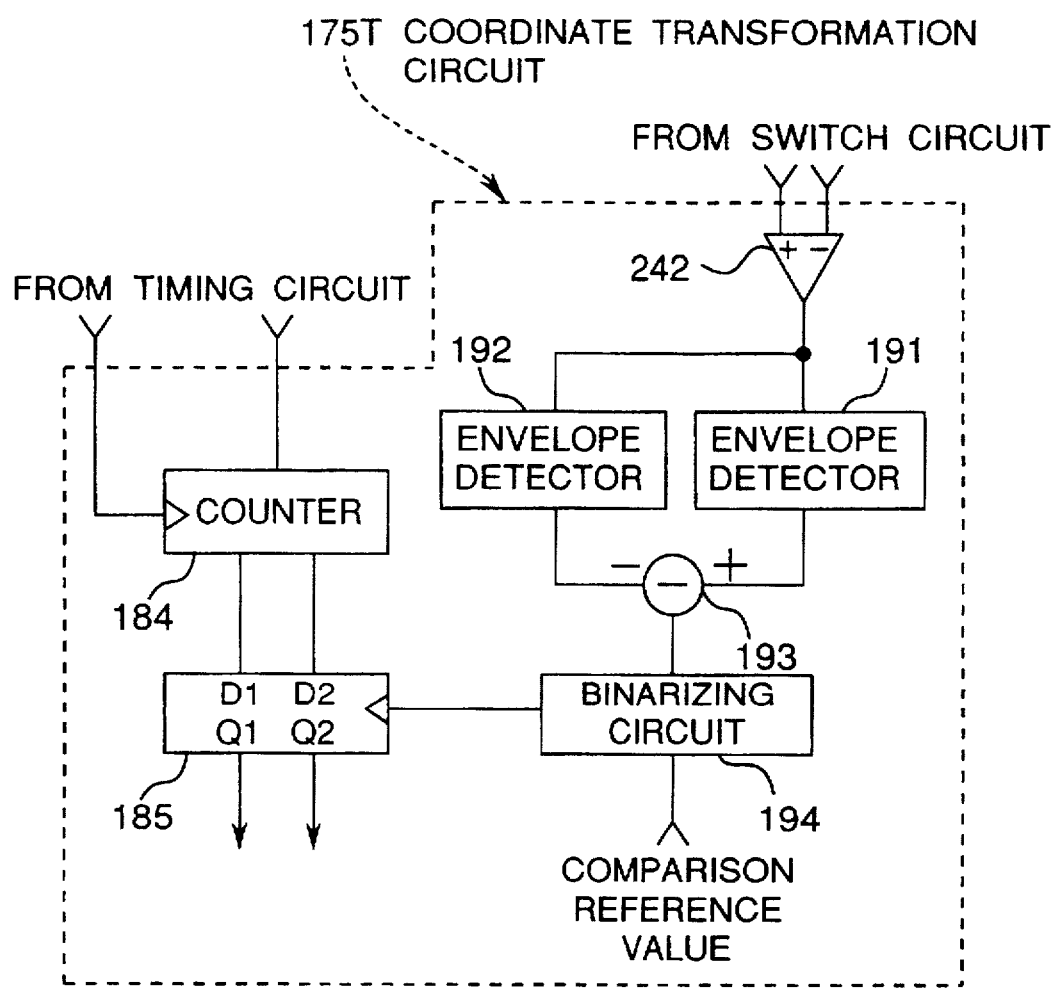
FIG. 10 is a block diagram of a modification of a coordinate transformation circuit 175 of the first embodiment.

Although the coordinate transformation circuit 175 shown in FIG. 8 is used in the first embodiment, a coordinate transformation circuit 175T as shown in FIG. 10 may be used in place of the coordinate transformation circuit 175 shown in FIG. 8. The coordinate transformation circuit 175T includes a parallel connection composed of an envelope detector 191 having a great time constant and an envelope detector 192 having a small time constant. The envelope detectors 191 and 192 connected in parallel with each other are connected between an output of the differential amplifier 242 and a differential circuit 193. An output of the differential circuit 193 is binarized in a binarizing circuit 194 and further connected to a clock terminal of the D-flip-flop 185.

The D-flip-flop 185 is connected to the counter 184, and the counter 184 is connected to the timing circuit 174 in the same manner as in the coordinate transformation circuit 175 shown in FIG. 8.

Figure 11A:
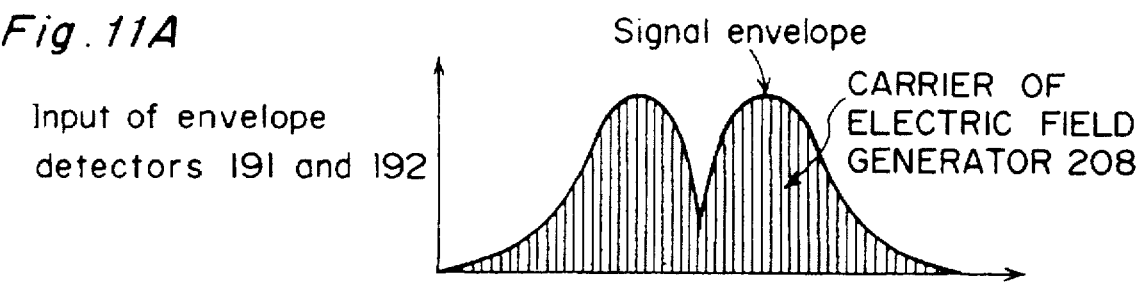
FIGS. 11A, 11B, 11C, 11D and 11E are charts of signal waveforms at several points of a coordinate transformation circuit of the modification.
Figure 11B:
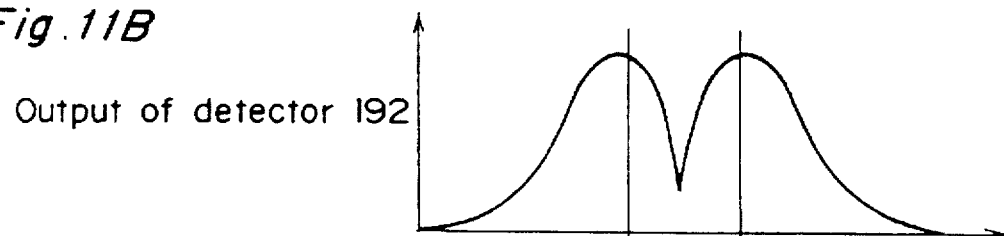
Figure 11C:
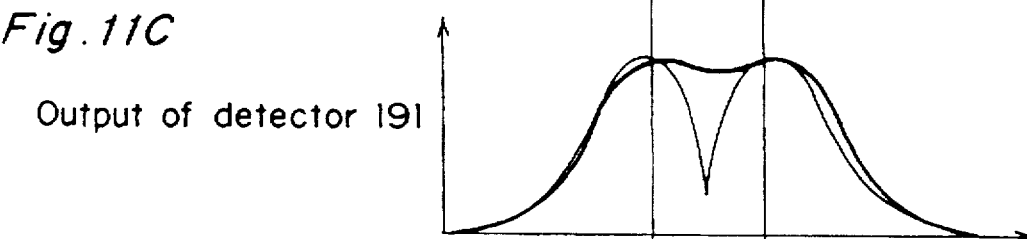

In the coordinate transformation circuit 175T, a signal which has passed through the switch circuits 249i and 249j shown in FIG. 8 is inputted to the differential amplifier 242 and amplified to a specified level. Then, the amplified signal is inputted to the envelope detector 191 having a great time constant and the envelope detector 192 having a small time constant. A signal waveform inputted to the envelope detectors 191 and 192 is shown in FIG. 11A. Further, the envelope detector 191 having a great time constant outputs a signal wherein the bottom of the double-humped output is shallowed as shown in FIG. 11C. On the other hand, as shown in FIG. 11B, the envelope detector 192 having a small time constant outputs a signal having the envelope waveform of the signal shown in FIG. 11A.

Figure 11D:
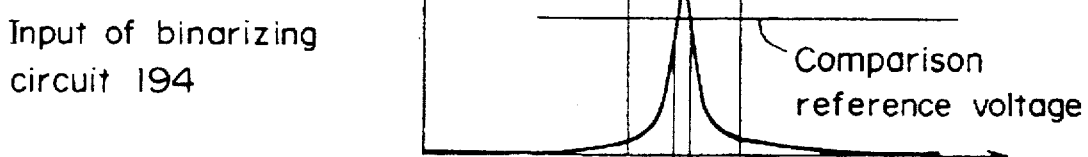
Figure 11E:

Then, the differential circuit 193 takes a difference between the outputs of the two detectors 191 and 192. An output waveform of the differential circuit 193 is shown in FIG. 11D. The output signal shown in FIG. 11D is inputted to the binarizing circuit 194, and compared with a specified reference voltage in the binarizing circuit so as to be binarized. An output waveform of the binarizing circuit 194 is shown in FIG 11E. An output signal of the binarizing circuit 194 is a pulse signal. By shaping the pulse signal by means of the T-flip-flop 181, the delay circuit 182, and the NAND gate 183 in the same manner as described hereinbefore, a pulse signal which is synchronized with the position of the bottom of the signal waveform of the experiment result shown in FIG. 7 can be obtained. Therefore, the coordinates of the position of the electric field generator 208 can be obtained by means of the counter 184 and the D-flip-flop 185 in the same manner as described hereinbefore. Although the difference between the outputs of the envelope detectors 191 and 192 is calculated, the bottom portion where a great difference takes place between the outputs can be also detected by subjecting the outputs of the detectors 191 and 192 to a product calculation process.

Although the envelope of the signal is extracted by subjecting the output of the differential amplifier 242 to an envelope detection process by means of an envelope detector in the first embodiment, a means for detecting an effective value may be used.

The two structural examples 175 and 175T of the aforementioned coordinate transformation circuit are to detect the bottom portion of the signal waveform by paying attention to a change in amplitude. However, there is a variety of structural examples for implementing such a coordinate transformation circuit other than the aforementioned two structural examples.

There can be considered another structure for each of the switch circuits of the first embodiment. Since each switch circuit can be easily constructed in a variety of ways, no description is provided therefor herein. What is essential is the provision of a structure which can assure the timing shown in FIG. 12. Furthermore, there is no special reason for using a switch circuit, and therefore a circuit having a function similar to that of each switch circuit can be constructed by combining a three-state buffer circuit and other devices in an effective combinatorial style.

Although the above description has been based on an LCD panel having 16 pixels for simplicity in the first embodiment, the LCD panel 100 of course includes a greater amount of pixels in a practical case as described hereinbefore. Furthermore, in a case of an LCD panel having more pixels, utterly the same basic structure and basic operation as those of the first embodiment can be also achieved.

As described hereinbefore, the function changeover control circuit 108 shown in FIG. 1 controls the image display drive circuit 101 and the coordinate detection circuit 105 so as to time-sharingly alternately perform image display and coordinate detection operations on the LCD panel 100. The function changeover control circuit 108 shown in FIG. 1 outputs a control signal to the timing circuit 174 shown in FIG. 8. Then, the coordinate detection circuit 105 performs the aforementioned coordinate detection operation only in the coordinate detection period, and operates to disconnect the first switch circuit group 249 and so forth from the LCD panel 100 so that they do not hinder the image display operation in the image display period. In more detail, in the image display period, the switch circuits 249a through h constituting the first switch circuit group 249-1 are connected to the contact points for connecting all the electrodes to the second switch circuit group 250. That is, the switch circuits 249a through d are connected to the contact points on the side S in FIG. 8, while the switch circuits 249e through h are connected to the contact points on the side C. On the other hand, switch circuits 250a through d constituting the second switch circuit group 250 are connected to the sixth contact point connected to nothing. Further, the switch circuits 249i and 249j constituting the third switch circuit group 249-2 in the next stage are connected to no contact point. With the above-mentioned arrangement, the image display operation on the LCD panel 100 is not influenced by the coordinate detection circuit 105, and therefore the image display operation is performed utterly in the same manner as in the prior arts. Meanwhile, an output circuit (not shown) of the image display drive circuit 101 shown in FIG. 1 normally has a three-state buffer, and therefore an output terminal thereof is allowed to have a high impedance by external control. Therefore, it is proper to make the function changeover control circuit 108 control the image display drive circuit 101 so as to operate the output circuit of the image display drive circuit 101 only in the image display period and make the output terminal of the image display drive circuit 101 have a high impedance in the coordinate input period. With the above-mentioned arrangement, the image display drive circuit 101 exerts no influence on the coordinate detection circuit 105. Thus the coordinate input circuit and the image display drive circuit can be easily separated from each other.

Figure 33A:
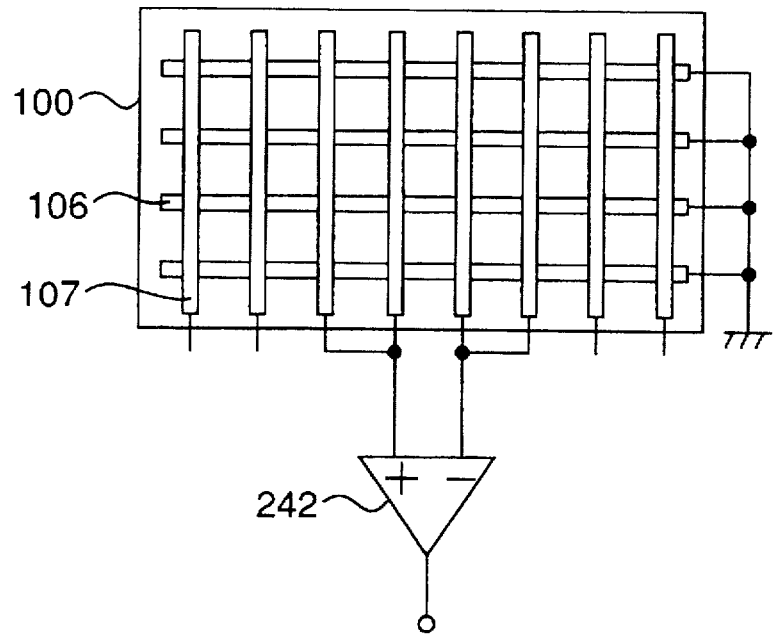
FIGS. 33A and 33B are schematic views for explaining a modification of the first embodiment wherein a pair of electrode groups each being comprised of two or three electrodes are connected to a differential amplifier.
Figure 33B:
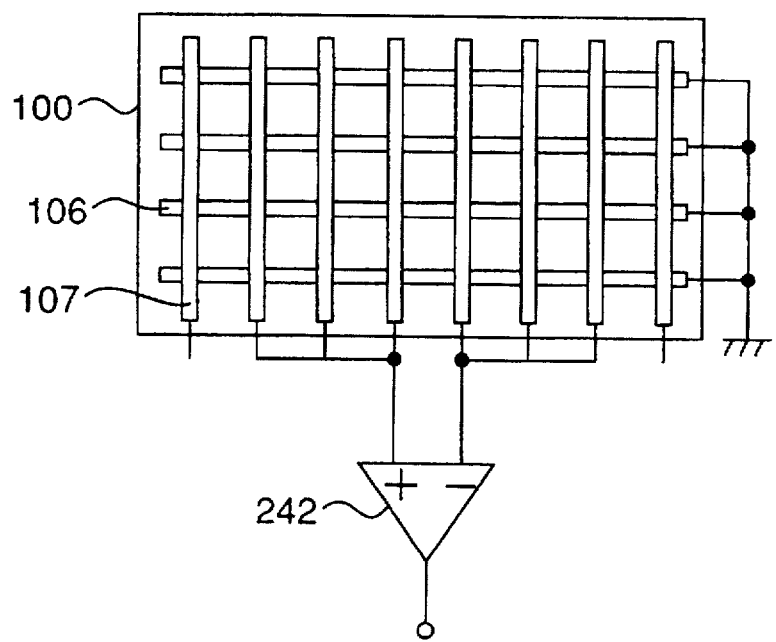

In the first embodiment, as shown in FIG. 8, one segment electrode 107 or one common electrode 106 is connected to each of the two input terminals of the differential amplifier 242. However, as shown in FIG. 33A, two electrodes of the LCD panel may be connected to each of the input terminals of the differential amplifier 242. Furthermore, as shown in FIG. 33B, three electrodes of the LCD panel may be connected to each of the input terminals of the differential amplifier 242. Thus, by connecting several electrodes to each of the input terminals of the differential amplifier, a signal-to-noise ratio of the detection signal can be improved. It is to be noted that the switch circuits and the timing circuit shown in FIG. 8 are not illustrated in FIG. 33 for simplification.

Figure 34A:
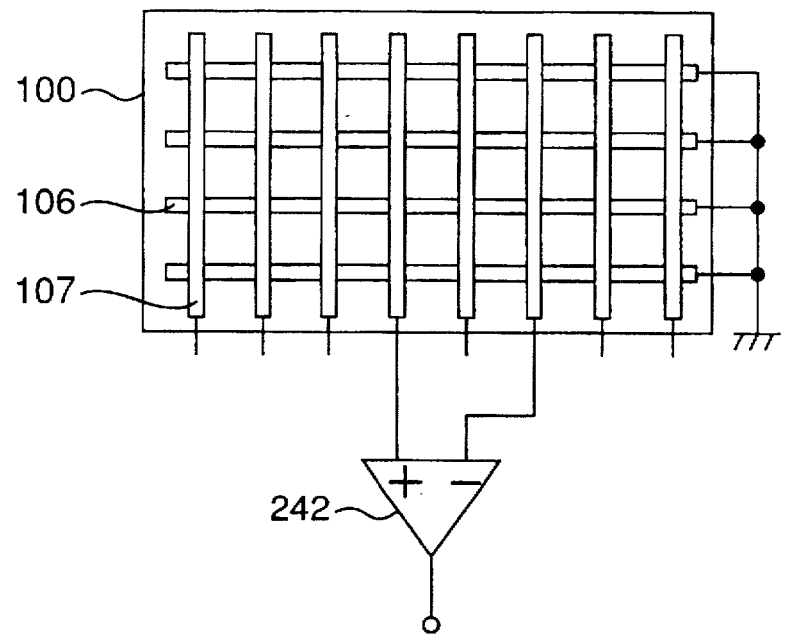
FIGS. 34A and 34B are schematic views for explaining a modification of the first embodiment wherein one or two electrodes are existing between a pair of electrodes connected to the differential amplifier.
Figure 34B:
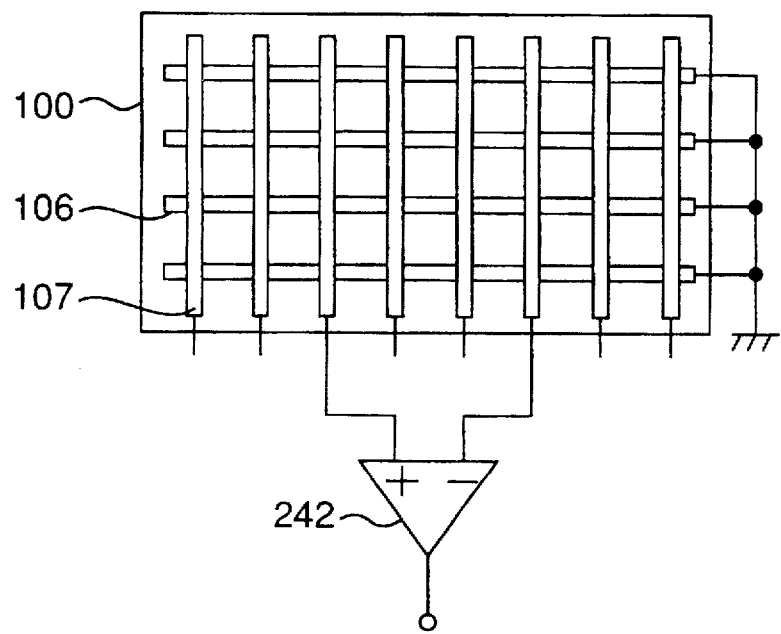

In the first embodiment, a pair of electrodes 107 connected to the input terminals of the differential amplifier 242 are adjoining to each other. However, as shown in FIG. 34A, a pair of electrodes 107 arranged with interposition of one electrode 107 may be connected to the input terminals of the differential amplifier 242. Furthermore, as shown in FIG.

Figure 35A:
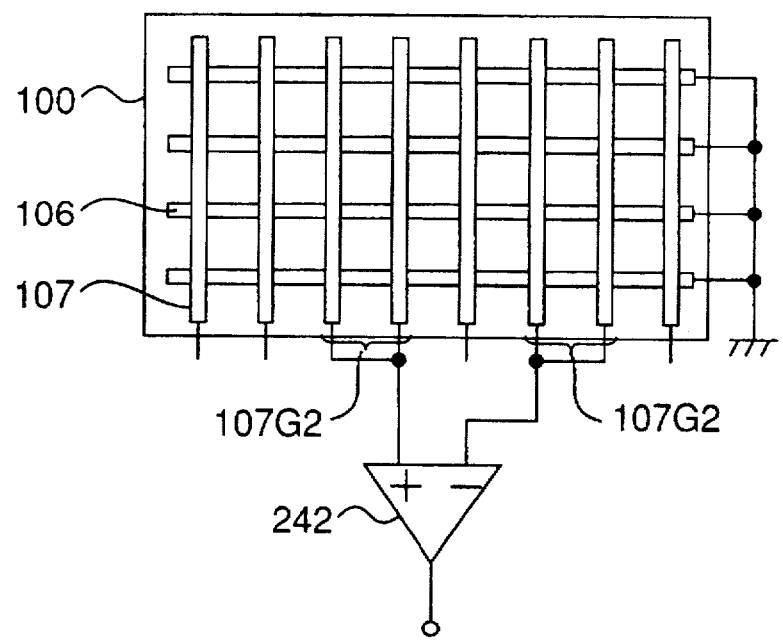
FIGS. 35A and 35B are schematic views for explaining a modification of the first embodiment wherein a pair of electrode groups arranged with interposition of one or two electrodes are connected to a differential amplifier.
Figure 35B:
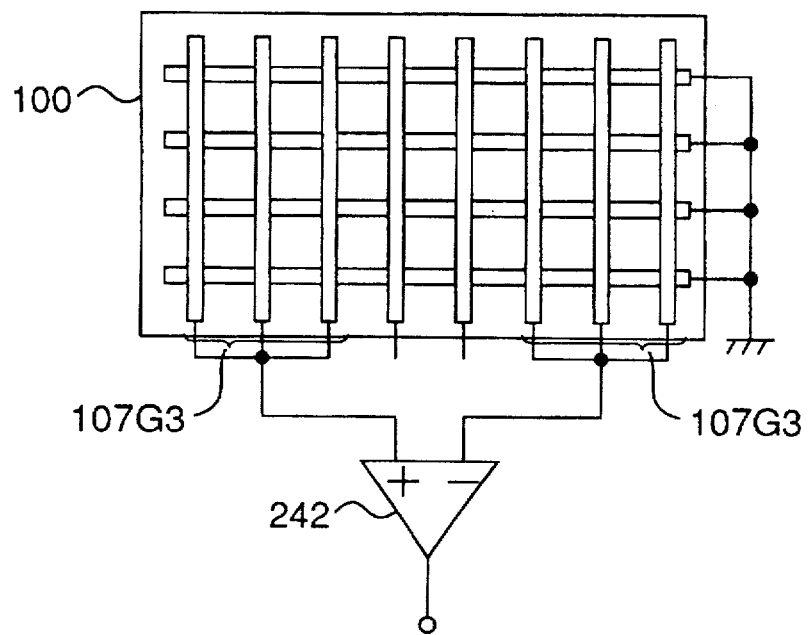

34B, a pair of segment electrodes 107 arranged with interposition of two electrodes 107 may be connected to the input terminals of the differential amplifier 242. Furthermore, as shown in FIG. 35A, a pair of electrode groups 107G2 arranged with interposition of one electrode 107 may be connected to the differential amplifier 242. The electrode groups 107G2 are each comprised of two electrodes 107. Furthermore, as shown in FIG. 35B, a pair of electrode groups 107G3 arranged with interposition of two electrodes 107 may be connected to the differential amplifier 242. The electrode groups 107G3 are each comprised of three electrodes.

As shown in FIGS. 33A through 35B, there are numbers of methods for connecting the electrodes to the differential amplifier 242. What is essential is to connect the electrodes so as to achieve a most improved signal-to-noise ratio. For instance, when a pair of electrode groups arranged with interposition of three electrodes are connected to the differential amplifier, the electrode groups are each required to include four electrodes. Furthermore, in any of the connections shown in FIGS. 33A through 35B, the point that the scanning of the electrodes is performed one electrode by one electrode is the same as in the first embodiment, and therefore a resolution in position detection does not deteriorate.

Second embodiment

Figure 13:
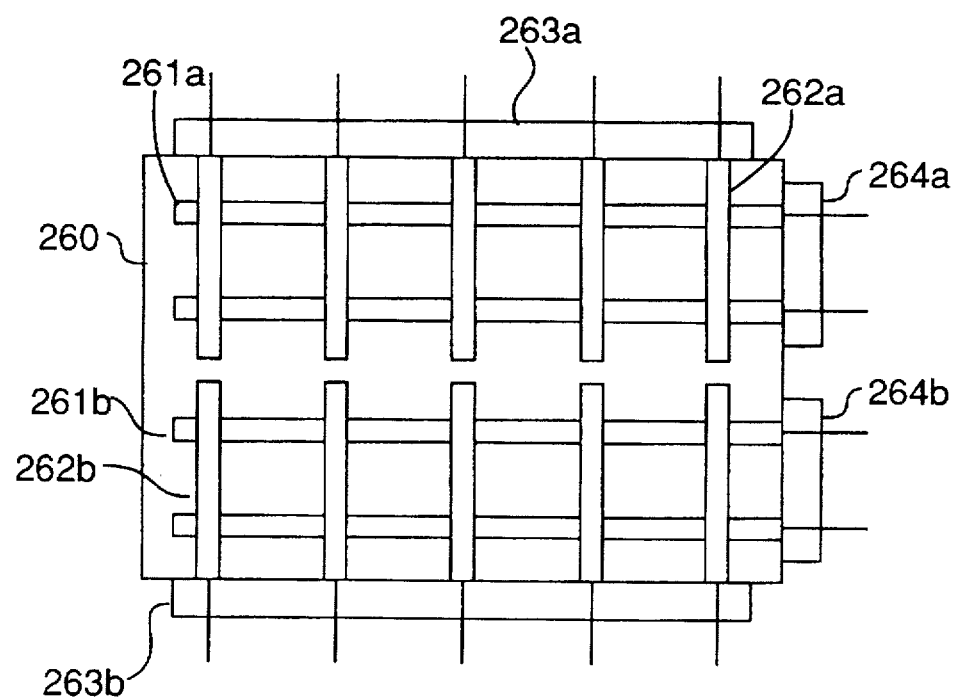
FIG. 13 is an explanatory view of an electrode structure of a high-density LCD panel owned by a second embodiment of the present invention.

Next, a second embodiment of the present invention will be described. The second embodiment includes an LCD panel of which display capacity is increased. The LCD panel of which display capacity is increased is shown in FIG. 13. The LCD panel 260 shown in FIG. 13 includes a common electrode 261a in an upper row in FIG. 13 and a common electrode 261b in a lower row in FIG. 13. The common electrodes 261a and 261b are connected to common electrode connectors 264a and 264b, respectively.

The LCD panel 260 further includes a segment electrode 262a in an upper row in FIG. 13 and a segment electrode 262b in a lower row in FIG. 13. The segment electrodes 262a and 262b are connected to segment electrode connectors 263a and 263b, respectively.

As shown in FIG. 13, a pair of segment electrode 262a and segment electrode 262b has a configuration where an approximately center portion of one segment electrode is removed.

The LCD panel 260 shown in FIG. 13 is referred to as a "multiple electrode simultaneous scanning type panel". The LCD panel 260 adopts a duty ratio drive system, and has a configuration where each segment electrode comprised of a pair of segment electrode 262a and segment electrode 262b is separated into two parts at its center portion. In other words, the segment electrode comprised of a pair of segment electrodes 262a and 262b has a structural feature that it does not continuously extend from one end to the other end of the LCD panel 260. Therefore, the LCD panel 260 has, so to speak, a structure in which two upper and lower LCD panels are connected with each other at the center position in FIG. 13. In regard to structure, the multiple electrode simultaneous scanning type LCD panel 260 has a pair of terminals led from the common electrodes 261a and 261b and two pairs of terminals wired from the segment electrodes 262a and 262b. The terminals of the common electrodes 261a and 261b are often led rightward or leftward, while the terminals of the segment electrodes 262a and 262b are often led both upward and downward.

The present invention is capable of completely separating the coordinate input function from the image display function as described hereinbefore. Therefore, whatever display panel is used, a coordinate input function can be incorporated into the panel by means of the technique of the present invention. Therefore, the present invention can be also applied to the multiple electrode simultaneous scanning type LCD panel 260. The second embodiment is an embodiment wherein the present invention is applied to the LCD panel 260.

Figure 36:
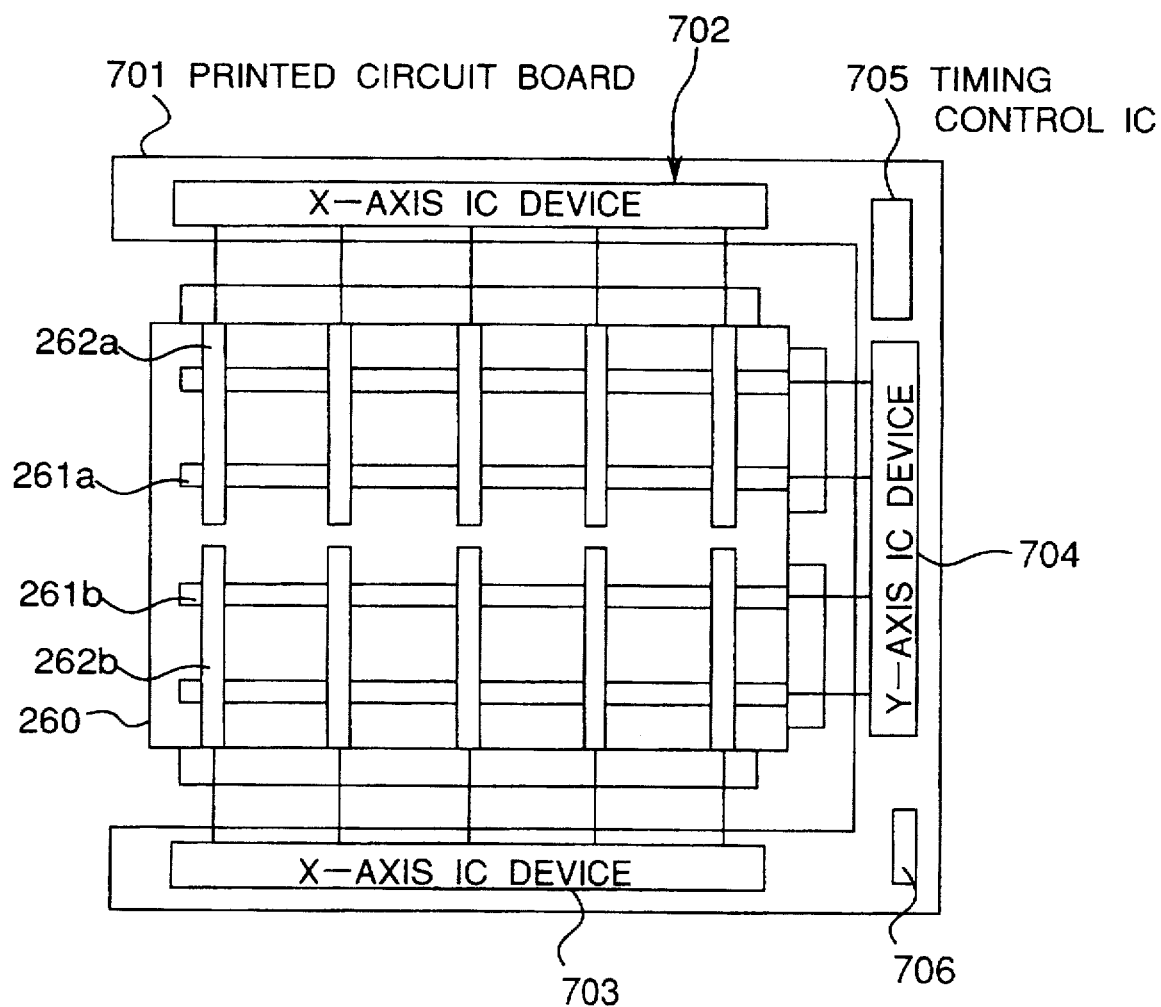
FIG. 36 is a view of a printed circuit board arranged in a bracket-like form alongside the LCD panel of the second embodiment.

FIG. 36 shows a module structure of the second embodiment. As shown in FIG. 36, the second embodiment includes a printed circuit board 701 which is provided in a bracket-like form alongside the LCD panel 260. The printed circuit board 701 is provided with an x-axis IC device 702, an x-axis IC device 703, a y-axis IC device 704, a timing control IC 705, and a signal I/O terminal 706. The x-axis IC device 702 is connected to the segment electrode 262a, and the x-axis IC device 703 is connected to the segment electrode 262b, and the y-axis IC device 704 is connected to the common electrodes 261a and 261b.

The x-axis IC devices 702 and 703 and the y-axis IC device 704 are designed to have the function of the coordinate detection circuit 105 concurrently with the function of the image display drive circuit 101 shown in FIG. 1. The timing control IC 705 corresponds to the function changeover control circuit 108 shown in FIG. 1.

The module structure of the second embodiment differs from the conventional LCD module provided specially for image display in that the timing control IC 705 and the signal I/O terminal are incorporated.

As shown in FIG. 36, the module of the second embodiment is the same as the conventional display module provided specially for image display in terms of the point that the bracket-shaped printed circuit board 701 is attached to the LCD panel 260 as arranged opposite to only three sides of the panel. Therefore, the printed circuit board 701 of the second embodiment can be mounted in a space having an area identical to that of the space in which the conventional module provided specially for image display has been provided. The above-mentioned arrangement not only satisfies a requirement for compacting the product but also prevents the possible complication of the manufacturing process, thereby producing an effect of remarkably reducing the manufacturing cost.

In contrast to the above, in the conventional coordinate input function-integrated display device as described hereinbefore, it is required to connect a printed circuit board to all the four sides of the LCD panel, which has been resulted in a drawback that a device in which a module (printed circuit board) is mounted dimensionally increases.

Figure 14:
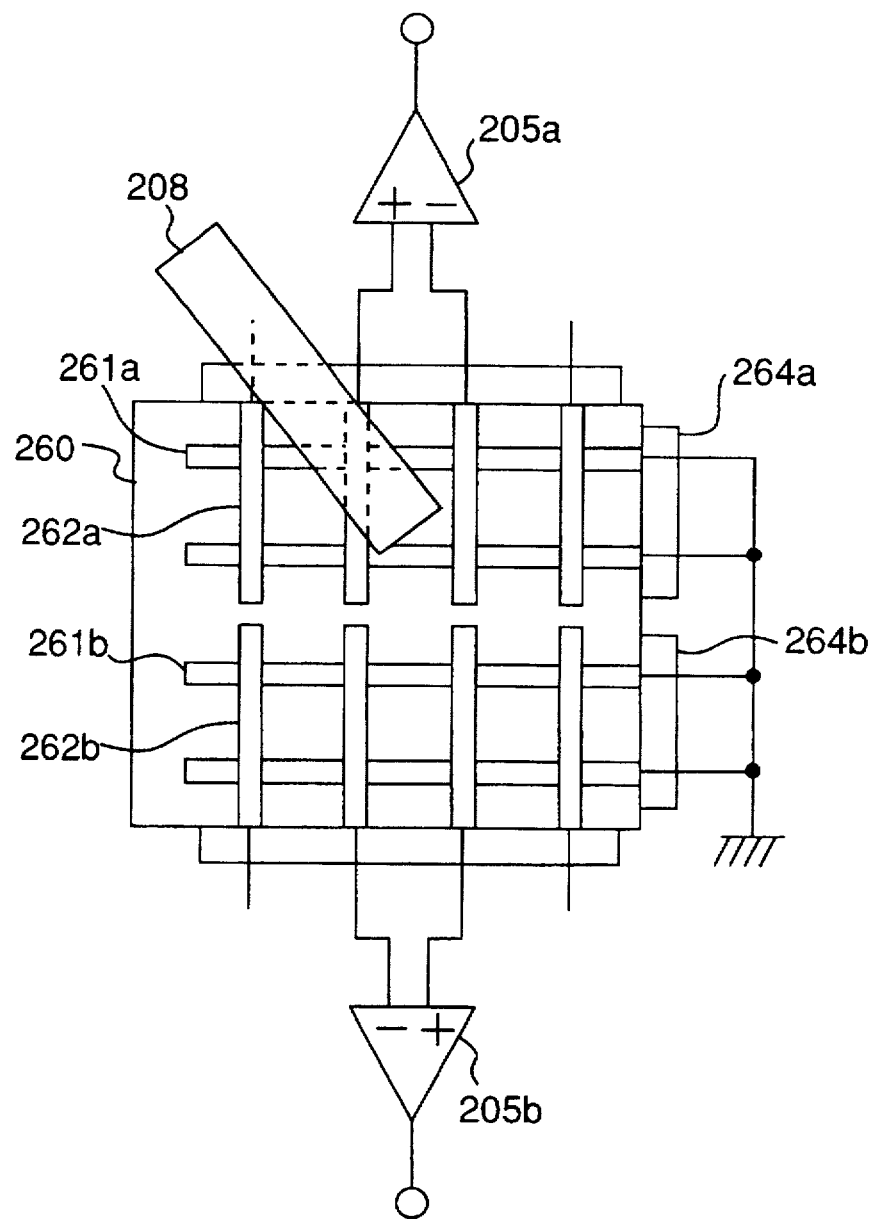
FIG. 14 is an explanatory view of a principle of operation of the second embodiment.

As shown in FIG. 14, the second embodiment has at least two sets of the basic structure of the first embodiment of the present invention described hereinbefore. In regard to the segment electrodes 262a and 262b, signals are taken out both from the upper side and lower side by means of differential amplifiers 205a and 205b. In FIG. 14, the common electrodes 261a and 261b are connected to the ground. Conversely, it is required to provide a switch circuit (not shown) for changing the connections so as to connect the segment electrodes 262a and 262b to the ground and take out signals from the common electrodes 261a and 261b. It is to be noted that a reference numeral 208 denotes an electric field generator.

Since the LCD panel 260 is widely used in a word processor or the like, numbers of reference documents can be obtained. For instance, it is appropriate to refer to page 99 of "Liquid crystals=Applications, compiled by Okano and kobayashi, published by Tofuukan, 7th issue, 1992" as a reference document. Needless to say, the LCD panel 260 has been conventionally used specially for image display, and therefore peripheral circuits and so forth for an image display operation are well known.

Figure 15:
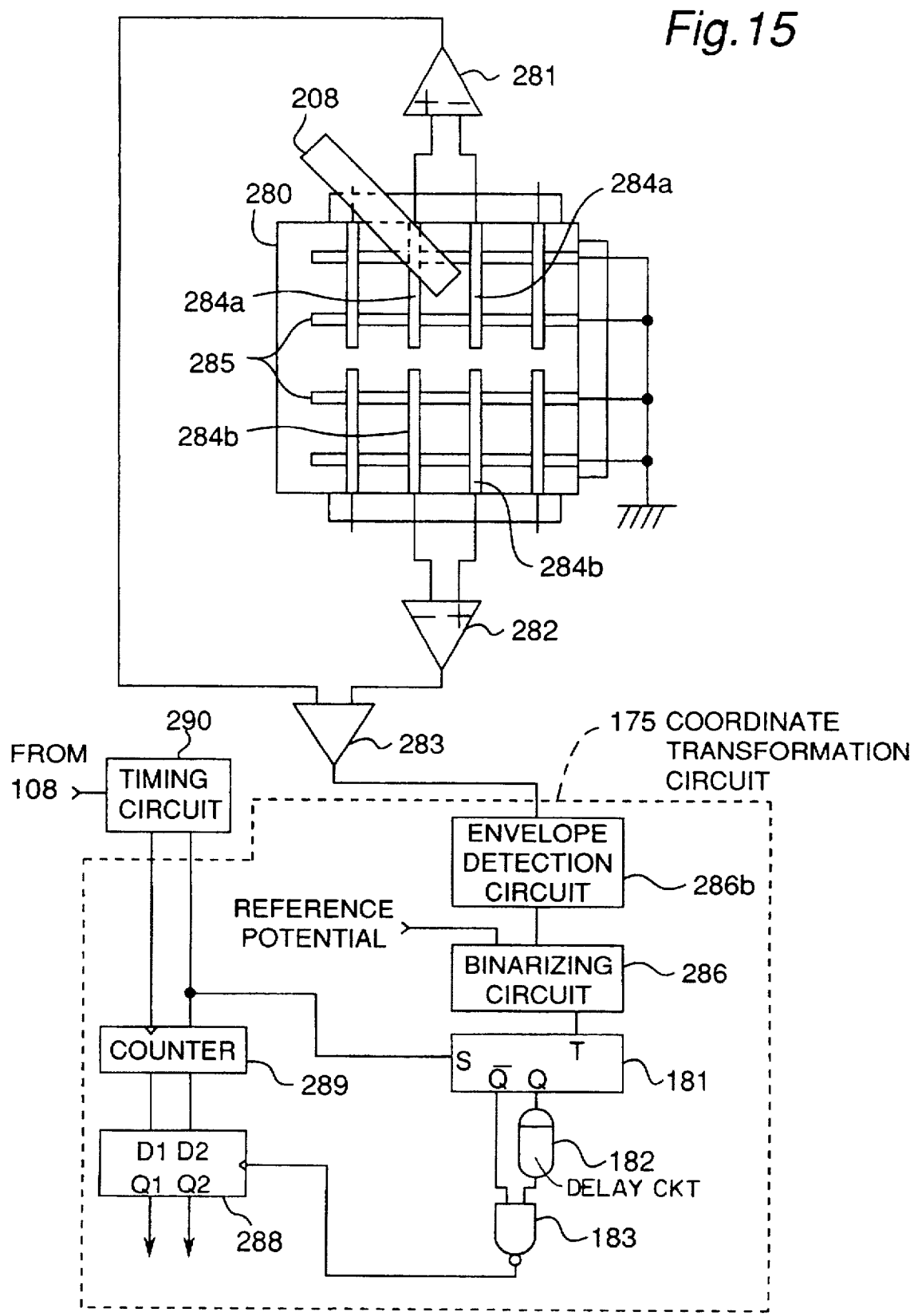
FIG. 15 is an explanatory view of a structure of the second embodiment.

Next, a structure and an operation of the second embodiment will be described with reference to FIG. 15. FIG. 15 for explaining the second embodiment corresponds to FIG. 8 for explaining the first embodiment. An LCD panel 280 as shown in FIG. 15 is an LCD panel substantially similar to that of the multiple electrode simultaneous scanning type LCD panel 260 shown in FIG. 13. The LCD panel 280 includes a segment electrode 284 of which approximate center portion is removed similarly to the LCD panel 260 shown in FIG. 14. Therefore, the segment electrode 284 has a segment electrode 284a in an upper row in FIG. 15 and a segment electrode 284b in a lower row in FIG. 15. The LCD panel 280 further includes a common electrode 285 similarly to the LCD panel 260.

As shown in FIG. 15, a pair of two segment electrodes 284a and 284b have their one end opened and the other end connected to a differential amplifier 281 and a differential amplifier 282. Then, outputs of the differential amplifier 281 and the differential amplifier 282 are connected to an adder 283. A reference numeral 208 denotes an electric field generator.

A coordinate transformation circuit 175 as shown in FIG. 15 has a structure substantially similar to that of the coordinate transformation circuit 175 shown in FIG. 8. The coordinate transformation circuit 175 has an envelope detection circuit 286b, a binarizing circuit 286, a counter 288, a D-flip-flop 288, a timing circuit 290, a T-flip-flop 181, a delay circuit 182, and a NAND circuit 183. As described hereinafter, there are required several switch circuits similar to those shown in FIG. 8 other than the structure shown in FIG. 15.

In the state shown in FIG. 15, the common electrodes 285 are connected to the ground, while the segment electrodes 284 are connected to two differential amplifiers 281 and 282. Some of the above-mentioned switch circuits have a role of changing the connections of the segment electrodes 284 and the common electrodes 285 and a role of scanning the electrodes.

As described hereinbefore, an experiment on which the present embodiment is based is shown in FIG. 5. An output as shown in FIG. 7 was able to be obtained from the electrodes to which the electric field generator 208 was put close. According to the experiment result shown in FIG. 7, it was confirmed that the electric field generator 208 was located at or around the coordinates indicated by the bottom of the detected double-humped output signal. Therefore, also in the second embodiment, it can be considered that the differential amplifier 281 or 282 outputs a signal in which the axis of abscissas of the experiment result of FIG. 7 is replaced by a time base similarly to the first embodiment. Then, by detecting a timing (time) at which the bottom of the output signal takes place, the coordinates of the position in which the electric field generator 208 is located can be detected.

In the second embodiment, the LCD panel 280 can be regarded as a panel separated into two upper and lower parts in FIG. 15. Therefore, when the electric field generator 208 is located at the upper half part of the LCD panel 280, a signal from the electrodes 284 and 285 of the LCD panel 280 can be detected only by the differential amplifier 281. When the electric field generator 208 is located at the lower half part of the LCD panel 280, the signal from the electrodes 284 and 285 can be detected only by the differential amplifier 282. Therefore, by adding together the outputs from the two differential amplifiers 281 and 282 in the adder 283, the position of the electric field generator 208 can be detected on the entire surface of the LCD panel 280. The above-mentioned arrangement is the main feature of the second embodiment.

Next, an operation of the second embodiment will be described according to a signal flow with reference to FIG. 15.

First, when the electric field generator 208 is located at the upper half part of the LCD panel 280, a signal from the LCD panel 280 is detected only by the differential amplifier 281. When the electric field generator 208 is located at the lower half part of the LCD panel 280, the signal from the LCD panel 280 is detected only by the differential amplifier 282. Therefore, the differential amplifiers 281 and 282 output signals similar to the signal shown in FIG. 7 according to the position of the electric field generator 208. Therefore, by adding together the outputs of the differential amplifiers 281 and 282 in the adder 283, an output similar to the output shown in FIG. 7 can be obtained when the electric field generator 208 is located in whichever position of the entire surface of the LCD panel 280.

A signal flow subsequent to the adder 283 is approximately equal to that of the first embodiment. That is, the signal is detected by the envelope detection circuit 286b to detect an envelope, and then the envelope output is binarized by the binarizing circuit 286 to obtain a pulse signal. Then the pulse signal is subjected to a waveform shaping process in the T-flip-flop 181, the delay circuit 182 and the NAND circuit 183 to obtain an output pulse. The output pulse is generated in correspondence with the position of the bottom of the double-humped signal shown in FIG. 7 similarly to the first embodiment. Therefore, by detecting the output pulse, the position of the electric field generator 208 can be detected.

The timing circuit 290 inputs a set signal representing a specified timing to a load terminal of the counter 289. The counter 289 starts counting according to a specified clock with the set signal used as a time reference. Then, by inputting a count value of the counter 289 to a D terminal of the D-flip-flop 288 and inputting the output pulse from the NAND gate 183 to a clock terminal of the D-flip-flop 288, the D-flip-flop 288 holds data supplied from the counter 289 to the D-flip-flop 288 in accordance with a timing at which the output pulse from the binarizing circuit 286 is outputted.

When the timing circuit 290 performs an operation timing control as described below, the data held in the D-flip-flop 288 can represent the coordinates of the electric field generator 208.

The operation of detecting the coordinates of the position of the electric field generator 208 is performed similarly to the first embodiment, just as explained with reference to FIG. 8. That is, though not shown in FIG. 15, by providing a specific switch circuit and controlling the switch circuit similarly to the first embodiment so as to scan the segment electrodes and the common electrodes, a signal can be detected to allow the coordinates of the electric field generator 208 to be specified.

Figure 16:
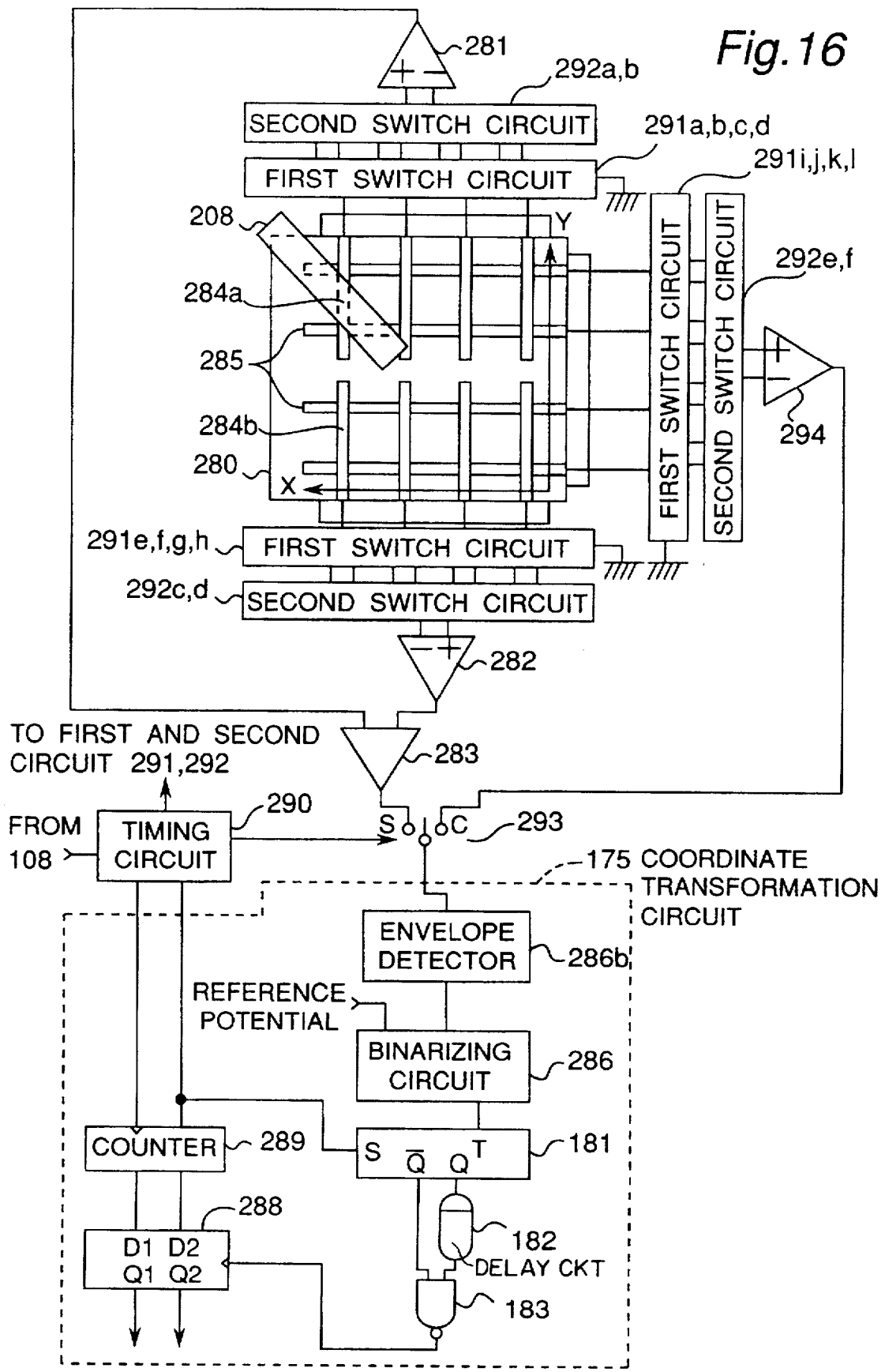
FIG. 16 is an explanatory view of a detailed structure of the second embodiment.

Next, necessary switch circuits which are not illustrated in FIG. 15 will be described with reference to FIG. 16. FIG. 16 shows a first switch circuit 291, a second switch circuit 292 and a third switch circuit 293 which are necessary. The first switch circuit 291 is comprised of first switch circuits 291a through d, 291e through h and 291i through l. The second switch circuit 292 is comprised of switch circuits 292a and b, switch circuits 292c and d and switch circuits 292e and f. Operations of the first, second and third switch circuits 291, 292 and 293 and the timing circuit 290 will be described.

As shown in FIG. 16, in the second embodiment, the first switch circuits 291a, b, c and d are provided for the segment electrode 284a, while the first switch circuits 291e, f, g and h are provided for the segment electrode 284b. In other words, in the second embodiment, the first switch circuits 291a through d and 291e through h are provided along two sides of the LCD panel 280. Since the second embodiment has the switch circuits for detecting a signal from the segment electrodes along the two sides of the LCD panel 280, the switch circuit structure is more complicated than that of the first embodiment.

Though no detailed structure is shown in FIG. 16, the first and second switch circuits 291 and 292 have the same structures as those of the first switch circuit group 249-1 and the second switch circuit group 250 shown in FIG. 8. For instance, the switch circuits 291a, b, c and d and 291e, f, g and h shown in FIG. 16 have the same structures as those of the switch circuits 249a, b, c and d shown in FIG. 8. Similarly, the switch circuits 291i, j, k and l shown in FIG. 16 have the same structures as those of the switch circuits 249e, f, g and h shown in FIG. 8.

The switch circuits 292a and b and switch circuits 292c and d shown in FIG. 16 have the same structures as those of the switch circuits 250a and b shown in FIG. 8, while the switch circuits 292e and f shown in FIG. 16 have the same structures as those of the switch circuits 250c and d shown in FIG. 8.

Thus, since the first and second switch circuits 291 and 292 of the second embodiment correspond to the first and second switch circuits of the first embodiment, it is easy to understand the structure shown in FIG. 16 with reference to FIG. 8.

Next, an operation of the timing circuit 290 will be described. The timing circuit 290 mainly controls the operations of the first, second and third switch circuits 291, 292 and 293, and further generates a clock signal to be inputted to the counter 289. The timing circuit 290 controls the switch circuits 291, 292 and 293, and makes the data held in the D-flip-flop 288 designate the coordinates of the electric field generator 208 by inputting the clock signal to the counter 289. The control is performed by the timing circuit 290 in the same manner as in the first embodiment shown in FIG. 12.

In the second embodiment, a signal can be detected from the segment electrodes 284 by means of the differential amplifiers 281 and 282 with the common electrodes 285 all connected to the ground in the same manner as described in the aforementioned experiment. Also, a signal can be detected from the common electrodes 285 by means of a differential amplifier 294 with the segment electrodes 284 all connected to the ground. In the aforementioned experiment, a voltage waveform having a double-humped form was able to be detected in correspondence with the position of the electric field generator. Then, the bottom portion of the double-humped voltage waveform represented the coordinates of the position in which the electric field generator 208 was located. Therefore, by performing two times coordinate detection from the segment electrode side and coordinate detection from the common electrode side, the xy-coordinates of the electric field generator 208 was able to be specified. Therefore, also in the second embodiment, it is proper to time-sharingly perform two times coordinate detection of the position of the electric field generator 208 from the segment electrode 284 side and from the common electrode 285 side. In a manner similar to that confirmed in the experiment of FIG. 5, when the segment electrodes 284 are scanned to detect the coordinates of the position, it is required to connect all the common electrodes 285 to the ground. The converse can also hold. Therefore, the timing circuit 290 switchingly controls the switch circuits 291 and 292 so as to satisfy the aforementioned requirements. In detail, when the segment electrodes 284 are scanned to detect the x-coordinate value of the electric field generator 208, the first switch circuits 291a through d and 291e through h connected to the segment electrodes 284 are connected to the second switch circuits 292a and b and 292c and d in the next stage so as to transmit signals. Then, the first switch circuits 291i through l connected to the common electrodes 285 are connected to the ground. Consequently, signals from the segment electrodes 284 are transmitted to the differential amplifiers 281 and 282 via the second switch circuits 292a and b and 292c and d, respectively. Then, signals amplified in the differential amplifiers 281 and 282 are further added together in the adder 283. Then, a signal outputted from the adder 283 is inputted to the coordinate transformation circuit 175 via the third switch circuit 293 switched to the segment electrode side s, and then transmitted to the binarizing circuit 286. A subsequent signal flow and an operation of the coordinate transformation circuit 175 are the same as explained in the first embodiment.

Conversely, when the coordinate detection is performed from the common electrodes 285 side, the first switch circuits 291i through l connected to the common electrodes 285 are connected to the second switch circuits 292e and f in the next stage to transmit a signal. Meanwhile, the switch circuits 291a through d and 291e through h connected to the segment electrodes 284 are connected to the ground. A signal outputted from the second switch circuits 292e and 292f is transmitted via the differential amplifier 294 to the third switch circuit 293 which is switched to the common electrode side c. Since the third switch circuit 293 is switched to the common electrode side c, the signal is transmitted to the binarizing circuit 286 of the coordinate transformation circuit 175. A subsequent signal flow and an operation of the coordinate transformation circuit 175 are the same as those of the first embodiment described hereinbefore.

The second switch circuits 292a and b, c and d and e and f are switched so as to sequentially scan the segment electrodes 284 and the common electrodes 285, with which it can be detected how great value of voltage is outputted from each of the segment electrodes 284 and the common electrodes 285 by means of the differential amplifiers 281, 282 and 294. The second switch circuit 292 sequentially scans each of the electrodes from the electrode adjacent to the origin of xy-coordinate axes shown in FIG. 16. In FIG. 16, there are set xy-coordinate axes of which origin is located at a lower right position of the LCD panel 280 similarly to FIG. 8. Then, the electrodes are sequentially scanned from the one adjacent to the origin of the xy-coordinate axes.

When the states of the contact points of the switch circuits 291 and 292 shown in FIG. 16 are in the same contact point connection states as those of the first and second switch circuits shown in FIG. 8, the first segment electrode 284 from the origin of the x-axis is connected to a negative input terminal of the differential amplifier 281, and the second segment electrode from the origin of the x-axis is connected to a positive input terminal of the differential amplifier 281. When the scanning proceeds by one step, the second segment electrode from the origin of the x-axis and the third segment electrode from the origin of the x-axis are connected to the negative input terminal and the positive input terminal of the differential amplifier 281, respectively.

Meanwhile, the first segment electrode from the origin of the x-axis is connected to a positive input terminal of the differential amplifier 282, and the second segment electrode from the origin of the x-axis is connected to a negative input terminal of the differential amplifier 282. When the scanning proceeds by one step, the second segment electrode from the origin of the x-axis and the third segment electrode from the origin of the x-axis are connected to the negative input terminal and the positive input terminal of the differential amplifier 282, respectively.

Thus a combination of the pair composed of four segment electrodes 284a and 284b which are arranged in the upper and lower rows and connected to the two differential amplifiers 281 and 282 is shifted sequentially one electrode by one electrode in a direction in which x-axis position coordinates are arranged in the x-axis. Thus, each combination of the segment electrodes to be connected to the differential amplifiers 281 and 282 is sequentially scanned. Therefore, a waveform obtained by replacing the axis of abscissas of the double-humped waveform shown in FIG. 7 with a time base is outputted from the output terminal of the adder 283. In other words, the condition of the experiment shown in FIG. 7 is reproduced.

In the second embodiment, the scanning is performed by pairing adjoining two electrodes in order to faithfully reproduce the experiment shown in FIG. 5. However, the above-mentioned scanning may be performed by grouping adjoining or adjacent two or more electrodes as an electrode group and pairing adjoining two electrode groups.

The scanning operation is performed by outputting a switching control signal from the timing circuit 290 to control lines which are wired from the timing circuit 290 to the switch circuits 291 through 293. A switching operation of the switch circuits is shown in FIG. 12.

The switch circuit for performing the switching operation by a signal inputted via the control lines from the timing circuit 290 can be easily implemented by, for example, an appropriate multiplexer device. Furthermore, the timing circuit 290 for outputting a control signal as described above to the control lines can be easily implemented by combining a counter device, a gate device, and so forth availed on the market.

A timing at which the second switch circuits 292 are sequentially switched under the control of the timing circuit 290 to scan the electrodes 284 and 285 and a timing at which the counter 289 counts one count by one count are made to coincide with each other. Therefore, the count value of the counter 289 represents the ordinal number from the origin of each of the electrodes 284 and 285 connected to the differential amplifiers 281, 282 and 294 in the scanning time. The timing circuit 290 of course generates a switching control signal to be inputted to the second switch circuits 292 in synchronization with the clock signal inputted from the timing circuit 290 to the counter 289. It is easy to make the timing circuit 290 have a structure for generating such a control signal.

If the switch circuits 291 are thus controlled, consequently a value representing the ordinal number from the origin of the electrodes connected to the differential amplifiers in the electrode scanning time, i.e., the count value of the counter 289 is held in the D-flip-flop 288. The value held in the D-flip-flop 288 is a count value that the counter 289 has counted sequentially one count by one count in synchronization with the electrode scanning from a time when the counter 289 is reset to a time when a negative pulse is generated from the NAND gate 183.

In other words, the count value is a value which is obtained, as a result of searching by means of the switch circuits the bottom portion of a double-humped output voltage corresponding to the coordinates of the position of the electric field generator 208 by shifting one by one the electrodes of the LCD panel 280 connected to the differential amplifiers in the scanning direction, by representing the position of the bottom with the amount of electrodes counted by the coordinate transformation circuit 175, and then held in the D-flip-flop 288. In other words, the x-coordinate value or the y-coordinate value of the position in which the electric field generator 208 is located is detected as represented by the counted amount of electrodes.

As described above, the x-coordinate value and the y-coordinate value of the position in which the electric field generator 208 is located are each held in the D-flip-flop 288 when the negative pulse is outputted from the NAND gate 183 in each detection period shown in FIG. 12. The data representing the coordinates of the position of the electric field generator 208 can be separately utilized as detected coordinate data. Though there is no specific limitation on application methods of the data, for example, an application similar to that described in the first embodiment can be achieved.

It is to be noted that each switch circuit may have a structure other than that of the second embodiment. Since each switch circuit can be easily constructed in a variety of ways, no particular description is provided therefor herein. What is essential is the assurance of the timing shown in FIG. 12 by means of the switch circuits. Furthermore, there is no special reason for using a switch circuit, and therefore a circuit obtained by effectively combining a three-state buffer circuit and other devices may be utilized.

Although the second embodiment has been described based on only 16 pixels shown concretely for simplicity, the LCD panel 280 of course practically includes a greater number of pixels. Furthermore, the same basic structure and basic operation as those of the second embodiment can be also achieved in an LCD panel having more pixels.

The second embodiment includes the function changeover control circuit 108 shown in FIG. 1. The function changeover control circuit 108 controls the display drive circuit 101 and the coordinate detection circuit 105 to make the LCD panel 280 perform time-sharingly alternately image display and coordinate detection operations. The function changeover control circuit 108 shown in FIG. 1 outputs a control signal to the timing circuit 290 shown in FIG. 16. Then, the coordinate detection circuit 105 performs the aforementioned coordinate detection operation only in the coordinate detection period, and operates to disconnect the first switch circuits 291 and so forth from the LCD panel 280 so that they do not hinder the image display operation in the image display period. In more detail, in the image display period, the first switch circuits 291a through l connect their contact points so as to electrically connect all the electrodes of the LCD panel 280 to the second switch circuits 292a through f. Then, the second switch circuits 292 are connected to contact points connected to nothing. Therefore, the differential amplifiers 281, 282 and 294 subsequent to the second switch circuits 292 are disconnected from the LCD panel 280. Consequently, the image display operation is not influenced by the coordinate detection circuit 105 shown in FIG. 1 including the coordinate transformation circuit 175. In other words, an operation similar to that of the conventional LCD device provided specially for image display can be performed in the image display period. The second embodiment includes the function changeover control circuit 108 and the image display drive circuit 101 shown in FIG. 1, and the operations of the circuits are the same as those of the first embodiment.

Third embodiment

Next, a third embodiment of the present invention will be described. The third embodiment is an embodiment in which a coordinate detection device of the present invention is applied to a TFT (Thin Film Transistor) LCD panel. As described hereinbefore in the first and second embodiments, the coordinate input function and the image display function can be completely separated from each other when the present invention is applied to an LCD panel provided for image display. Then, as is apparent from the following description of the third embodiment, a coordinate input function can be incorporated into a TFT LCD panel by means of the technique of the present invention.

Figure 17:
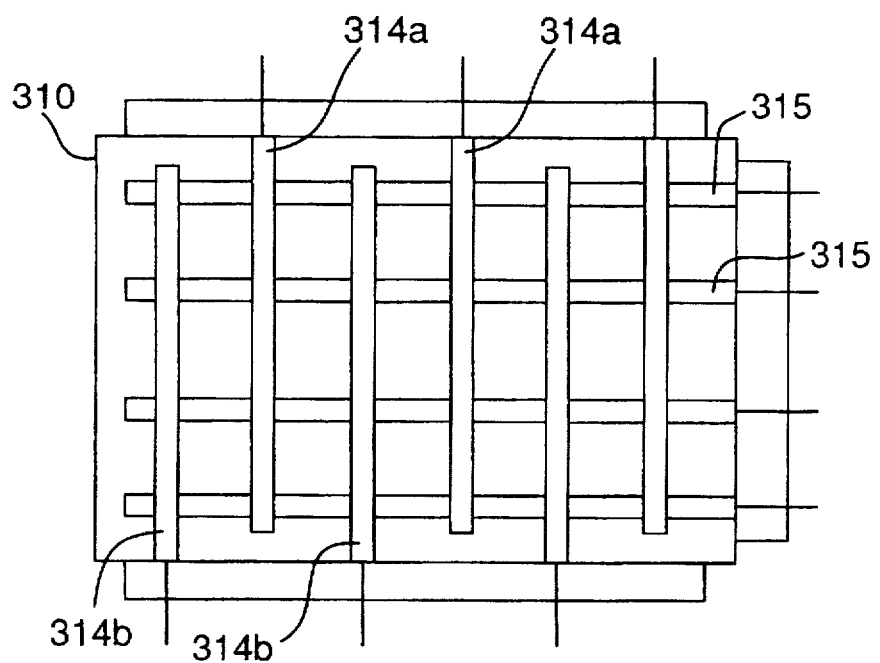
FIG. 17 is an explanatory view of an electrode structure of a TFT LCD panel included in a third embodiment of the present invention.

FIG. 17 shows a structure of a TFT LCD panel 310. As shown in FIG. 17, the TFT LCD panel 310 normally has a structural feature that segment electrodes 314a and 314b are extending in a comb-like form alternately from the upper and lower ends of the LCD panel 310.

Figure 18:
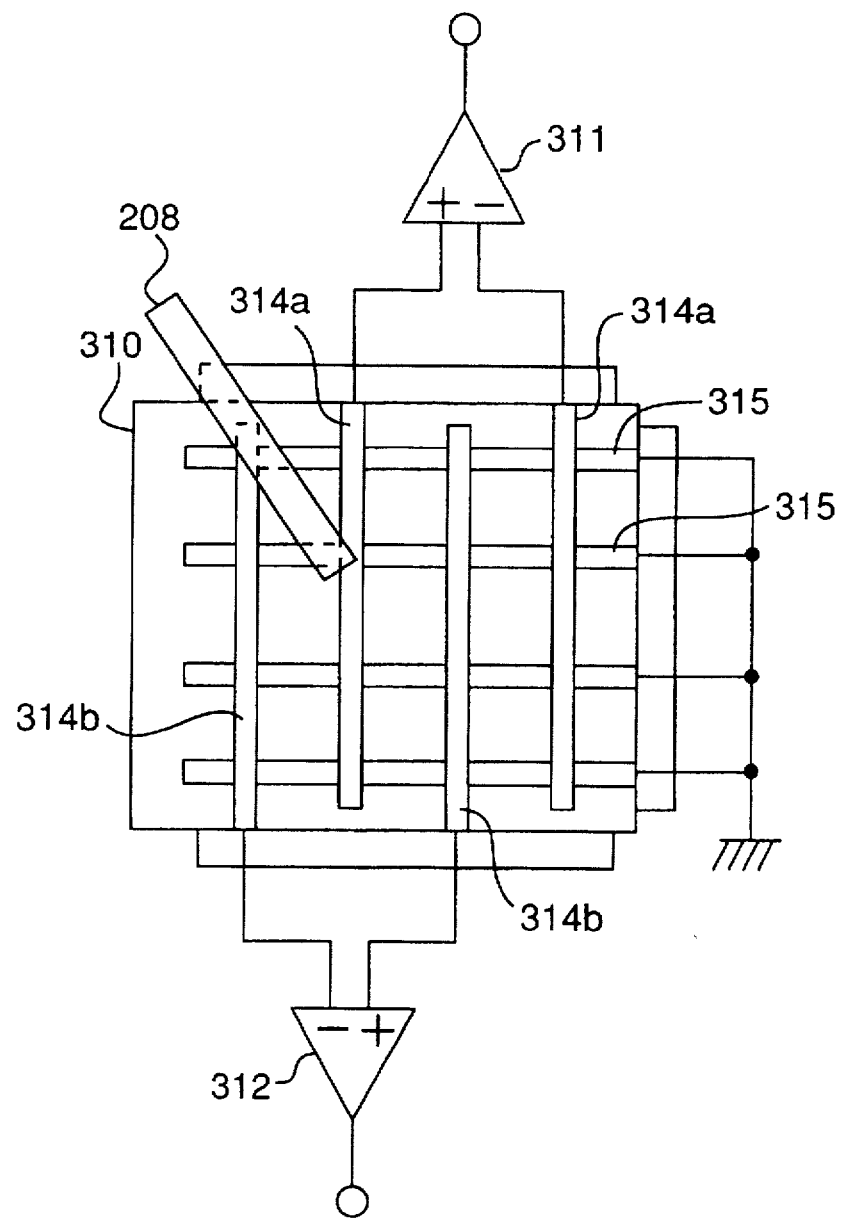
FIG. 18 is an explanatory view of a principle of operation of the third embodiment.

As shown in FIG. 18, the third embodiment includes two pairs of the basic structure of the first embodiment shown in FIG. 8. That is, a signal can be taken out of the segment electrodes 314a and 314b owned by the LCD panel 310 alternately from the upper and lower ends in a direction in which the electrodes are arranged. FIG. 18 shows a state in which common electrodes 315 of the LCD panel 310 are connected to the ground. The third embodiment includes switch circuits similarly to the second embodiment shown in FIG. 16. The switch circuits switch an electrode connection state as shown in FIG. 18 so that they can connect the segment electrodes 314 to the ground and take out a signal from the common electrodes 315 and transmit the signal to a differential amplifier (not shown).

Since the above-mentioned TFT LCD panel is already used widely, numbers of reference documents can be easily obtained. For instance, it is appropriate to refer to page 104 of "Liquid crystals=Applications, compiled by Okano and kobayashi, published by Tofuukan, 7th issue, 1992" as a reference document. Since the TFT LCD panel has been conventionally used specially for image display, peripheral circuits and so forth for image display are well known.

In the TFT LCD panel 310, a display section has a dimension of 17 cm (laterally)×14.3 cm (longitudinally), a pixel structure of 640 (for each of R, G and B colors) pixels (laterally)×480 pixels (longitudinally) and a pixel dimension of 255 µm (laterally)×300 µm (longitudinally). Further, the TFT LCD panel has two glass plates each having a thickness of 1 mm, a gap of about 7 µm between the two glass plates, an electrode width of about 35 µm, and an electrode thickness of about 1 µm.

Figure 19:
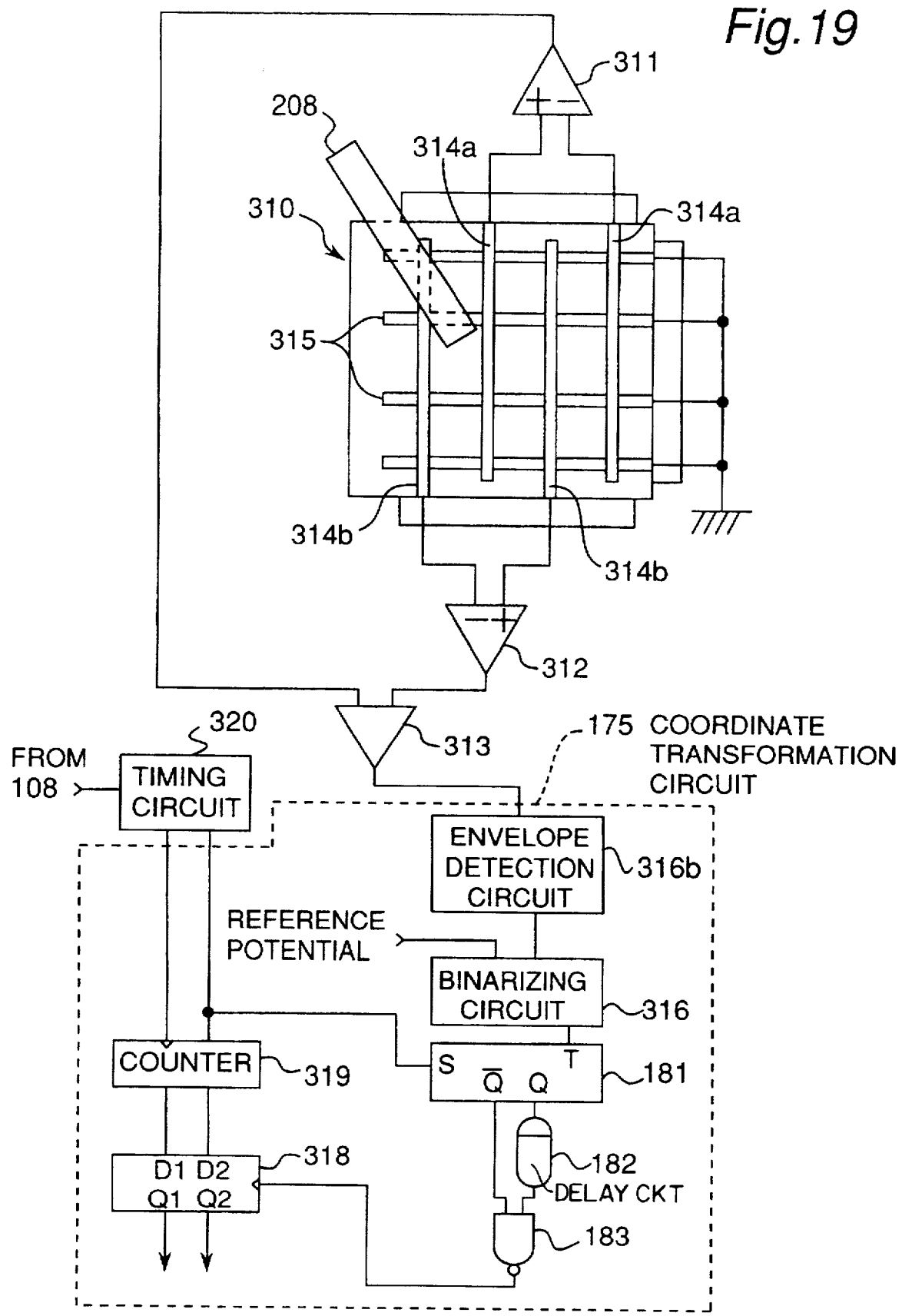
FIG. 19 is an explanatory view of a structure of the third embodiment.

FIG. 19 shows in detail the structure of the third embodiment. FIG. 19 corresponds to FIG. 15 used for the description of the second embodiment. In FIG. 19, a reference numeral 310 denotes a TFT LCD panel, and the TFT LCD panel 310 includes segment electrodes 314 and common electrodes 315. A pair of two segment electrodes 314a and 314a are arranged with interposition of one segment electrode 314b, and one end of the segment electrodes 314a is electrically opened in a position before a peripheral edge of the LCD panel 310. Then the other end of the pair of the segment electrodes 314a is connected to an input terminal of a differential amplifier 311. On the other hand, a pair of two segment electrodes 314b and 314b are arranged with interposition of one segment electrode 314a, and one end of the segment electrodes 314b is electrically opened in a position before a peripheral edge of the LCD panel 310. Then the other end of the pair of the segment electrodes 314b is connected to an input terminal of a differential amplifier 312.

An output terminal of the differential amplifier 311 and an output terminal of the differential amplifier 312 are connected to input terminals of an adder 313. A reference numeral 208 denotes an electric field generator.

The third embodiment has a coordinate transformation circuit 175 connected to an output terminal of the adder 313. The coordinate transformation circuit 175 has the same structure as that of the coordinate transformation circuit of the second embodiment shown in FIG. 15, and includes an envelope detection circuit 316b, a binarizing circuit 316, a counter 319, a D-flip-flop 318, a T-flip-flop 181, a delay circuit 182, and a NAND gate 183. The third embodiment further includes a timing circuit 320 similar to that of the second embodiment.

As described hereinafter, the third embodiment requires several switch circuits similarly to the second embodiment. The switch circuits have a function of switching a connection state of the common electrodes 315 and the segment electrodes 314 and a function of shifting the connection state of the electrodes one by one in a direction in which the electrodes are arranged as explained in the second embodiment.

The third embodiment is based on the experiment shown in FIG. 5 similarly to the first and second embodiments. By putting the electric field generator 208 close to the electrodes shown in FIG. 5, the experiment result shown in FIG. 7 was able to be obtained. It was confirmed that the electric field generator 208 was located near the electrodes of the LCD panel at which the bottom of the detected output signal waveform took place.

Therefore, the differential amplifier 311 or 312 outputs a signal in which the axis of abscissas of the experiment result shown in FIG. 7 is replaced by a time base similarly to the first embodiment. Therefore, similarly to the first embodiment, a timing (time) at which the bottom of the signal waveform exists can be used as a signal representing the coordinates of the position in which the electric field generator 208 is located.

When the electric field generator 208 is located near the segment electrodes 314a, signals are outputted from both the differential amplifier 311 and the differential amplifier 312. Therefore, by adding together the output signals from the differential amplifiers 311 and 312, the position of the electric field generator 208 can be detected when the electric field generator 208 is located in whichever position of the entire surface of the LCD panel 310.

Figure 20:
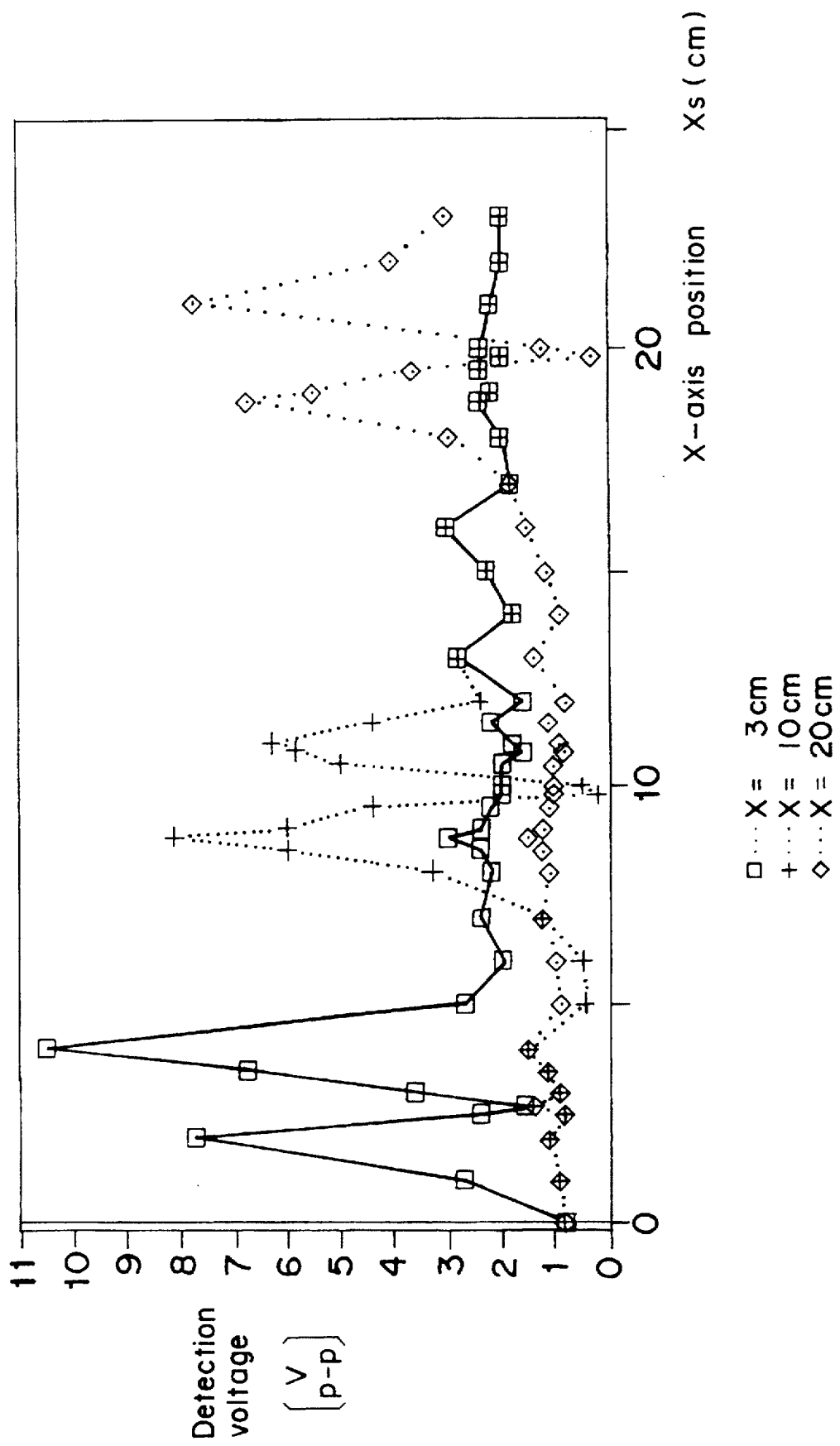
FIG. 20 is a graph showing a result of an experiment relevant to the third embodiment performed by the inventor and others.

FIG. 20 shows a result obtained by performing an experiment similar to that shown in FIG. 5 on the TFT LCD panel. The experiment result shown in FIG. 20 shows a tendency similar to that of the experiment result shown in FIG. 7. That is, as shown in FIG. 20, an AC output voltage of which envelope has a double-humped shape can be obtained from the differential amplifiers. Then, a minimum (bottom) output voltage can be obtained from the segment electrodes 314a to which the electric field generator 208 is put close. In other words, the output voltage shown in FIG. 20 is related to the position of the electric field generator 208.

Next, an operation of the third embodiment will be described with reference to FIG. 19.

First, the differential amplifiers 311 and 312 output a detection voltage shown in FIG. 20 in correspondence with the position of the electric field generator 208. Then, the adder 313 adds together the outputs of the differential amplifiers 311 and 312, and outputs a double-humped output voltage waveform similar to that shown in FIG. 9A. Then, the envelope detection circuit 316b detects and extracts the envelope of the double-humped output voltage waveform. Then, the binarizing circuit 316 compares the detected envelope waveform with a specified reference voltage to binarize the same, and outputs a pulse signal similar to that shown in FIG. 9C. The position of the pulse signal corresponds to the bottom of the signal of the experiment result shown in FIG. 20. That is, the position of the pulse signal represents the position of the electric field generator 208. An output signal of the binarizing circuit 316 is inputted to the T-flip-flop 181 similarly to the first embodiment, and an output from an inverted Q terminal of the T-flip-flop 181 is directly inputted to the NAND gate 183, and an output from a Q terminal of the T-flip-flop 181 is inputted to the NAND gate 183 via the delay circuit 182. Then, an output of the NAND gate 183 is inputted to a clock terminal of the D-flip-flop 318.

On the other hand, the timing circuit 320 outputs a signal representing a specified timing as a set signal to a load terminal of the counter 319, and the counter 319 starts counting according to a specified clock with the load signal used as a time reference. A count value of the counter 319 is inputted to a D terminal of the D-flip-flop 318.

An output of the NAND gate 183 is inputted to a clock terminal of the D-flip-flop 318. Therefore, data supplied from the D-flip-flop 318 is held in accordance with the timing at which a pulse is outputted from the D-flip-flop 318.

Therefore, by making the timing circuit 320 perform a proper timing control as follows, the data held in the D-flip-flop 318 can represent the coordinates of the position of the electric field generator 208.

As to an operation of the timing circuit 320, there is required an operation of scanning the segment electrodes and the common electrodes by controlling the switch circuits similarly to the timing circuit 290 shown in FIGS. 15 and 16 of the second embodiment. The above-mentioned operation will be described below.

Figure 21:
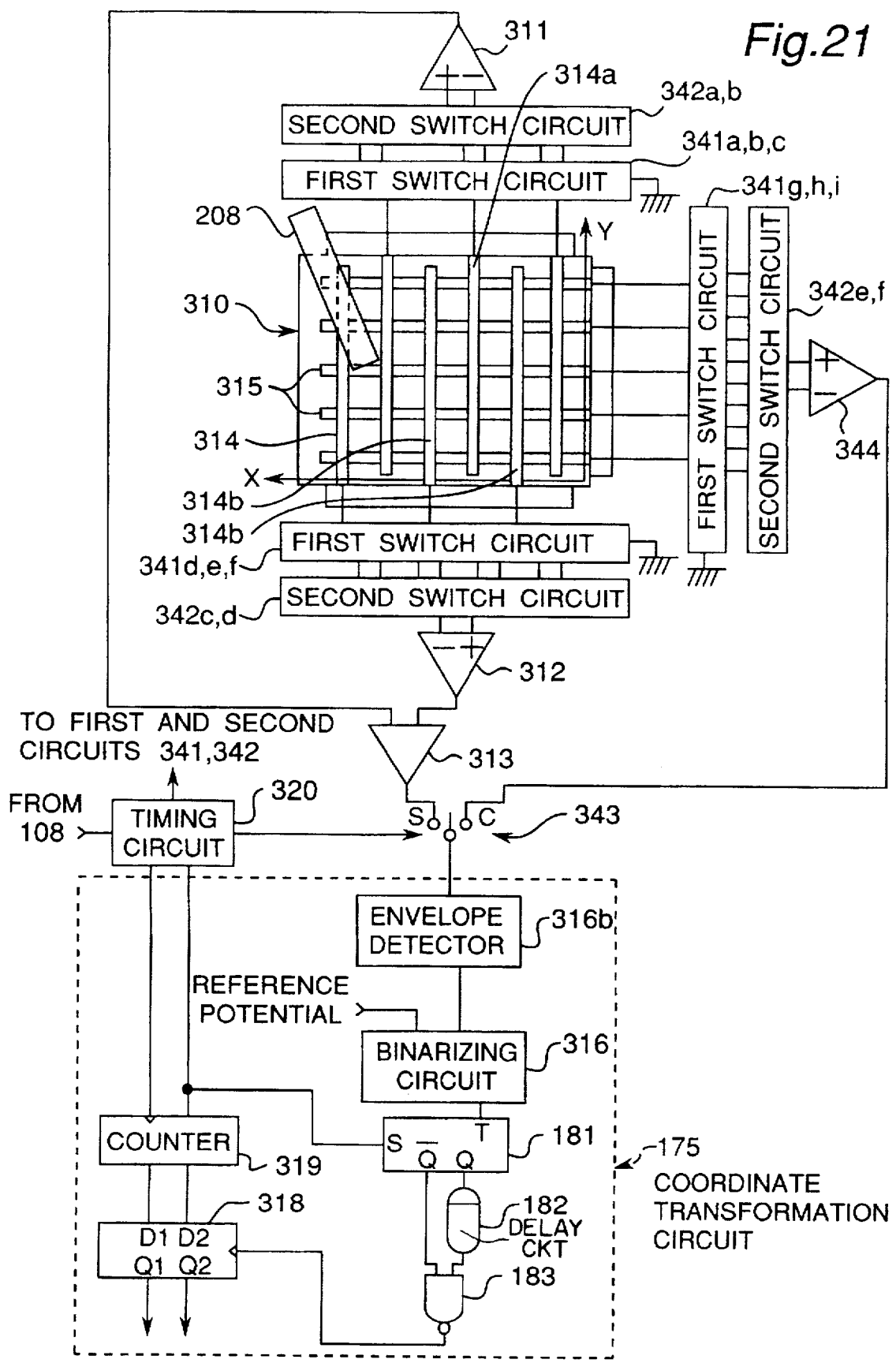
FIG. 21 is an explanatory view of a detailed structure of the third embodiment.

As shown in FIG. 21, in the third embodiment, first switch circuits 341a, 341b and 341c and second switch circuits 342a and 342b are provided for the segment electrodes 314a, while first switch circuits 341d, 341e and 341f and second switch circuits 342c and 342d are provided for the segment electrodes 314b. Further, first switch circuits 341g, 341h and 341i and second switch circuits 342e and 342f are provided for the common electrodes 315.

Though FIG. 21 does not show a detailed structure of the switch circuits provided in the third embodiment, the switch circuits have utterly the same structures as those of the switch circuits shown in FIG. 8 of the first embodiment except for a difference in amount of circuits.

In detail, the first switch circuits 341a, b and c and 341d, e and f shown in FIG. 21 have the same structures as those of the switch circuits 249a, b and c shown in FIG. 8. The first switch circuits 341g, h and i shown in FIG. 21 have the same structures as those of the switch circuits 249e, f and g shown in FIG. 8. The second switch circuits 342a and b and the second switch circuits 342c and d shown in FIG. 21 have the same structures as those of the switch circuits 250a and b shown in FIG. 8 except for a difference in amount of circuits. Further, the second switch circuits 342e and f shown in FIG. 21 have the same structures as those of the switch circuits 250c and d shown in FIG. 8 except for a difference in amount of circuits. Therefore, the operation of the switch circuits of the third embodiment can be easily understood with reference to FIG. 8 together with FIG. 21 while taking the above-mentioned correspondence into account.

Then, an operation of the timing circuit 320 will be described. The timing circuit 320 mainly controls the operations of the first, second and third switch circuits 341, 342 and 343. Further, the timing circuit 320 generates a clock signal to be inputted to the counter 319. The timing circuit 320 controls the switch circuits 341, 342 and 343, and inputs the clock signal to the counter 319 so as to make the data held in the D-flip-flop 318 represent the coordinates of the electric field generator 208. The above-mentioned control operation is performed by the timing circuit 320 in a manner as shown in FIG. 12 of the first embodiment.

In the third embodiment, with the common electrodes 315 all connected to the ground, a signal from the segment electrodes 314 can be detected by the differential amplifiers 311 and 312 in a manner as described in the aforementioned experiment. Also, with the segment electrodes 314 all connected to the ground, a signal can be detected from the common electrodes 315 by a differential amplifier 344. In the aforementioned experiment, a double-humped voltage waveform was able to be obtained in correspondence with the position of the electric field generator. The bottom portion of the double-humped voltage waveform represented the coordinates of the position in which the electric field generator 208 was located. Therefore, by performing two times the operations of position coordinate detection from the segment electrode side and position coordinate detection from the common electrode side, the xy-coordinates of the electric field generator was able to be specified. Therefore, also in the third embodiment, it is proper to time-sharingly perform two times the operations of the coordinate detection of the position of the electric field generator 208 from the segment electrode 314 side and from the common electrode 315 side. Similarly to the experiment shown in FIG. 5, it is required to connect all the common electrodes 315 to the ground when the coordinates of the position are detected by scanning the segment electrodes 314. The converse can also hold. Therefore, the timing circuit 320 switchingly controls the switch circuits 341 and 342 so as to satisfy the aforementioned requirements. In detail, when the segment electrodes 314 are scanned to detect the x-coordinate value of the electric field generator 208, the first switch circuits 341a, b and c and 341d, e and f connected to the segment electrodes 314 are connected to the second switch circuits 342a and b and 342c and d in the next stage to transmit signals. Then, the first switch circuits 341g through i connected to the common electrodes 315 are connected to the ground. Consequently, the signals from the segment electrodes 314a and b are transmitted to the differential amplifiers 311 and 312 via the second switch circuits 342a and b and c and d. Then, signals amplified in the differential amplifiers 311 and 312 are further added together in the adder 313. Then, an output signal from the adder 313 is inputted to the coordinate transformation circuit 175 via the third switch circuit 343 switched to the segment electrode side s, and then transmitted to the binarizing circuit 316 via the envelope detection circuit 316b. A subsequent signal flow and an operation of the coordinate transformation circuit 175 are the same as explained in the first embodiment.

Conversely, when the coordinate detection operation is performed from the common electrode 315 side, the first switch circuits 341g through 341i connected to the common electrodes 315 are connected to the second switch circuits 342e and f in the next stage to transmit the signal. Meanwhile, the switch circuits 341a through f connected to the segment electrodes 314 are connected to the ground. The signal outputted from the second switch circuits 342e and 342f is transmitted via the differential amplifier 344 to the third switch circuit 343 which is switched to the common electrode side c. Then, the above-mentioned signal is transmitted to the envelope detection circuit 316b and the binarizing circuit 316 of the coordinate transformation circuit 175. A subsequent signal flow and an operation of the coordinate transformation circuit 175 are the same as those of the first embodiment described hereinbefore.

The second switch circuits 342a through 342f are switched so as to scan the segment electrodes 314 and the common electrodes 315, with which it can be detected how great value of voltage is outputted from each of the segment electrodes 314 and the common electrodes 315 by means of the differential amplifiers 311, 312 and 344. The second switch circuit 342 sequentially scans the electrodes from the one adjacent to the origin of the xy-coordinate axes shown in FIG. 21. In FIG. 21, the origin is located in a lower right position of the LCD panel 310 similarly to FIG. 8.

When the connection states of the contact points of the switch circuits 341 and 342 shown in FIG. 21 are in the same connection states as those of the contact points of the first and second switch circuits shown in FIG. 8, a negative input terminal of the differential amplifier 311 is connected to the first segment electrode 314a as counted from the origin, and a positive input terminal thereof is connected to the second segment electrode 314a as counted from the origin. When the scanning proceeds by one step, the negative input terminal of the differential amplifier 311 is connected to the second segment electrode 314a as counted from the origin, and the positive input terminal thereof is connected to the third segment electrode 314a as counted from the origin.

Meanwhile, a positive input terminal of the differential amplifier 312 is connected to the first segment electrode 314b as counted from the origin, and a negative input terminal thereof is connected to the second segment electrode 314b as counted from the origin. When the scanning proceeds by one step, the positive input terminal of the differential amplifier 312 is connected to the second segment electrode 314b as counted from the origin, and the negative input terminal thereof is connected to the third segment electrode 314b as counted from the origin.

Thus a total of four electrodes comprised of a pair of two electrodes connected to the two differential amplifiers 311 and 312 constitute a pair, and a combination of the pair is shifted sequentially one electrode by one electrode in a direction in which the x-axis extends. Thus, combinations of the segment electrodes to be connected to the differential amplifiers 311 and 312 are sequentially scanned. Therefore, a waveform obtained by replacing the axis of abscissas of the double-humped waveform shown in FIG. 20 with a time base is outputted from the output terminal of the adder 313. In other words, the state of the experiment shown in FIG. 20 is reproduced.

In the third embodiment, the scanning operation is performed by pairing adjoining two segment electrodes 314 of the upper side and those of the lower side of the LCD panel 310 in order to faithfully reproduce the experiment shown in FIG. 5. However, the aforementioned scanning may be performed by grouping, for example, adjoining or adjacent two or more electrodes as an electrode group and pairing adjoining two electrode groups.

The scanning operation is performed by outputting a switching control signal from the timing circuit 320 to control lines which are wired from the timing circuit 320 to the switch circuits 341 through 343. The switching operation of the switch circuits is performed according to FIG. 12.

The switch circuits for performing the switching operation by a signal inputted from the control lines wired from the timing circuit 320 can be easily implemented by, for example, an appropriate multiplexer device. Furthermore, the timing circuit 320 for outputting a control signal as described above to the control lines can be easily implemented by combining a counter device, a gate device, and so forth availed on the market.

A timing at which the second switch circuits 342 are sequentially switched under the control of the timing circuit 320 to scan the electrodes 314 and 315 and a timing at which the counter 319 counts one count by one count are made to coincide with each other. Therefore, the count value of the counter 319 represents the ordinal number from the origin of each of the electrodes 314 and 315 connected to the differential amplifiers 311, 312 and 344 in the scanning time. Also, the timing circuit 320 generates a switching control signal to be inputted to the second switch circuits 342 in synchronization with the clock signal inputted from the timing circuit 320 to the counter 319. It is easy to make the timing circuit 320 have a structure for generating such a control signal.

If the switch circuits 341, 342 and 343 are thus controlled, consequently a value representing the ordinal number from the origin of the electrode connected to the differential amplifiers in the electrode scanning time, i.e., the count value of the counter 319 is held in the D-flip-flop 318. The value held in the D-flip-flop 318 is a count value that the counter 319 has counted sequentially one count by one count in synchronization with the electrode scanning from a time when the counter 319 is reset to a time when a negative pulse is generated from the NAND gate 183.

In other words, the count value is a value which is obtained, as a result of searching by means of the switch circuits the bottom of the double-humped output voltage corresponding to the coordinates of the position of the electric field generator 208 by shifting in a scanning direction one by one the electrodes of the LCD panel 310 connected to the differential amplifiers, by representing the position of the bottom with the amount of electrodes counted by the coordinate transformation circuit 175, and then held in the D-flip-flop 318. The x-coordinate value or the y-coordinate value at the position in which the electric field generator 208 is located is represented by the counted amount of electrodes.

As described above, the x-coordinate value and the y-coordinate value of the position in which the electric field generator 208 is located are held in the D-flip-flop 318 when the negative pulse is outputted from the NAND gate 183 in each detection period shown in FIG. 12. Data representing the coordinates of the position of the electric field generator 208 can be separately utilized as detected coordinate data. Though there is no specific limitation on application methods of the data, for example, an application similar to that described in the first embodiment can be achieved.

It is to be noted that each switch circuit may have a structure other than that of the third embodiment. Since each switch circuit can be easily constructed in a variety of ways, no description is provided therefor herein. What is essential is the assurance of the timing shown in FIG. 12 by means of the switch circuits. Furthermore, there is no special reason for using a switch circuit, and therefore a circuit provided by effectively combining a three-state buffer circuit and other devices may be utilized.

Although the third embodiment has been described based on an LCD panel having 30 pixels shown concretely for simplicity, utterly the same basic structure and basic operation as those of the third embodiment can be also achieved in an LCD panel having more pixels.

Furthermore, when the TFT LCD panel 310 is used as in the third embodiment, connections of the segment electrodes and the common electrodes to the switch circuits are not limited to the connections shown in FIGS. 19 and 21. That is, the electrodes may be connected in a manner as shown in FIG. 8 where a duty ratio drive LCD panel is used. In the above-mentioned case, either one of the two differential amplifiers provided at the upper and lower sides shown in FIG. 19 is required to be provided. That is, in the present case, there is no need to provide two differential amplifiers at the upper and lower sides, and either one of the differential amplifiers is required to be provided. Then, the segment electrodes are to be used every other one for coordinate detection.

The third embodiment includes the function changeover control circuit 108 shown in FIG. 1. The function changeover control circuit 108 controls the image display drive circuit 101 and the coordinate detection circuit 105 to make the LCD panel 310 perform time-sharingly alternately image display and coordinate detection operations. The function changeover control circuit 108 shown in FIG. 1 outputs a control signal to the timing circuit 320 shown in FIG. 21. Then, the coordinate detection circuit 105 performs the aforementioned coordinate detection operation only in the coordinate detection period, and operates to disconnect the first switch circuits 341 and so forth from the LCD panel 310 so that they do not hinder the image display operation in the image display period. In more detail, in the image display period, the first switch circuits 341a through i connect contact points thereof so that all the electrodes of the LCD panel 310 are connected to the second switch circuits 342. The second switch circuits 342 are connected to contact points connected to nothing. Therefore, the differential amplifiers 311, 312 and 344 subsequent to the second switch circuits 342 are electrically disconnected from the LCD panel 310. As a result, the image display operation is not influenced by the coordinate detection circuit 105 shown in FIG. 1 including the coordinate transformation circuit 175. In other words, an operation similar to that of the conventional LCD device provided specially for image display can be performed in the image display period. The operations of the function changeover control circuit 108 and the image display drive circuit 101 provided in the third embodiment are the same as those of the first embodiment.

As described hereinbefore, the aforementioned first through third embodiments are designed to make respective LCD panels have a coordinate detection function by applying the present invention to the LCD panels which operate according to different principles of image display operations.

Figure 22:
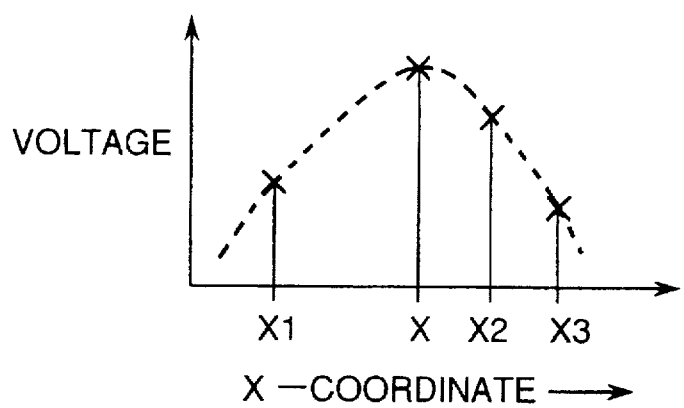
FIG. 22 is an explanatory view of an exemplified coordinate detection method which can be commonly used in the first through third embodiments of the present invention.

Furthermore, in the descriptions of the first through third embodiments, the position of the electric field detector is determined by means of a binarized pulse as shown in FIGS. 9A through 9F. However, instead of using the binarized pulse signal, it is acceptable to detect three points which represent x-coordinate values of x1, x2 and x3 and voltages corresponding to the coordinate values in a manner as shown in FIG. 22, perform regression analysis or the like based on the three points to apply a polynomial, and detect the coordinates of an objective point x corresponding to the position in which the electric field generator is located. There can be considered a variety of other ways to derive the coordinates of the position of the electric field generator by detecting a voltage induced at the electrodes of the LCD panel by means of an electric field exerted from the electric field generator.

One of the segment electrode and the common electrode, being not used for coordinate detection, is connected to the ground in the first through third embodiments, however, the electrode may be opened as connected to nothing. In the above-mentioned case, the electrode tends to be influenced by external noises, and therefore it is required to separately take some countermeasure such as shield. Therefore, when the electrode is not connected to the ground, the electrode is preferably connected to a specified reference potential. It is of course acceptable to superimpose a sort of AC voltage or DC voltage via, for example, a capacitor on the electrode which is not used for coordinate detection.

Although the second and third embodiments are provided with the coordinate transformation circuit 175 of the first embodiment, each of the embodiments may be provided with a coordinate transformation circuit 175T of the modification of the first embodiment.

Fourth embodiment

Figure 23:
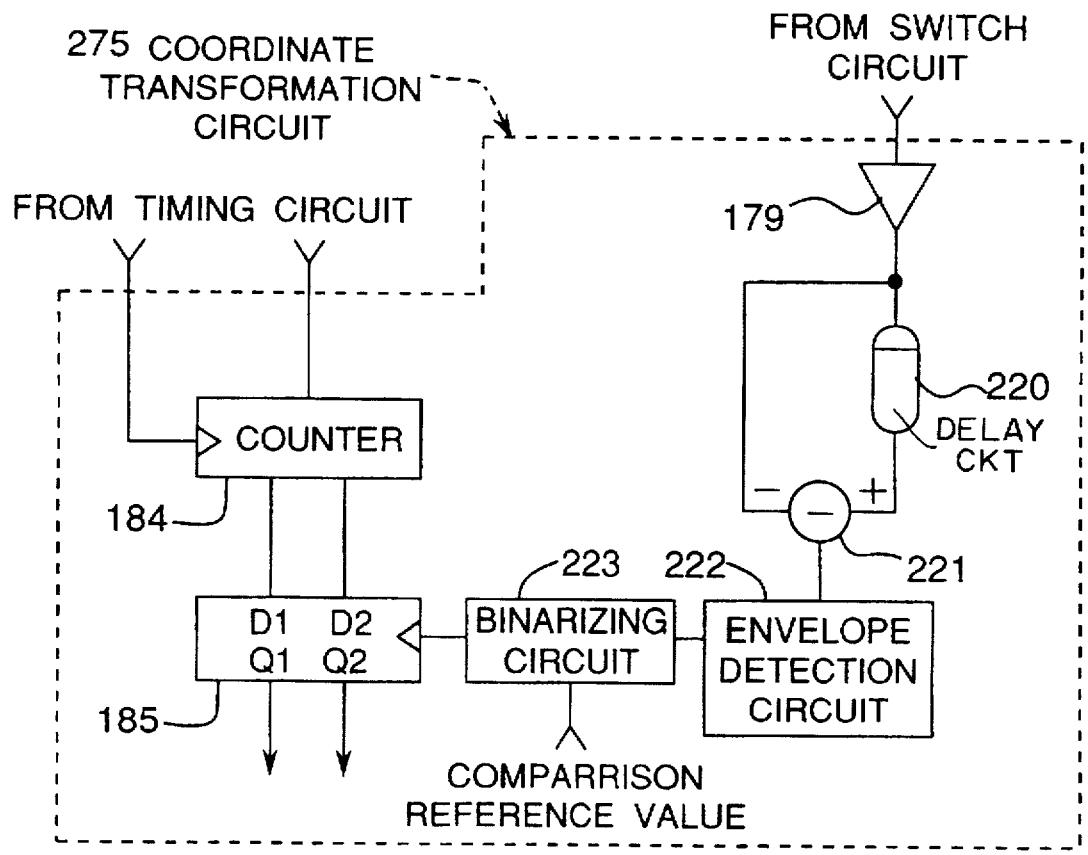
FIG. 23 is a block diagram of a coordinate transformation circuit according to a fourth embodiment of the present invention.

Next, a fourth embodiment of the present invention will be described. The fourth embodiment has a feature that it includes a coordinate transformation circuit 275 as shown in FIG. 23 having a principle of operation of coordinate transformation fundamentally different from that of the coordinate transformation circuit 175 owned by the first embodiment shown in FIG. 8 in place of the coordinate transformation circuit 175. The other components except for the coordinate transformation circuit 275 have the same structure as those of the first embodiment. Therefore, the fourth embodiment includes a function changeover control circuit 108 and an image display drive circuit 101 having the same structures as those of the first embodiment.

The fourth embodiment is common to the first through third embodiments in a point as follows. That is, a double-humped signal waveform in which the axis of abscissas of the experiment result shown in FIG. 7 is replaced by a time base is inputted to the coordinate transformation circuit 175, and the coordinate transformation circuit 175 detects a timing at the bottom of the double-humped output signal so as to detect the coordinates of the position of the electric field generator 208.

Furthermore, the fourth embodiment differs from the first through third embodiments in a point as follows. That is, the coordinate transformation circuit having a structure different from those of the first through third embodiments is provided, and the coordinate transformation circuit detects the bottom portion of the double-humped output signal not by the amplitude of the signal but by the phase of the signal. In other words, the coordinate transformation circuit provided in the fourth embodiment detects the bottom portion of the double-humped output signal by taking advantage of a phase inversion characteristic that is characterized by a phase difference of 180° between a portion of the signal before the bottom portion of the double-humped output and a portion of the signal behind the bottom portion. As described above, the point of the fourth embodiment is to detect the timing of the bottom portion by phase paying attention to the fact that the phase of the signal is inverted between the portions before and behind the bottom portion.

FIG. 23 shows the structure of the coordinate transformation circuit 275 provided in the fourth embodiment. The coordinate transformation circuit 275 includes a differential amplifier 179 of which input terminals are connected to switch circuits similar to the switch circuits of the first embodiment, a delay circuit 220 connected to an output terminal of the differential amplifier 179, and a subtracter 221 of which positive input terminal + is connected to the output terminal of the delay circuit 220. A negative input terminal − of the subtracter 221 is connected to the output terminal of the differential amplifier 179. An output terminal of the subtracter 221 is connected to an envelope detector 222. An output terminal of the envelope detector 222 is connected to a binarizing circuit 223. An output terminal of the binarizing circuit 223 is connected to a clock terminal of the D-flip-flop 185. To an input terminal of the D-flip-flop 185 is connected an output terminal of the counter 184. Though not shown, the counter 184 is connected to a timing circuit having the same structure as that of the timing circuit of the first embodiment.

In the fourth embodiment having the above-mentioned structure, a signal which is obtained by scanning the segment electrodes or the common electrodes of the display panel and transmitted to the differential amplifier 179 similarly to the first embodiment is amplified in the differential amplifier 179 and then inputted to the delay circuit 220. An output signal waveform of the differential amplifier 179 is shown in FIG. 24A. In FIGS. 24A through 24E, the axis of abscissas represents time, while the axis of ordinates represents amplitude. As shown in FIG. 24A, the output signal of the differential amplifier 179 has a double-humped signal waveform similarly to the first embodiment. Further, as shown in FIG. 24B, the output waveform of the delay circuit 220 is a waveform obtained by delaying the waveform shown in FIG. 24A by a specified time. The delay time is related to the switching speed of the switch circuits. The delay time is preferably equal to or shorter than a time interval between the two peaks shown in FIG. 24A. Therefore, the slower the switching speed of the switch circuits is, the longer the delay time is to be set. Therefore, the switching speed must be determined taking the practicability of the delay circuit 220 into account. FIGS. 24A through 24E show an example wherein the delay time of the delay circuit 220 is equal to the time interval between the two peaks.

Then, the output signal of the differential amplifier 179 having the double-humped waveform shown in FIG. 24A and the output signal of the delay circuit 220 having the double-humped waveform shown in FIG. 24B are inputted to the subtracter 221 to be subjected to a subtraction process therein. The phase of the signal is inverted by 180° between the portions before and behind the bottom of the double-humped input signal. Therefore, when signals are simultaneously inputted to the two input terminals of the subtracter 221, the signals themselves are indeed subjected to the subtraction process, however, the signal waveform, i.e., the amplitudes of the signals are added together in a manner as shown in FIG. 24C. Therefore, an output waveform of the subtracter 221 becomes a waveform having a highest peak and two low peaks arranged with interposition of the highest peak as shown in FIG. 24C.

Then, the output signal of the subtracter 221 is inputted to the envelope detector 222 in which the envelope of the signal is extracted. The envelope waveform is shown in FIG. 24D. Further, the signal having the above-mentioned envelope is inputted to the binarizing circuit 223 which compares the signal with a reference voltage for comparison to make the portion having an amplitude greater than that of the reference voltage have an amplitude of zero and make the portion having an amplitude smaller than that of the reference voltage have a specified amplitude, thereby binarizing the signal in a manner as shown in FIG. 24E. The binarized signal is a pulse signal having a negative polarity, or a pulse signal having a negative polarity which substantially falls at the time when the bottom of the double-humped signal takes place.

When there is a delay time longer than the delay time shown in FIGS. 24A and 24B and the output waveform of the differential amplifier 179 and the output waveform of the delay circuit 220 do not timely overlap each other, the signal inputted to the subtracter 221 is outputted from the subtracter 221 while satisfying the aforementioned phase relationship. Exchange of inputs of the subtracter 221 can be of course properly performed based on a logic.

It is to be noted that, as shown in FIG. 24E, the output pulse of the binarizing circuit 223 has a time delay approximately corresponding to the delay time of the delay circuit 220 relative to the bottom portion of the output signal of the differential amplifier 179. The above-mentioned phenomenon possibly causes an error in coordinate detection. However, the delay time of the delay circuit 220 is always constant. Therefore, by preparatorily measuring a value of deviation of the aforementioned delay time in coordinates and subtracting the value of deviation from the coordinate data held in the D-flip-flop (latch circuit) 185, the possible occurrence of an error in coordinate detection can be prevented.

The fourth embodiment, which performs a coordinate detection operation with regard to the change in phase of the signal, has an inherent feature that it is less influenced by noises which enter into the detected signal and cause a change in amplitude of the signal.

Operations of the fourth embodiment other than that described above are utterly the same as those of the first embodiment of the present invention, and therefore no description is provided therefor.

Fifth embodiment

Figure 25:
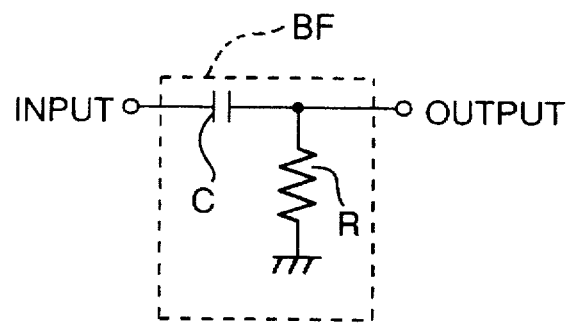
FIG. 25 is a circuit diagram of a band-pass filter characteristic of a fifth embodiment of the present invention.

Next, a fifth embodiment of the present invention will be described. The fifth embodiment differs from the first through third embodiments only in that a band-pass filter BF as shown in FIG. 25 is connected to the input terminal of the coordinate detection circuit 105 shown in FIG. 1.

The band-pass filter BF is practically required to be connected to the input terminal of the differential amplifier 242 and the input side of the switch circuits 249a through 249h in the circuit of the first embodiment shown in FIG. 8. In the circuit of the second embodiment shown in FIG. 16, the band-pass filter BF is required to be connected to the input terminals of the differential amplifiers 281, 282 and 294 and the input side of the switch circuits 291a through 291l. In the circuit of the third embodiment shown in FIG. 21, the band-pass filter BF is required to be connected to the input terminals of the differential amplifiers 311, 312 and 344 and the input side of the switch circuits 341a through 341i.

The band-pass filter BF includes a capacitor C and a resistor R connected across an output side terminal of the capacitor C and the ground. The band-pass filter BF selects only a frequency component at and around the frequency of the AC electric field generated by the electric field generator 208 and allows it to pass. Therefore, by virtue of the existence of the band-pass filter BF, only a signal frequency effective for coordinate detection is allowed to satisfactorily pass and unnecessary noises such as hum noises belonging to a cut-off frequency range of the filter BF can be effectively reduced.

Figure 39:
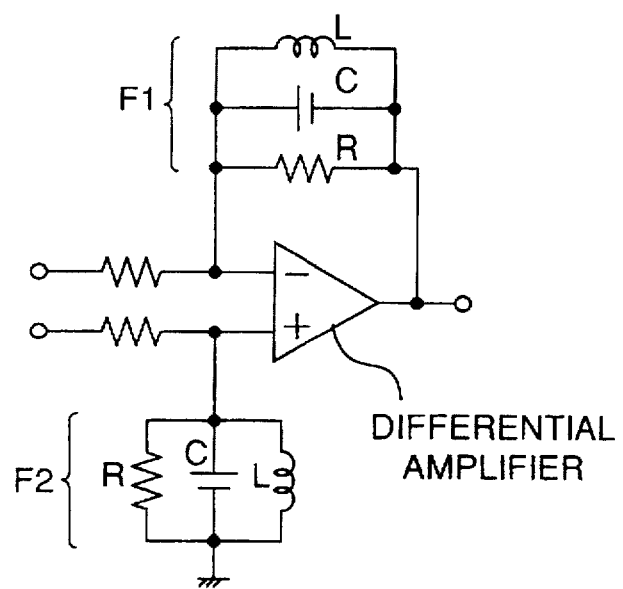
FIG. 39 is a circuit diagram wherein the differential amplifier of the embodiment is provided with a feedback circuit.

In the first through fifth embodiments, the frequency characteristic can be optimized by connecting a feedback circuit F1 as shown in FIG. 39 across the output terminal and the inverted input terminal of each differential amplifier. The feedback circuit F1 is constituted by a parallel circuit comprised of an inductance L, a capacitor C and a resistor R. The feedback device includes an LC resonance circuit which resonates at the frequency of the AC electric field. In the parallel resonance circuit, the impedance is maximized at and around the resonance point, and therefore the feedback ratio is minimized. Consequently, a great gain can be obtained only at and around the resonance frequency. In other words, such a device operates as a band-pass filter. It is to be noted that the resistor R is used for adjusting the maximum gain. In the circuit shown in FIG. 39, a parallel resonance circuit F2 comprised of a resistor R, a capacitor C and an inductance L is connected across the non-inverted input terminal of each differential amplifier and the ground. The circuit F2 also resonates at the frequency of the AC electric field, and consequently the impedance is maximized at and around the resonance frequency.

Although envelope detectors (such as 186 shown in FIG. 8, 191 shown in FIG. 10, 286b shown in FIG. 15, 286b shown in FIG. 16, 316b shown in FIG. 19, 316b shown in FIG. 21 and 222 shown in FIG. 23) are used in the embodiments described hereinbefore, the envelope detectors may be each replaced by a synchronous detector. If the above-mentioned arrangement is adopted, though a slightly complicated circuit configuration results, the envelope of the signal can be extracted without distortion more correctly than the envelope detector, which produces an effect of improving the pen coordinate detection accuracy.

Figure 40:
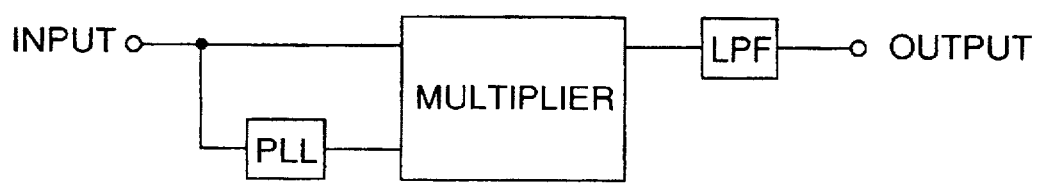
FIG. 40 is a circuit diagram of a synchronous detector which can substitute for an envelope detector of the embodiment.
Figure 41:
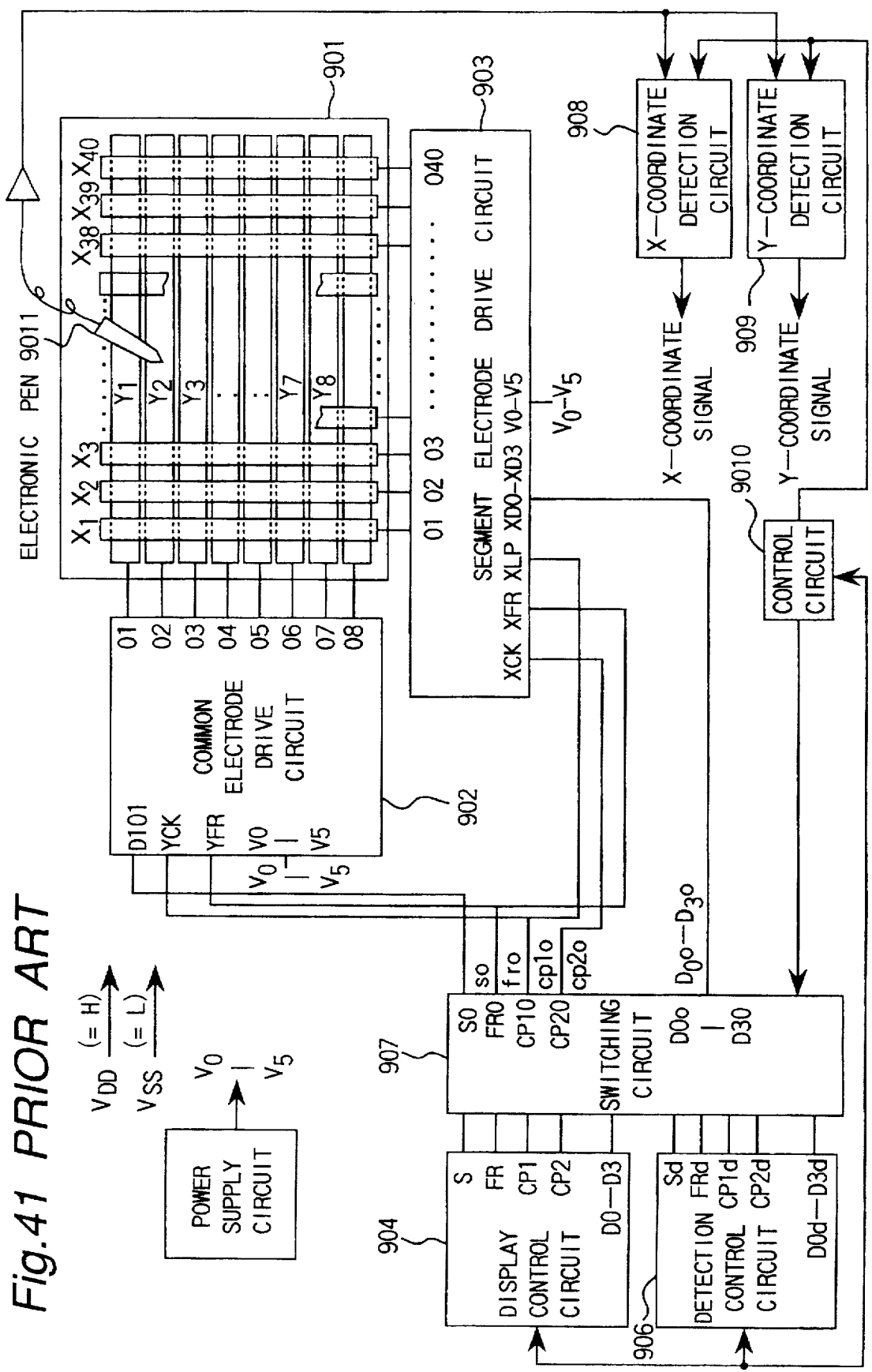
FIG. 41 is an explanatory view of a structure of a display panel which concurrently performs coordinate detection and image display operations of a first prior art.
Figure 42:
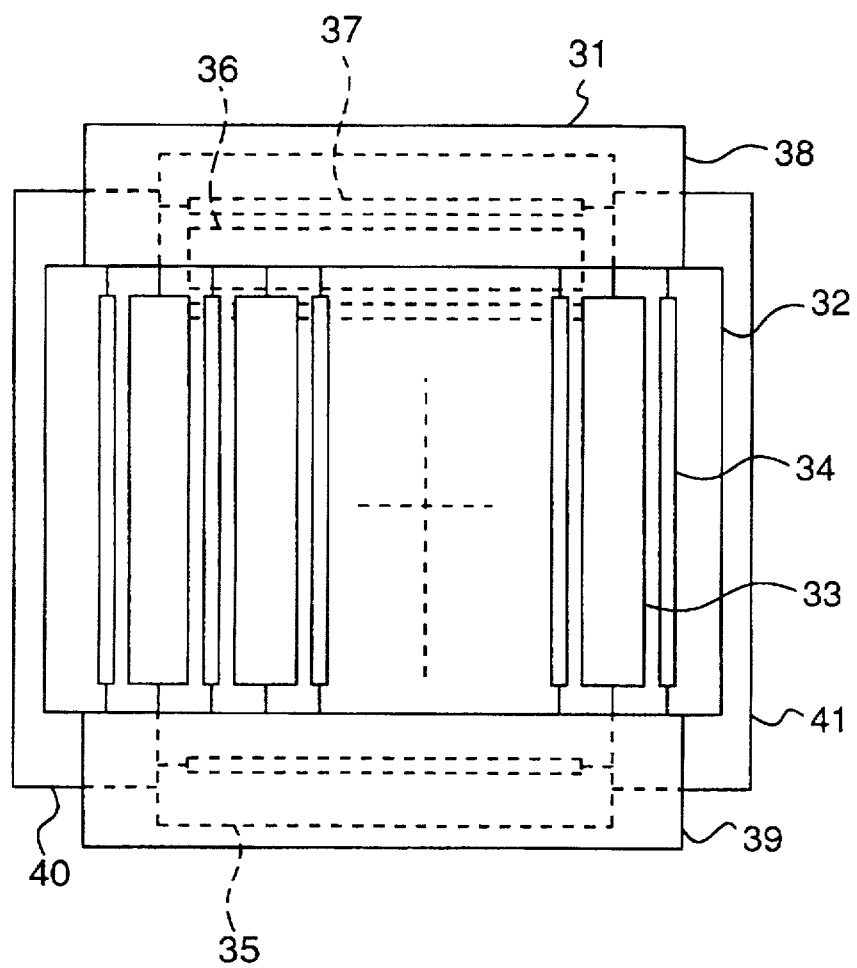
FIG. 42 is an explanatory view of an LCD panel of a second prior art.
Figure 43:
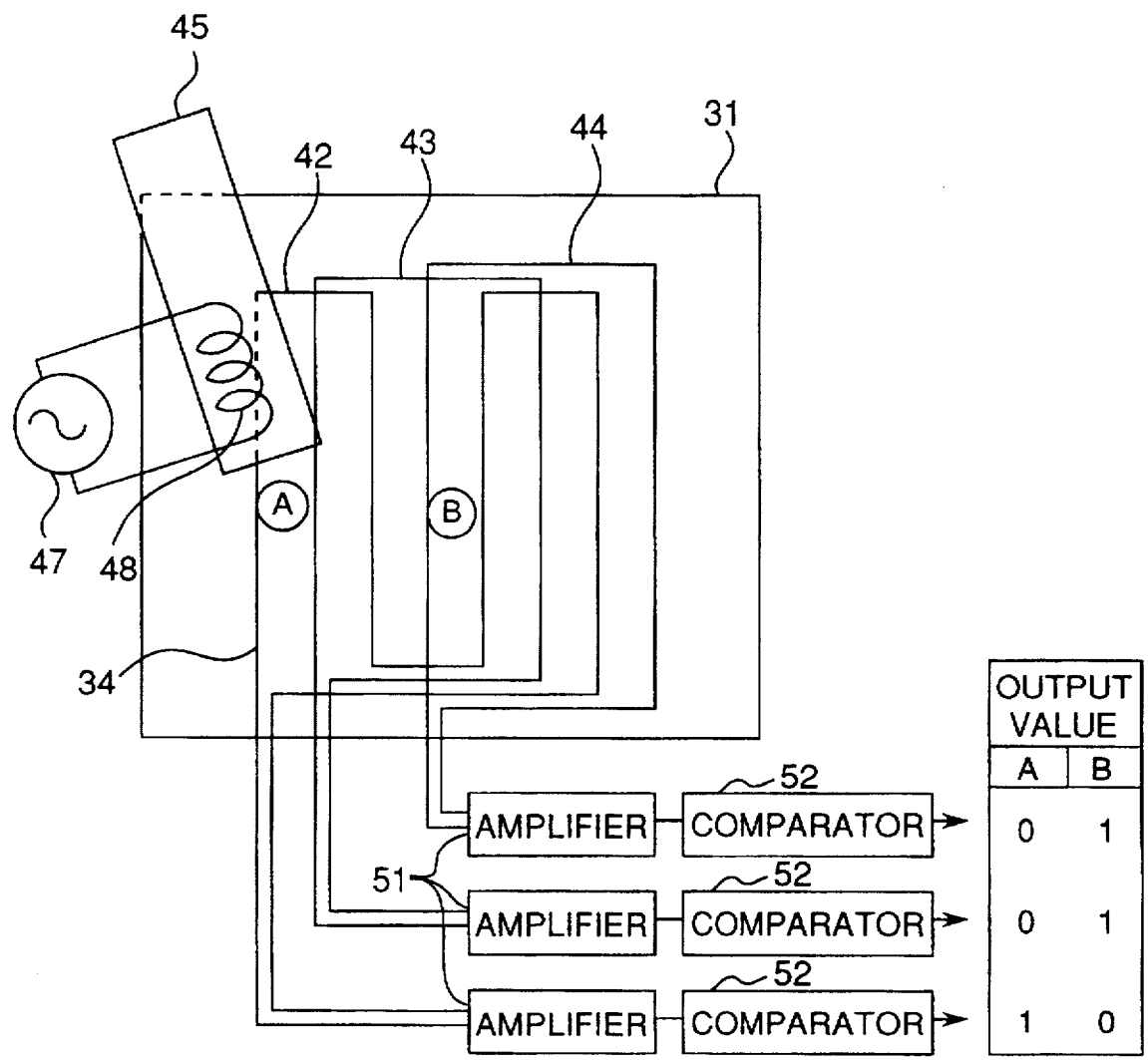
FIG. 43 is an explanatory view of a coordinate detection technique of the second prior art.
Figure 44:
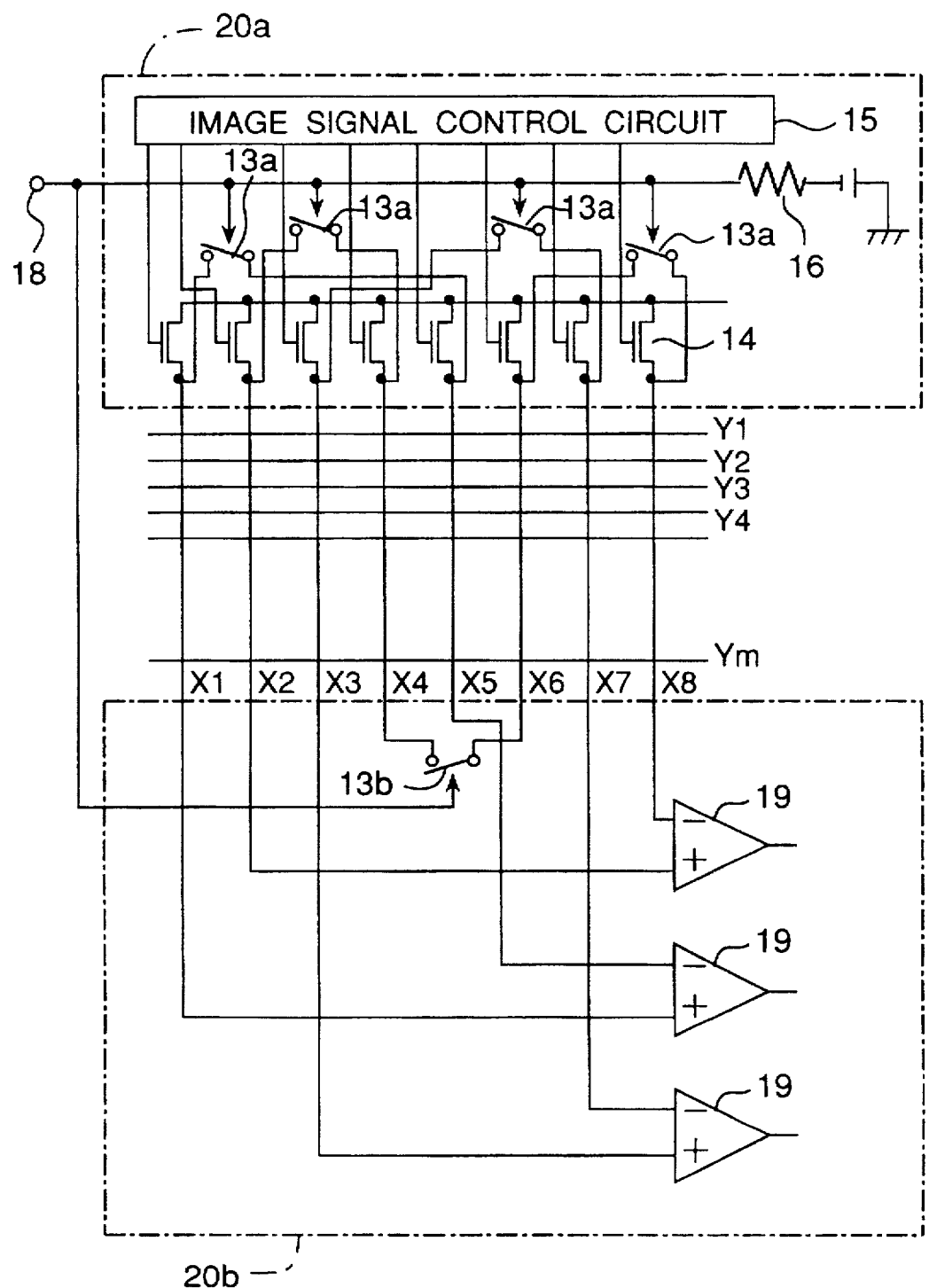
FIG. 44 is a circuit diagram of an essential part of a third prior art.
Figure 45:
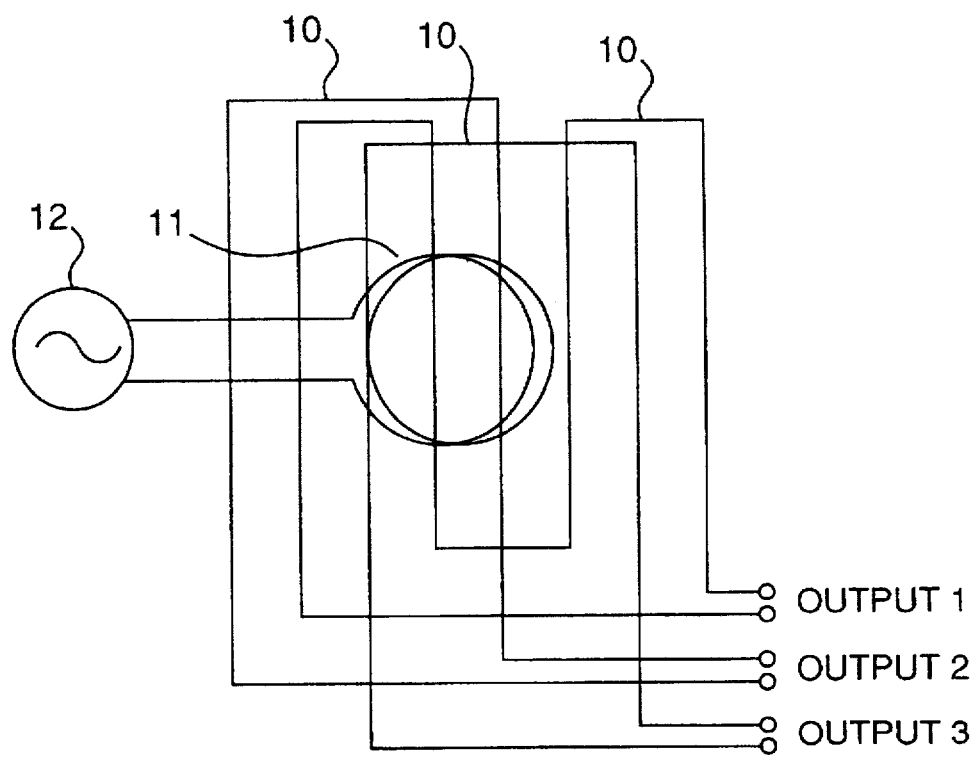
FIG. 45 is an explanatory view of a coordinate detection technique of the third prior art.
Figure 46A:
FIGS. 46A, 46B, 46C, 46D, 46E and 46F are timing charts of the third prior art.
Figure 46B:
Figure 46C:
Figure 46D:
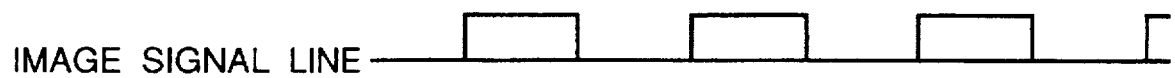
Figure 46E:
Figure 46F:
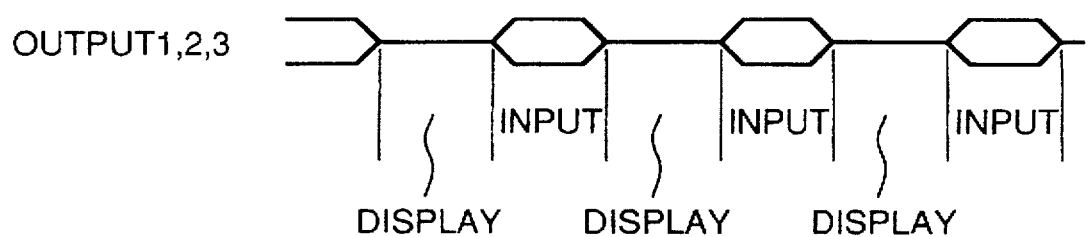

A synchronous detector shown in FIG. 40 can directly substitute for each of the envelope detectors provided in the aforementioned embodiments. A PLL forms a continuous signal synchronized in phase with a carrier component of the input signal, and obtains a product of the input signal and the formed continuous signal in a multiplier circuit. Furthermore, a low-pass filter LPF allows only a low-frequency component to pass so as to extract an envelope of the signal. The operation of such a synchronous detector is well known, and the detector can be easily implemented by combining devices availed on the market.

As is apparent from the above description, in the coordinate detection device of the present invention, the AC generator of the coordinate pointing device outputs an AC electric field from the tip end of the electrode. When the outputted AC electric field effects on the first and second electrodes of the panel, a voltage corresponding to the amplitude of the AC electric field is generated at the first and second electrodes.

Meanwhile, the switching means sequentially switches the connections of the first and second electrodes of the panel so as to connect the selected electrodes to the differential amplifier. Therefore, when the first and second electrodes at which the voltage is induced are each connected to the differential amplifier, the differential amplifier amplifies the induction voltage and outputs the resulting voltage.

The voltage outputted from the differential amplifier is inputted to the coordinate detection means. Then, the coordinate detection means detects the coordinates of the coordinate pointing device on the panel based on the timing at which the first and second electrodes are each selected and the output of the differential amplifier.

Therefore, according to the present invention, the coordinates of the coordinate pointing device can be detected without necessitating a signal line between the coordinate pointing device and the panel. Furthermore, the coordinates of the coordinate pointing device can be detected according to the voltage induced at the first and second electrodes by an electric field generated from the coordinate pointing device. Therefore, the first and second electrodes are not required to form a closed loop. Therefore, an LCD panel provided specially for image display can be used as the above-mentioned panel without making alterations. Furthermore, according to the present invention, the first and second electrodes are not required to form a closed loop, and therefore a coordinate detection function can be incorporated into the LCD panel provided specially for image display without providing an electric circuit opposite to the four sides of the LCD panel provided specially for image display. The above-mentioned fact means that the coordinate detection function can be incorporated into the image display device without increasing the size of the image display device having the LCD panel provided specially for image display, and also means that an image display device having a coordinate detection function can be manufactured without making great alterations in the existing manufacturing equipment for the image display device.

Therefore, according to the present invention, there can be provided a coordinate detection device capable of preventing the increase of development cost and the reduction of yield, and dispensing with investment for equipment which may cause cost increase, thereby totally contributing to development of the industry.

Furthermore, according to the present invention, a signal from the electrodes of the panel is amplified in the differential amplifier. The above-mentioned arrangement has an advantage that external noises which have entered evenly into two inputs of the differential amplifier can be effectively removed.

Furthermore, according to an embodiment, a material having an electro-optical effect is sealedly filled in a space between two substrates, and the first and second electrodes are arranged on the substrates while making the first and second electrodes concurrently serve as electrodes for image display. Therefore, a display panel which has concurrently the coordinate detection function and the image display function can be provided.

Furthermore, according to an embodiment, the coordinate pointing device outputs electric fields which are opposite in phase to each other from its first and second electrodes to which electric fields being opposite in phase to each other are applied from the oscillator.

Therefore, the electrode of the panel receiving the electric field from the first electrode outputs an electric field opposite in phase to the electric field outputted from the electrodes of the panel receiving the electric field from the second electrode. Therefore, electric fields which are opposite in phase to each other are applied to the differential amplifier. Therefore, the coordinate detection means can detect a state in which the electrodes of the coordinate pointing device are located in the position of the panel electrodes selected by the switching means upon detecting a discontinuity of the signal outputted from the differential amplifier occurring when the electric fields which are opposite in phase to each other are applied to the differential amplifier.

Furthermore, according to an embodiment, the first electrode of the coordinate pointing device is a cylinder-shaped electrode, while the second electrode of the coordinate pointing device is a rod-shaped electrode arranged inside the cylinder-shaped electrode. Therefore, even when the coordinate pointing device is rotated around the center axis of the rod-shaped electrode, unchanged electric fields are applied from the coordinate pointing device to the electrodes of the panel. Therefore, the electric fields applied to the electrodes of the panel are not changed by the above-mentioned rotation irrelevant to the coordinates to be detected, thereby allowing an improved coordinate detection accuracy to be achieved.

Furthermore, according to an embodiment, the first electrode of the coordinate pointing device is arranged as separated apart at approximately regular intervals around the circumference of the second electrode. Therefore, the rotation of the coordinate pointing device around the center axis does not change the electric fields applied to the electrodes of the panel, thereby allowing an improved coordinate detection accuracy to be achieved.

Furthermore, according to an embodiment, the coordinate pointing device has a battery storing section for storing therein a battery which serves as a power source for the AC oscillator. Therefore, by storing the battery in the battery storing section, there is no need to supply an electric power to the coordinate pointing device from outside the coordinate pointing device. Therefore, the coordinate pointing device is permitted to be connected to nothing. The above-mentioned arrangement allows a complete codeless coordinate pointing device to be achieved.

Furthermore, according to an embodiment, when the coordinate pointing device is stored in the storing portion provided at the casing to which the panel is mounted, the charging terminal owned by the coordinate pointing device and the power supply terminal of the casing are electrically connected to each other. Therefore, in the above-mentioned time, the secondary battery stored in the battery storing section of the coordinate pointing device is charged. Therefore, the operating life of the battery which is the power source of the coordinate pointing device can be remarkably increased.

Furthermore, according to an embodiment, a resonance circuit which resonates with the AC electric field generated by the AC oscillator is connected across the output terminal and the inverted input terminal of the differential amplifier. Therefore, the differential amplifier can selectively amplify the AC electric field with a great gain. Therefore, an improved coordinate detection sensitivity can be achieved.

According to an embodiment, the switching means selects at least one pair of adjoining electrodes so as to connect the selected electrodes to the differential amplifier, and shifts the selected electrodes one by one in the direction in which the electrodes are arranged. Therefore, by shifting the selected electrodes, the coordinate pointing device is, so to speak, searched to allow the position coordinates of the coordinate pointing device located in the area where the electrodes are arranged to be securely detected.

Furthermore, according to an embodiment, the switching means selects a pair of adjoining electrodes of the panel, and shifts the selected pair of electrodes one by one in the direction in which the electrodes are arranged. Therefore, the selection can be achieved in a manner simpler than that of the above-mentioned embodiment, thereby allowing the structure of the switching means to be simplified.

Furthermore, according to an embodiment, the switching means has the first terminal connected in parallel with two or more adjoining electrodes and the second terminal connected in parallel with two or more electrodes adjacent to the electrodes connected to the first terminal. Therefore, by electrically connecting the first terminal and the second terminal to the differential amplifier, four or more electrodes which are receiving the AC electric field outputted from the electrodes of the coordinate pointing device can be connected to the differential amplifier. Therefore, an improved detection sensitivity can be achieved in comparison with the case where only two electrodes of the panel are connected to the differential amplifier.

Furthermore, according to an embodiment, the envelope of the output from the differential amplifier is extracted by the envelope extraction means, and a bottom portion of the double-humped output from the envelope extraction means is detected. Then, based on the time at which the bottom portion is detected and the timing at which the switching means selects the electrodes of the panel, the coordinates representing the position of the coordinate pointing device are specified. Thus, according to the present embodiment, a characteristic double-humped signal is outputted from the envelope extraction means, and by detecting the bottom portion of the double-humped envelope waveform, coordinate detection can be achieved. Furthermore, in order to specify the coordinates, a signal obtained by removing unnecessary signal components therefrom and being subjected to an envelope detection process is used, and therefore the detection of the bottom portion can be easily achieved.

Furthermore, according to an embodiment, a synchronous detector is provided as the envelope extraction means. The synchronous detector can extract the envelope of the signal without distortion more correctly than the envelope detector, and therefore an improved coordinate detection accuracy can be achieved.

Furthermore, according to an embodiment, the coordinate detection means includes a first envelope detector which has a relatively great time constant and operates to receive the output from the differential amplifier and detect the envelope of the output as well as a second envelope detector which has a relatively small time constant and operates to receive the output from the differential amplifier and detect the envelope of the output. By subjecting the double-humped output from the first envelope detector and the double-humped output from the second envelope detector to a subtraction process, the bottom portion of the double-humped output outputted from the second envelope detector is detected.

The output of the first envelope detector having a great time constant becomes a double-humped signal where the bottom portion is shallowed, while the output of the second envelope detector having a small time constant becomes a double-humped signal where the bottom portion is not shallowed. Therefore, by subjecting the output of the first envelope detector and the output of the second envelope detector to a subtraction process, a signal having a peak at the bottom portion can be obtained. With the above-mentioned signal, the bottom portion can be detected.

Furthermore, according to an embodiment, the bottom detection means detects the bottom portion of the double-humped output according to the output obtained by binarizing the double-humped output from the envelope detector. By the above-mentioned binarizing operation, an output in which a difference between the bottom portion and the peak portion of the double-humped output is ascertained can be obtained. Therefore, the bottom portion can be easily detected by means of the output, and through detection of the bottom portion, a coordinate detection operation can be performed.

Furthermore, according to an embodiment, the coordinate detection means includes the delay circuit which receives the output from the differential amplifier and delays the output by a specified time, the subtracter which subjects the output of the differential amplifier and the delayed output to a subtraction process, and the bottom detection means which binarizes the signal outputted from the subtracter and detects the bottom portion of the double-humped output according to the binarized signal. According to the present embodiment, a preceding peak of the double-humped signal outputted from the differential amplifier and a subsequent peak of the delayed double-humped signal are added together. With the above-mentioned operation, a signal which has three peaks comprised of a highest peak and two low peaks located besides the highest peak obtained through the addition is outputted from the subtracter. Then, by binarizing the signal having the three peaks, a difference between the highest peak portion and the low peak portions is ascertained. The highest peak portion is delayed by the above-mentioned delay time from the bottom portion of the double-humped output which is not delayed. Therefore, the bottom portion can be easily detected according to the binarized signal of which highest peak portion is ascertained, and a coordinate detection operation can be performed through the detection of the bottom portion.

Furthermore, according to an embodiment, the flat display panel wherein the material having an electro-optical effect characteristic is sealedly filled in the space between the two substrates, and the plural number of x-axis electrodes and the plural number of y-axis electrodes which are intersecting each other are provided on the substrates can be time-sharingly changed over so as to be used for either image display or coordinate detection by means of the image display-coordinate detection changeover circuit. When the flat display panel is used for image display, the x-axis electrodes and the y-axis electrodes are driven by the drive circuit to electrically drive the panel so as to display an image. When coordinate detection is performed, a voltage induced at the x-axis electrodes and the y-axis electrodes by an electric field generated from the coordinate pointing device which is provided separately with a function of generating an AC electric field is detected by the coordinate detection circuit which utilizes a change in voltage of the signal, thereby allowing the coordinates of the coordinate pointing device to be detected.

In particular, according to the above-mentioned embodiment, one LCD panel can be used concurrently for image display and coordinate input through an electrostatic capacitive coupling.

Furthermore, in the above-mentioned embodiment, a flat display panel such as an LCD panel which has been conventionally developed specially for image display can be used as it is without making alterations. The above-mentioned arrangement has an economical advantage that a coordinate input function can be incorporated into a flat display panel without requiring any change of the manufacturing process accompanied by huge amount of investment.

In particular, the above-mentioned embodiment has a feature that the structure thereof is very simple. Furthermore, a signal detection operation is performed by means of a differential amplifier. The above-mentioned arrangement has an advantage that external noises which have entered evenly into two inputs of the differential amplifier can be effectively removed. In addition, since substantially an addition process is performed in the differential amplifier, there can be expected an improved signal-to-noise ratio in the signal detection operation.

Furthermore, according to an embodiment, the flat display panel wherein the material having an electro-optical effect characteristic is sealedly filled in the space between the two substrates, and the plural number of x-axis electrodes and the plural number of y-axis electrodes which are intersecting each other are provided on the substrates can be time-sharingly changed over so as to be used for either image display or coordinate detection by means of the image display-coordinate detection changeover circuit. When the flat display panel is used for image display, the x-axis electrodes and the y-axis electrodes are driven by the drive circuit to electrically drive the panel so as to display an image. When coordinate detection is performed, a voltage induced at the x-axis electrodes and the y-axis electrodes by an electric field generated from the coordinate pointing device which is provided separately with a function of generating an AC electric field is detected by the coordinate detection circuit which utilizes a change in phase of the signal, thereby allowing the coordinates of the coordinate pointing device to be detected.

Furthermore, the above-mentioned embodiment performs coordinate detection paying attention to the change in phase of the signal, and therefore it has an inherent feature that it is less influenced by noises which enter into the detected signal and cause a change in amplitude of the signal.

Furthermore, according to a coordinate detection device of an embodiment, a band-pass filter or a high-pass filter for selectively allowing only a signal at and around the frequency of the AC electric field to pass is connected to an input terminal of the coordinate detection circuit. Therefore, the coordinate detection circuit can consistently detect a stabilized voltage from the x-axis electrodes and the y-axis electrodes without being influenced by noises.

Furthermore, the above-mentioned embodiment has an advantage that hum noises and the like which may be induced from a hand of the operator who touches the panel screen can be effectively removed, thereby allowing an improved coordinate detection accuracy to be achieved. Conversely, the circuit structure and the like can be simplified so as to satisfy the required detection accuracy.

Furthermore, according to a coordinate detection device of an embodiment, an electrode which is provided at the tip end of the coordinate pointing device provided with a function of generating an AC electric field is a coaxial electrode comprised of a center electrode and a peripheral electrode. Therefore, not depending on which circumferential direction the coordinate pointing device is directed in use, a stabilized voltage can be consistently induced at the x-axis electrodes and the y-axis electrodes.

Furthermore, in the above-mentioned embodiment, the coordinate pointing device has an electrode having a specific coaxial configuration. Therefore, not depending on the direction and angle of the pen-shaped coordinate pointing device in which the AC generator is incorporated, the coordinate pointing device is consistently coupled with the electrodes of the LCD panel consistently through a constant electrostatic capacity, and an electrical change to be applied can be made constant. Therefore, the AC generator can be stored in a pen-shaped casing. As a result, a coordinate pointing device which can be handled very easily in utterly the same manner as the generic writing pen.

Furthermore, according to an embodiment, the x-axis drive circuit and the y-axis drive circuit for image display use, the coordinate detection circuit, and the image display-coordinate detection changeover circuit are arranged along two or three sides of the peripheries of the display panel.

According to the above-mentioned embodiment, a coordinate detection function can be incorporated into the image display device without increasing the size of the display device having an LCD panel provided specially for image display, and a display device having a coordinate detection function can be manufactured without making great alterations in the existing manufacturing equipment for the display device. Therefore, according to the above-mentioned embodiment, there can be provided a coordinate detection device capable of preventing the increase of development cost and the reduction of yield, and dispensing with investment for equipment which may cause cost increase, thereby totally contributing to development of the industry.

The present invention can provide a coordinate input function-integrated display device capable of solving the aforementioned problems of the prior arts. That is, in achieving a coordinate input function-integrated display device, the present invention can obviate the need of a connection cable which has been conventionally necessitated. Furthermore, since there is no need to form a closed loop on which an electric field is effected, there is no need to newly incorporate into an LCD panel any specific bi-directional switching element for short-circuiting adjoining electrodes of the LCD panel at the tip end of the electrodes. Therefore, it is not required to provide a tab connection terminal at the four sides of the LCD panel. Therefore, the increase of development cost and the reduction of yield can be prevented. Furthermore, unnecessary investment can be avoided, and a compact light-weight coordinate input function-integrated display device can be provided. That is, according to the present invention, the conventionally used panel provided specially for image display use can be applied as it is to the panel of an image display/coordinate input function integrated device without making alterations in the LCD panel. Therefore, the above-mentioned arrangement can totally contribute to development of the industry.

The coordinate input function of the present invention can be operated in a panel of any type with same circuit according to same principle of operation not depending on the type of the panel. Therefore, whichever one of LCD panels such as the duty ratio drive LCD panel and the active matrix type LCD panel in which a TFT is incorporated is selected as a panel, the coordinate detection function of the present invention is not influenced by the type of the panel. The above is because the present invention allows a coordinate input function to be incorporated into an LCD panel which has been conventionally used specially for image display, and furthermore, as a result of time-sharingly changing over between the image display function and the coordinate input function, the image display function and the coordinate input function can be utterly made independent both in terms of function and in terms of circuit.

The present invention can be applied to a type of a panel in which a signal I/O connector is attached to at most three sides among the conventionally used panels provided specially for image display. Therefore, so-called a peripheral edge portion can be dimensionally decreased to allow a compact application product to be developed. In contrast to the above, even when a new panel is manufactured by changing the manufacturing process, it has been conventionally required to provide a signal I/O connector and so forth at all the four sides of the panel.

Furthermore, according to the present invention, the AC oscillator can be driven by a battery. The above-mentioned arrangement has an advantage that no lead wire for connecting the coordinate pointing device to the coordinate detection circuit is necessitated. Furthermore, there is no need to incorporate a built-in wireless transmitter, which is advantageous in terms of the operating life of the battery. Furthermore, the coordinate pointing device can be totally compacted, which produces an advantageous effect that a light-weight coordinate pointing device allowing easy use thereof can be constructed. Furthermore, since there is no need to compulsorily mount a wireless transmitter or the like in the compact coordinate pointing device, which is advantageous in terms of cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier;

the coordinate pointing device comprises:

a battery storing section for storing therein a secondary battery which as a power source for the alternating current oscillator and a charging terminal to be electrically connected to the secondary battery when the secondary battery is stored in the battery storing section; and, a casing to which the panel is mounted is provided with a storing portion for storing the coordinate pointing device and the battery storing section, and a power supply terminal which can supply an electric power to the charging terminal while being electrically connected to a charging terminal of the coordinate pointing device when the coordinate pointing device is stored in the storing portion.

2. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier; and a resonance circuit which resonates with the alternating current electric field generated by the alternating current oscillator is connected across an output terminal of said panel and an inverted terminal of the differential amplifier.

3. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier; wherein the switching means selects at least one pair of adjoining electrodes of said panel so as to connect the electrodes to a differential amplifier and shifts the selected electrodes one by one in a direction in which the electrodes are arranged;

the coordinate detection means comprises:

envelope extraction means for receiving an output from the differential amplifier and extracting an envelope of the output;

bottom detection means for receiving a double-humped output from the envelope extraction means and detecting a bottom portion of the output;

time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

4. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier; wherein the switching means selects at least one pair of adjoining electrodes of said panel so as to connect the electrodes to a differential amplifier and shifts the selected electrodes one by one in a direction in which the electrodes are arranged;

the coordinate detection means comprises:

envelope extraction means for receiving an output from the differential amplifier and extracting an envelope of the output;

bottom detection means for receiving a double-humped output from the envelope extraction means and detecting a bottom portion of the output;

time counting means for specifying a bottom portion detection time at which the bottom detection means detects the bottom portion; and position coordinate specifying means for specifying coordinates representing a position of the coordinate representing a position of the coordinate pointing device on the panel based on the bottom portion detection time specified by the time counting means and a timing at which the electrodes are selected; and a synchronous detector is provided as the envelope extraction means.

5. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier; wherein the switching means selects at least one pair of adjoining electrodes so as to connect the electrodes to a differential amplifier and shifts the selected electrodes one by one in a direction in which the electrodes are arranged;

the coordinate election means comprises:

a first envelope detector which has a relatively great time constant and operates to receive an output from the differential amplifier and detect an envelope of the output;

a second envelope detector which has a relatively small time constant and operates to receive an output from the differential amplifier and detect an envelope of the output;

bottom detection means for subjecting a double-humped output from the first envelope detector and a double-humped output from the second envelope detector to a subtraction process so as to detect a bottom portion of the double-humped output outputted from the second envelope detector;

time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

6. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier; wherein the switching means selects at least one pair of adjoining electrodes so as to connect the electrodes to a differential amplifier and shifts the selected electrodes one by one in a direction in which the electrodes are arranged;

the coordinate detection means comprises:

an envelope detector which receives an output from the differential amplifier and detects an envelope of the output;

bottom detection means for receiving a double-humped output from the envelope detector to binarize the output and detecting a bottom portion of the double-humped output according to the binarized output;

time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

7. A panel which is provided for coordinate detection and includes a first plurality of electrodes and a second plurality of electrodes extending in a direction crossing a direction in which the first plurality of electrodes extends;

a coordinate pointing device which includes an alternating current oscillator and an electrode and outputs from a tip end portion of the electrode an alternating current electric field generated by the alternating current oscillator;

a differential amplifier;

switching means for sequentially changing connection of the first and second plurality of electrodes of the panel so as to sequentially select the electrodes and electrically connect each selected electrode to the differential amplifier;

coordinate detection means for detecting a signal supplied from the coordinate pointing device to the first and second plurality of electrodes by shifting selected electrodes in accordance with a signal from said differential amplifier and detecting coordinates based on a timing at which the first and second plurality of electrodes are selected and a timing of a portion of said signal output from the differential amplifier; wherein the switching means selects at least one pair of adjoining electrodes so as to connect the electrodes to a differential amplifier and shifts the selected electrodes one by one in a direction in which the electrodes are arranged;

the coordinate detection means comprises:

a delay circuit which receives an output of the differential amplifier and delays the output by a specified time;

a subtracter which subjects the output of the differential amplifier and an obtained delayed output to a subtraction process;

bottom detection means for binarizing a signal outputted from the subtracter and detecting a bottom portion of the double-humped output according to an obtained binarized signal;

time counting means for specifying a bottom portion detection time at which the bottom detection means detects the bottom portion; and position coordinate specifying means for specifying coordinates representing a position of the coordinate pointing device on the panel based on the bottom portion detection time specified by the time counting means and a timing at which the electrodes are selected.

8. A coordinate detection device comprising:

a flat display panel in which a material having an electro-optical effect characteristic is sealedly filled in a space between two substrates, and a plurality of x-axis electrodes and a plurality of y-axis electrodes which are intersecting each other are provided on the substrates;

x-axis drive circuit and y-axis drive circuit which are provided for image display use and electrically drive the x-axis electrodes and the y-axis electrodes of the flat display panel respectively;

a coordinate pointing device including alternating current electric field generating means having therein an alternating current power source and an electrode connected to an output terminal of the alternating current electric field generating means;

a coordinate detection circuit including a differential amplifier, a connection switching circuit which selects two adjoining x-axis electrodes or a pair of x-axis electrodes constituted by two adjoining electrode groups of the x-axis electrodes as well as two adjoining y-axis electrodes or a pair of y-axis electrodes constituted by two adjoining electrode groups of the y-axis electrodes, connects the selected electrodes to the differential amplifier, and shifts the selected electrodes one by one in a direction in which the selected electrodes are arranged, bottom detection means for obtaining a signal which is supplied from the coordinate pointing device to the electrodes by shifting the selected electrodes as a double-humped signal from the differential amplifier and detecting a bottom portion of the double-humped signal, and position coordinate specifying means for specifying coordinates based on a time at which the bottom detection means detects the bottom portion and a timing at which the electrodes are selected; and an image display-coordinate detection changeover circuit which time-sharingly complementarily operates the x-axis drive circuit, the y-axis drive circuit, and the coordinate detection circuit.

9. A coordinate detection device as claimed in claim 8, wherein a band-pass filter or a high-pass filter for allowing selectively a signal having a frequency at and around a frequency of the alternating current electric field generated by the coordinate pointing device to pass is connected to an input terminal of the coordinate detection circuit.

10. A coordinate detection device as claimed in claim 8, wherein the electrode of the coordinate pointing device is comprised of:

a center electrode and a peripheral electrode which are arranged coaxially.

11. A coordinate detection device as claimed in claim 8, wherein the x-axis drive circuit and the y-axis drive circuit for image display use, the coordinate detection circuit, and the image display-coordinate detection changeover circuit are arranged along peripheries of two or three sides of the display panel.

12. A coordinate detection device comprising:

a flat display panel in which a material having an electro-optical effect characteristic is sealedly filled in a space between two substrates, and a plurality of x-axis electrodes and a plurality of y-axis electrodes which are intersecting each other are provided on the substrates;

x-axis drive circuit and y-axis drive circuit which are provided for image display use and electrically drive the x-axis electrodes and the y-axis electrodes of the flat display panel respectively;

a coordinate pointing device including alternating current electric field generating means having therein an alternating current power source and an electrode connected to an output terminal of the alternating current electric field generating means;

a coordinate detection circuit including a differential amplifier, a connection switching circuit which selects two adjoining x-axis electrodes or a pair of x-axis electrodes constituted by two adjoining electrode groups of the x-axis electrodes as well as two adjoining y-axis electrodes or a pair of y-axis electrodes constituted by two adjoining electrode groups of the y-axis electrodes, connects the selected electrodes to the differential amplifier, and shifts the selected electrodes one by one in a direction in which the selected electrodes are arranged, bottom detection means for obtaining a signal which is supplied from the coordinate pointing device to the electrodes by shifting the selected electrodes as a double-humped signal from the differential amplifier and detecting a bottom portion of the double-humped signal by detecting a phase inversion point of the double-humped signal through calculation of an input signal and an output signal of a delay circuit, and position coordinate specifying means for specifying coordinates based on a time at which the bottom detection means detects the bottom portion and a timing at which the electrodes are selected; and an image display-coordinate detection changeover circuit which time-sharingly complementarily operates the x-axis drive circuit, the y-axis drive circuit, and the coordinate detection circuit.

13. A coordinate detection device as claimed in claim 12, wherein a band-pass filter or a high-pass filter for allowing selectively a signal having a frequency at and around a frequency of the alternating current electric field generated by the coordinate pointing device to pass is connected to an input terminal of the coordinate detection circuit.

14. A coordinate detection device as claimed in claim 12, wherein the electrode of the coordinate pointing device is comprised of:

a center electrode and a peripheral electrode which are arranged coaxially.

15. A coordinate detection device as claimed in claim 12, wherein the x-axis drive circuit and the y-axis drive circuit for image display use, the coordinate detection circuit, and the image display-coordinate detection changeover circuit are arranged along peripheries of two or three sides of the display panel.

* * * * *